(12) United States Patent
Murphy et al.

(10) Patent No.: US 11,394,181 B2
(45) Date of Patent: Jul. 19, 2022

(54) TOGGLE SWITCH AND VARIABLE ACTUATOR CONTROL

(71) Applicant: Pass & Seymour, Inc., Syracuse, NY (US)

(72) Inventors: Patrick J. Murphy, Marcellus, NY (US); Alec J. Brindisi, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 239 days.

(21) Appl. No.: 16/687,884

(22) Filed: Nov. 19, 2019

(65) Prior Publication Data
US 2020/0161841 A1 May 21, 2020

Related U.S. Application Data

(60) Provisional application No. 62/769,053, filed on Nov. 19, 2018, provisional application No. 62/905,587, filed on Sep. 25, 2019.

(51) Int. Cl.
*H02G 3/14* (2006.01)
*H02B 1/48* (2006.01)
*H01H 21/22* (2006.01)
*H01H 21/04* (2006.01)

(52) U.S. Cl.
CPC .............. *H02B 1/48* (2013.01); *H01H 21/04* (2013.01); *H01H 21/22* (2013.01); *H02G 3/14* (2013.01)

(58) Field of Classification Search
CPC ... H02B 1/48; H02B 1/46; H02B 1/26; H01H 21/04; H01H 21/22; H01H 23/02; H01H 23/04; H01H 23/14; H02G 3/14; H02G 3/08; H02G 3/081

USPC ............ 174/50, 500, 559, 560, 561, 53, 66; 200/296, 329, 237, 293, 43.04
See application file for complete search history.

(56) References Cited

U.S. PATENT DOCUMENTS 5,262,678 A * 11/1993 Flowers ............... H01H 3/0213
                                                    307/125
5,338,910 A *  8/1994 Tsai ...................... H01H 15/00
                                                    200/292

(Continued)

OTHER PUBLICATIONS

CN Office Action, App. No. 201911137111.6, dated Aug. 9, 2021, pp. 1-7.

*Primary Examiner* — Angel R Estrada
(74) *Attorney, Agent, or Firm* — Bond Schoeneck & King, PLLC; George McGuire

(57) ABSTRACT

A color change kit for an electrical wiring device, the color change kit including: a frame having: a top surface, a second surface, a width, a length and a height; a bezel extending above the top surface of the frame and having a width, a length and a height, an interior surface and a top perimeter surface, and an opening formed therethrough; and an elongated recessed separator having a top surface and a bottom surface and being positioned within the opening and below the top perimeter surface, extending along an axis parallel to the length of the bezel, wherein the elongated recessed separator is configured to split a portion the opening into a first aperture and a second aperture; a toggle switch cover positioned through and actuatable within the first aperture, and a dimmer slider positioned and actuatable within the second aperture.

20 Claims, 69 Drawing Sheets

(56) References Cited

U.S. PATENT DOCUMENTS

| | | | |
|---|---|---|---|
| 6,259,351 B1 * | 7/2001 | Radosavljevic | H01C 10/38 |
| | | | 338/153 |
| 6,392,170 B1 * | 5/2002 | Wechsler | H01H 23/148 |
| | | | 200/43.16 |
| 6,727,446 B1 | 4/2004 | Mayo et al. | |
| 7,335,845 B2 * | 2/2008 | Johnsen | H05B 47/10 |
| | | | 200/332 |
| 7,837,344 B2 * | 11/2010 | Altonen | H05B 39/044 |
| | | | 362/85 |
| 8,525,372 B2 * | 9/2013 | Huang | H05B 47/185 |
| | | | 307/139 |

* cited by examiner

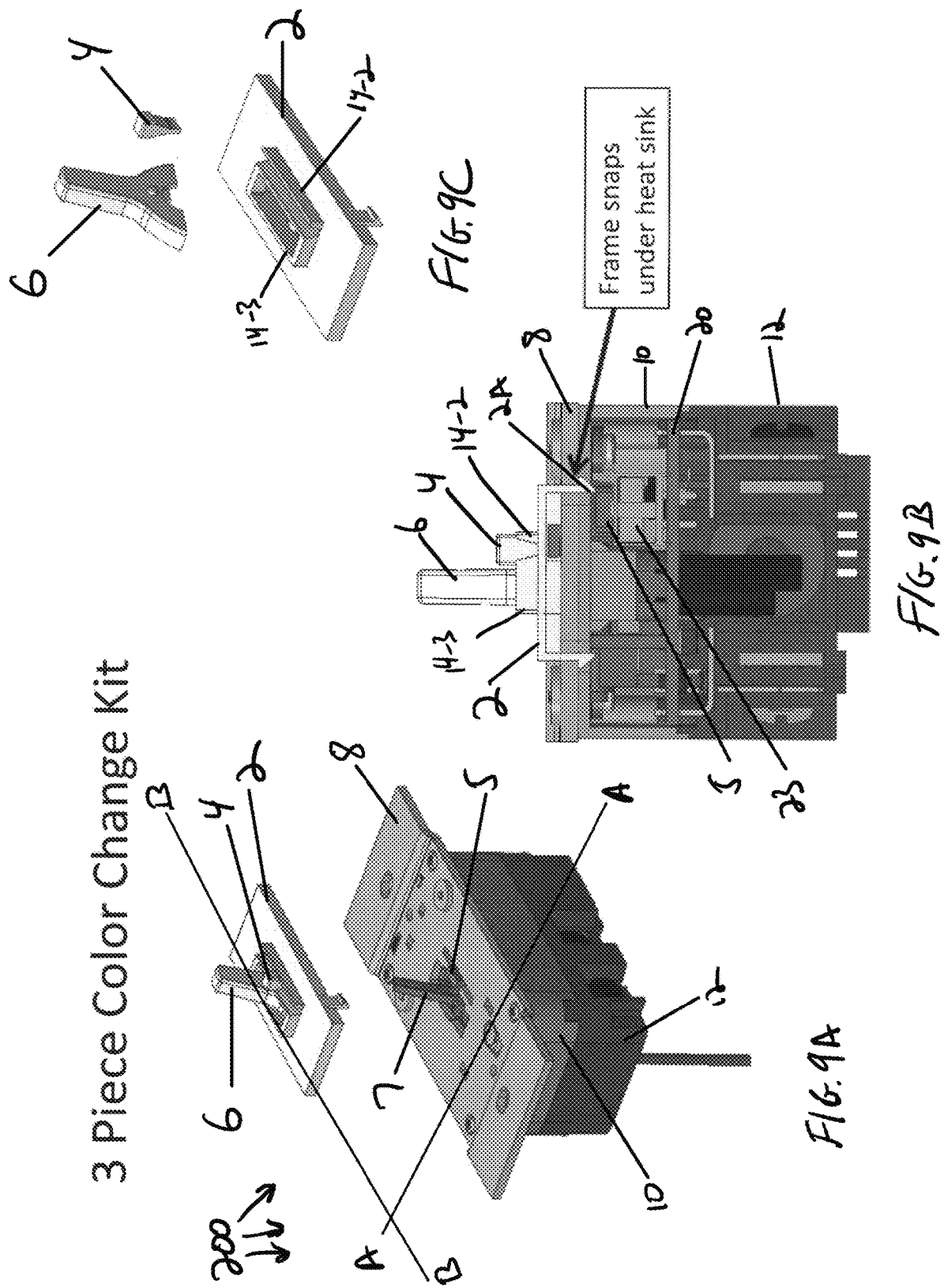

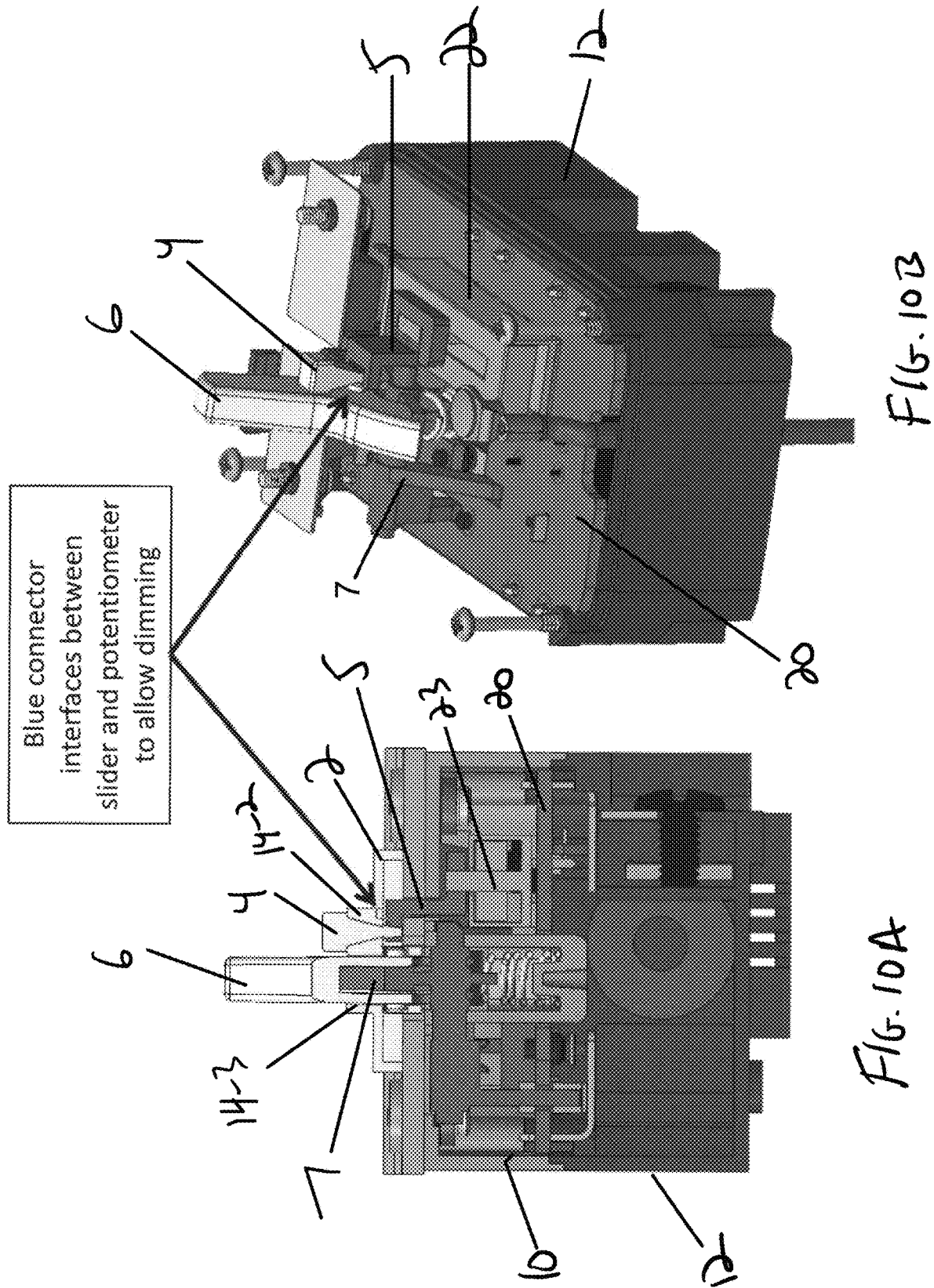

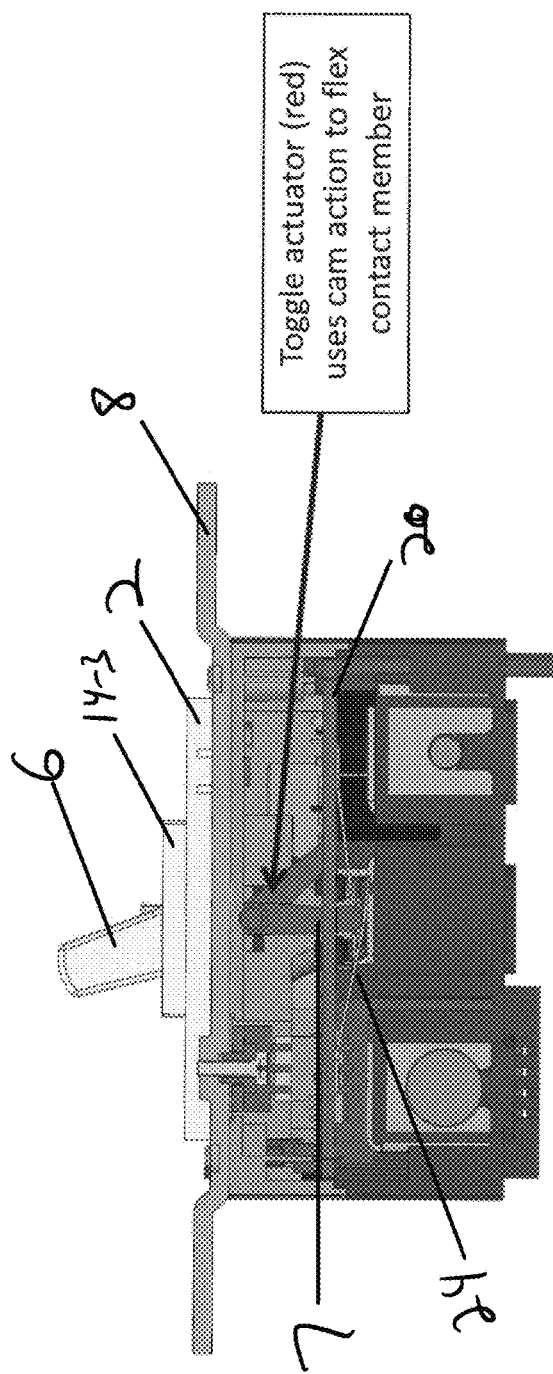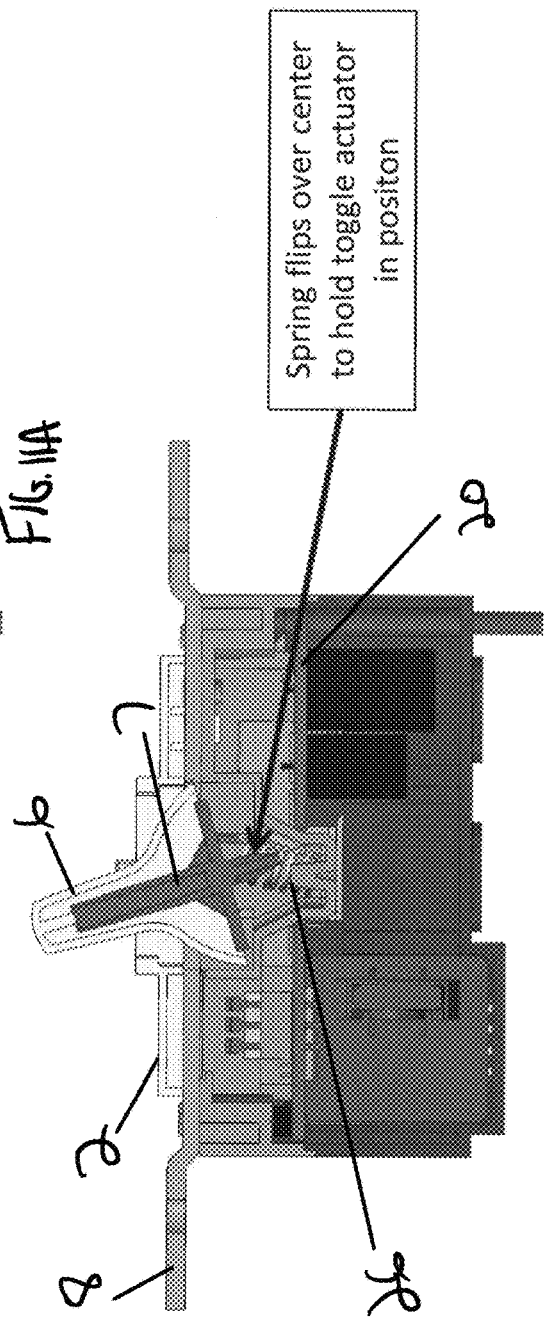

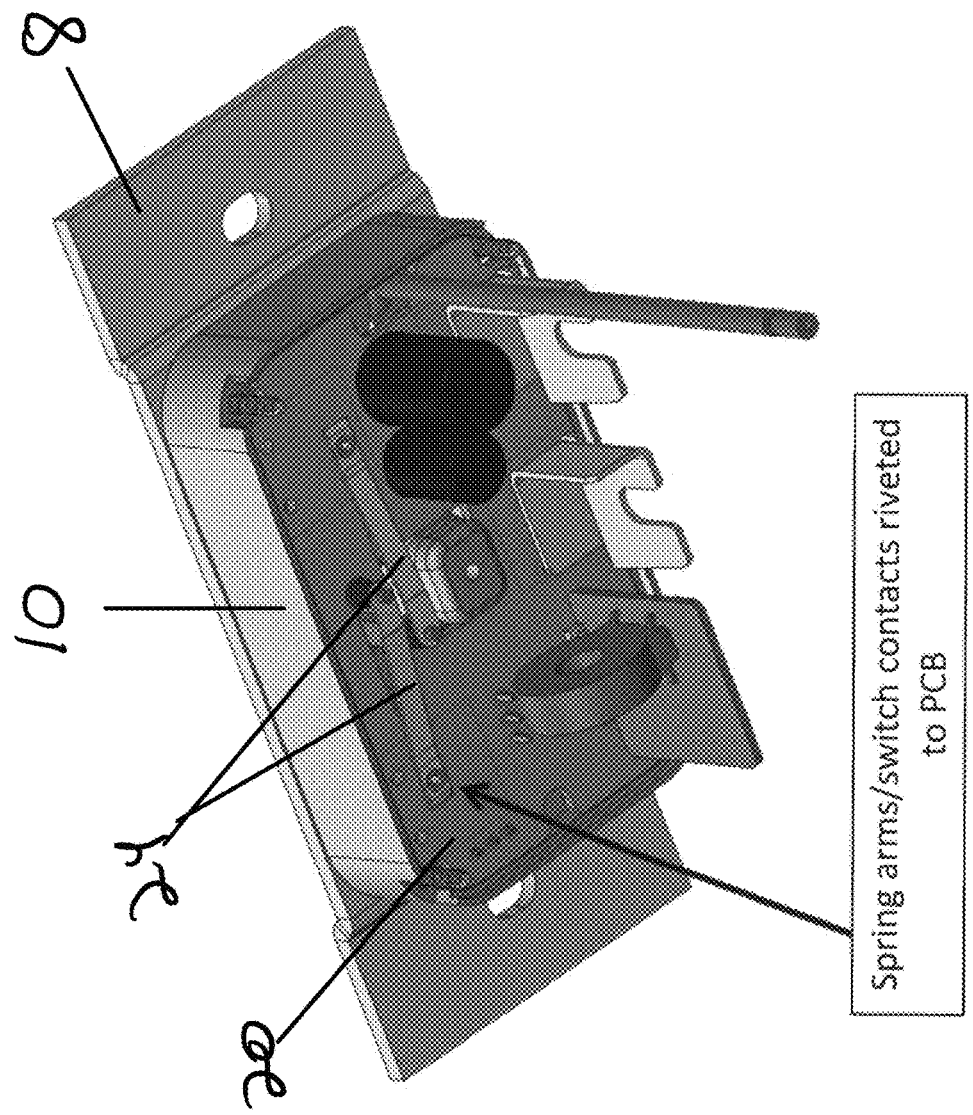

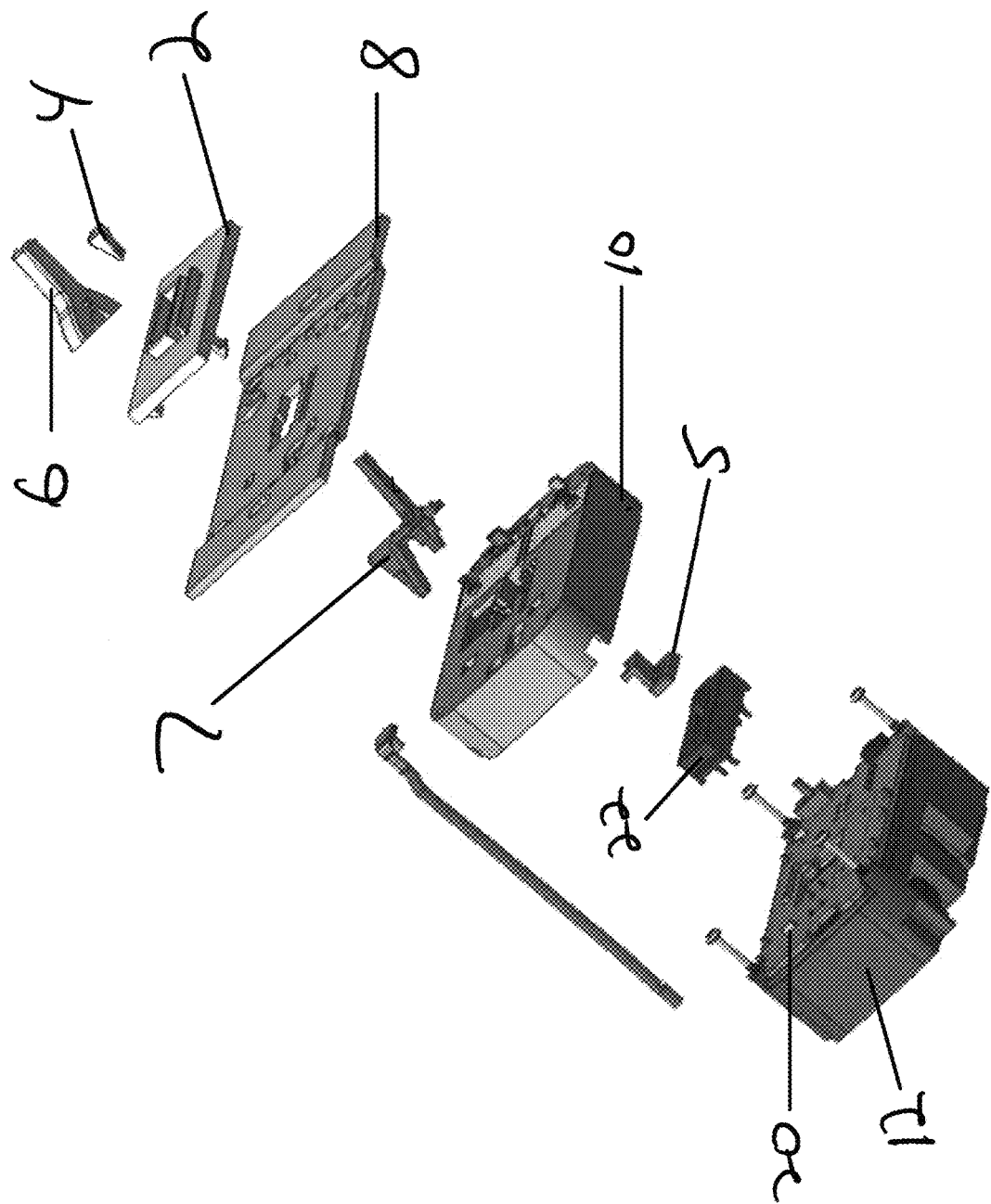

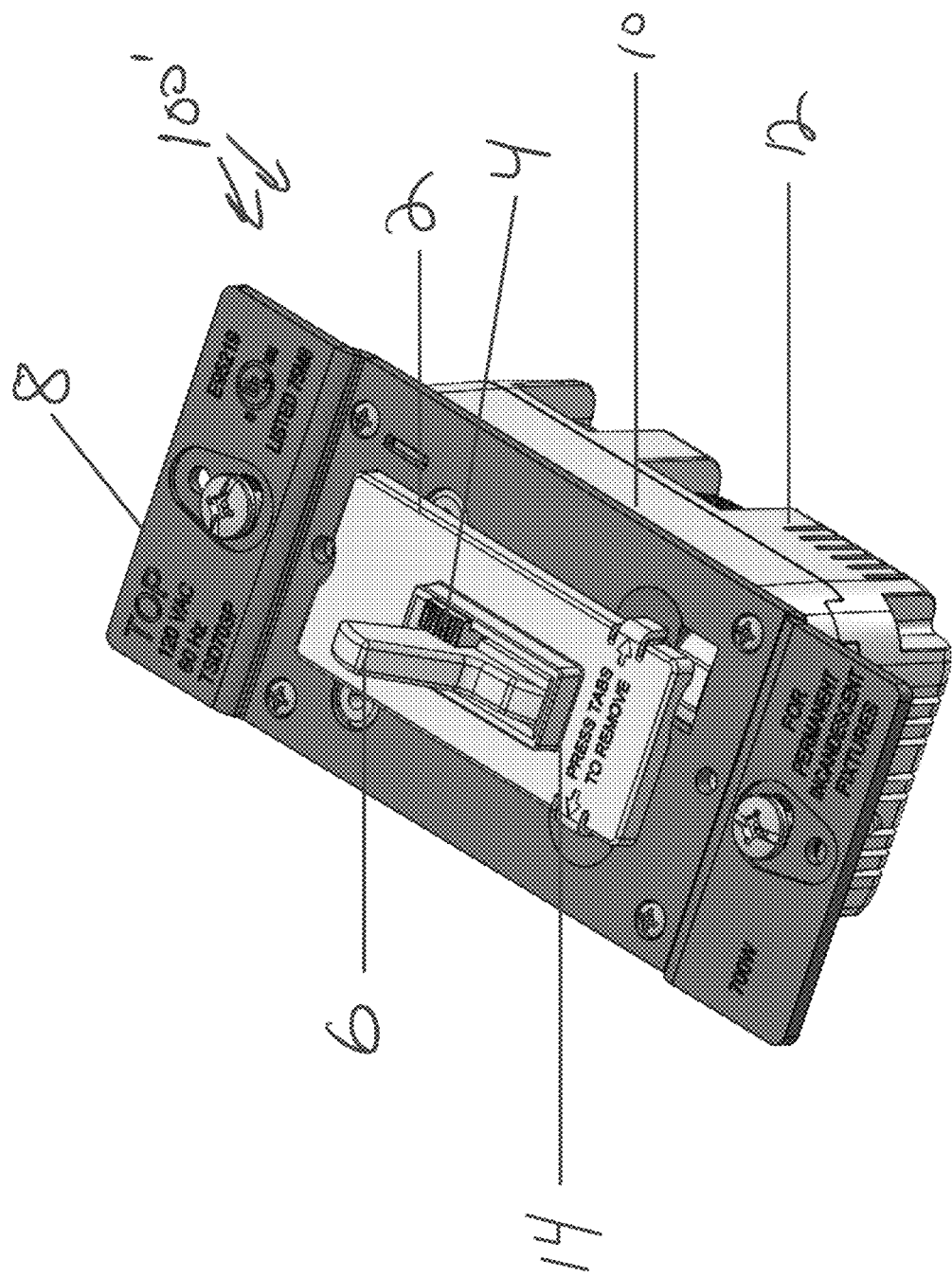

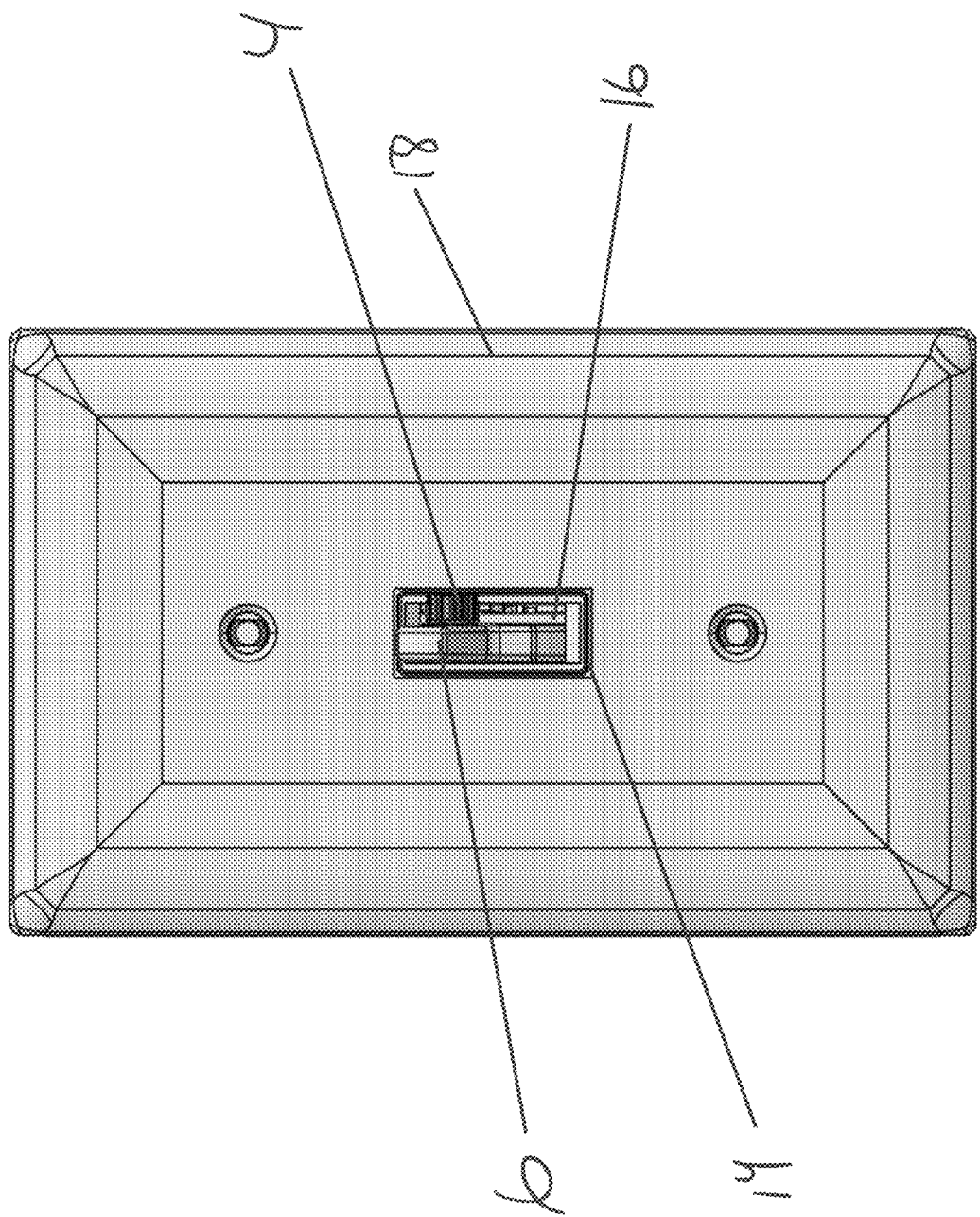

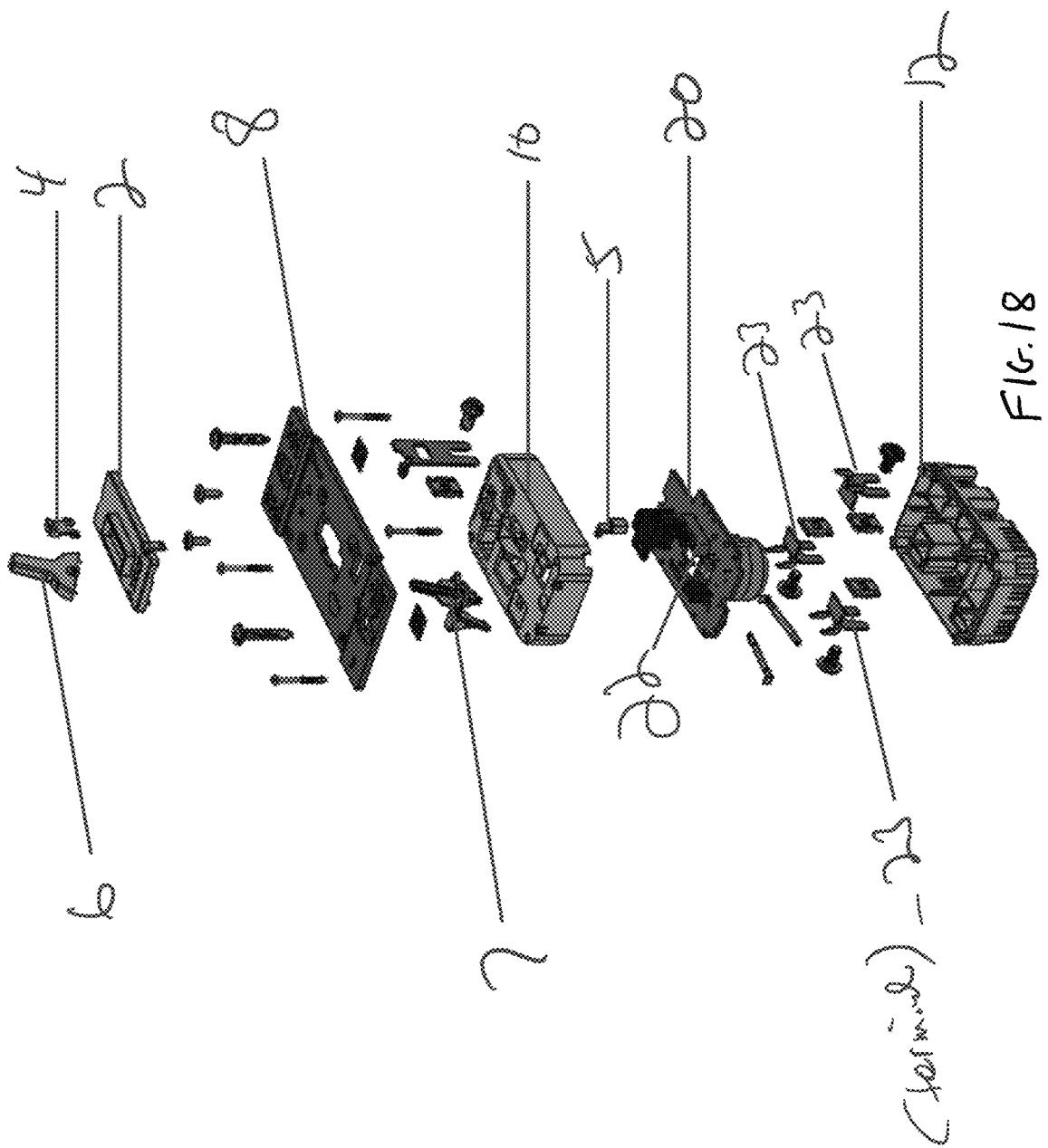

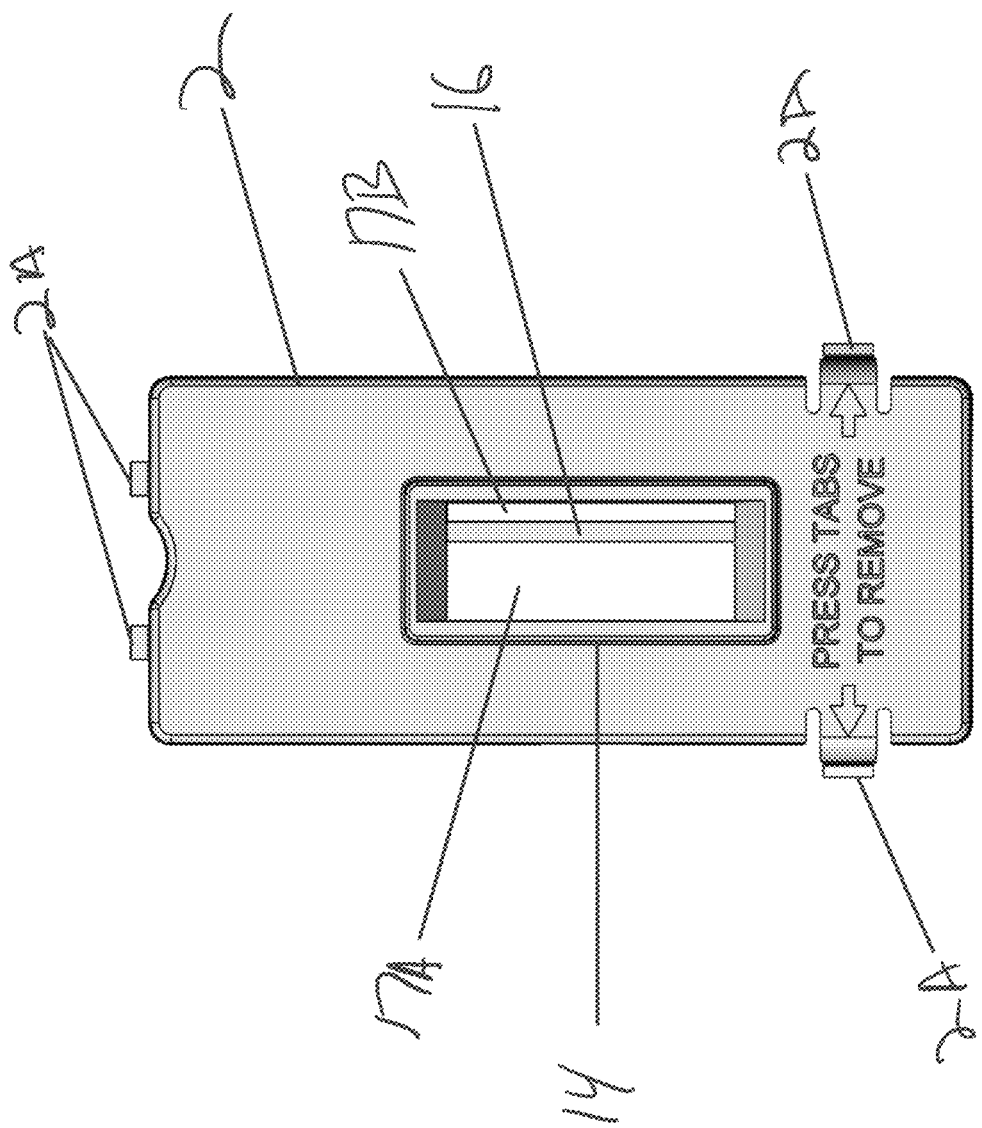

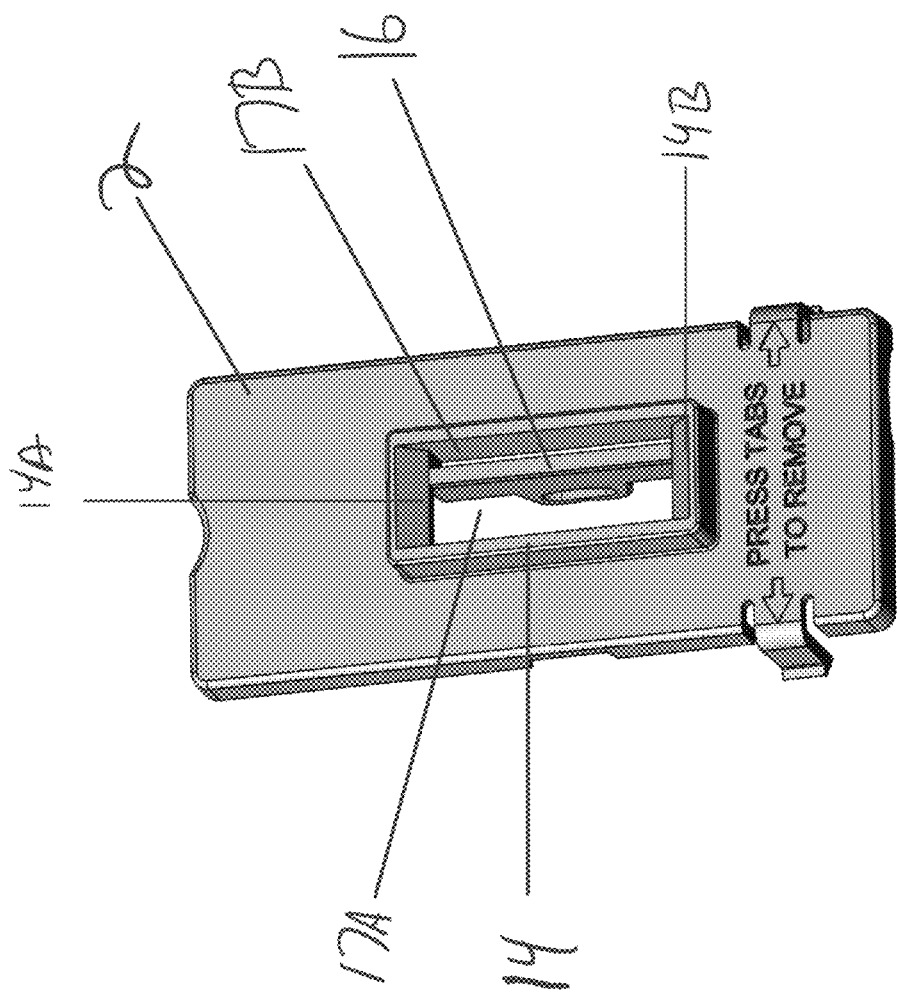

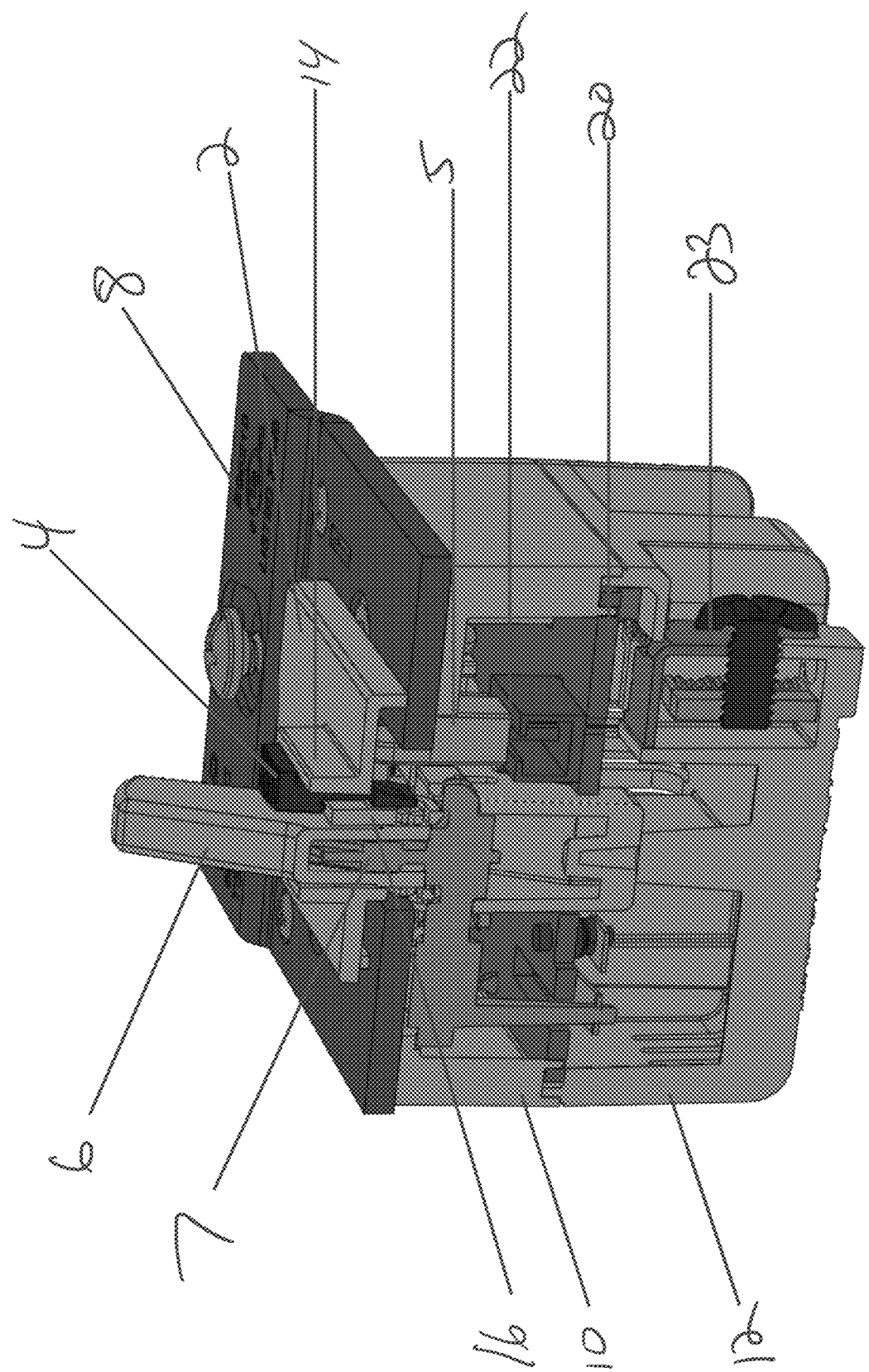

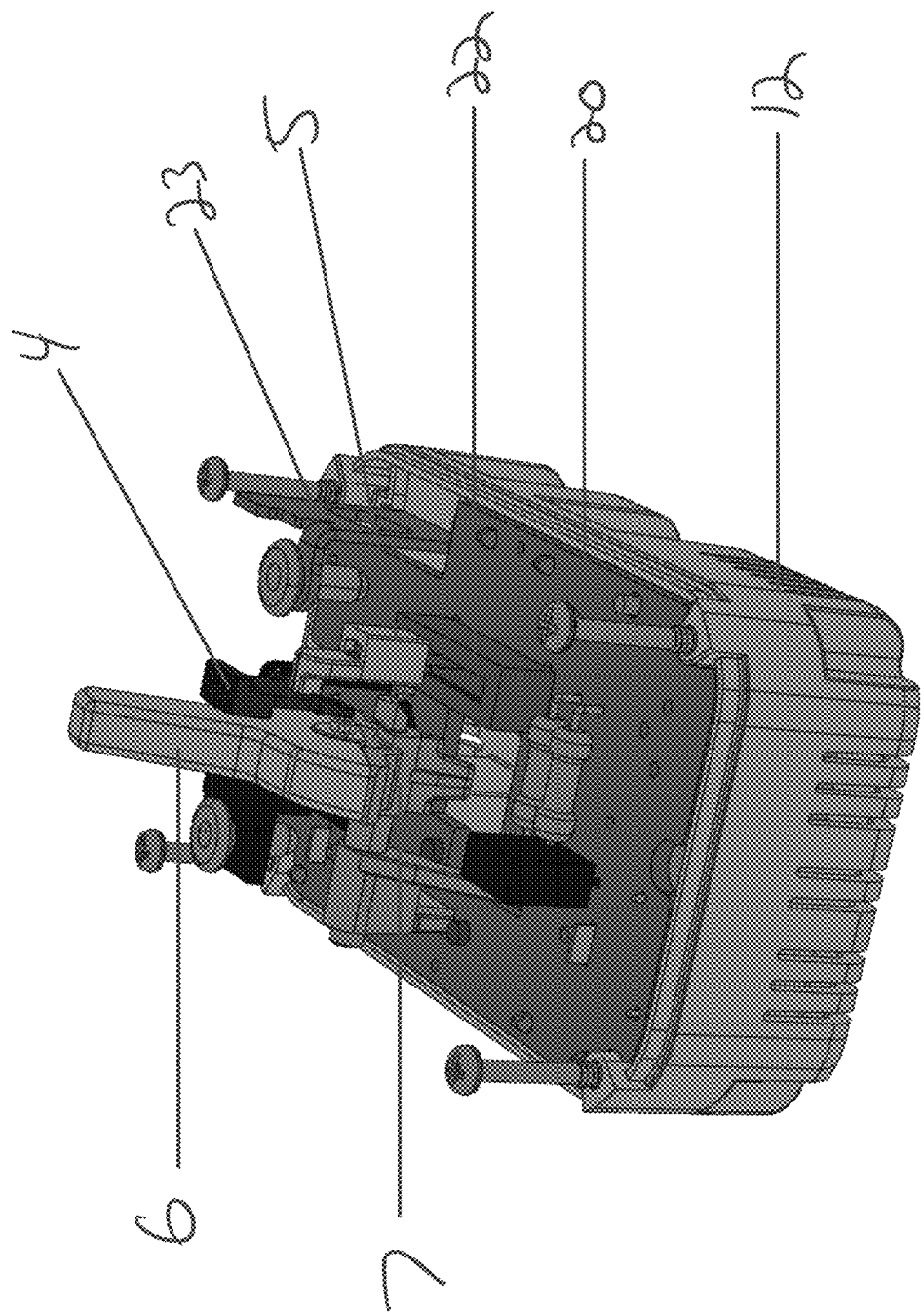

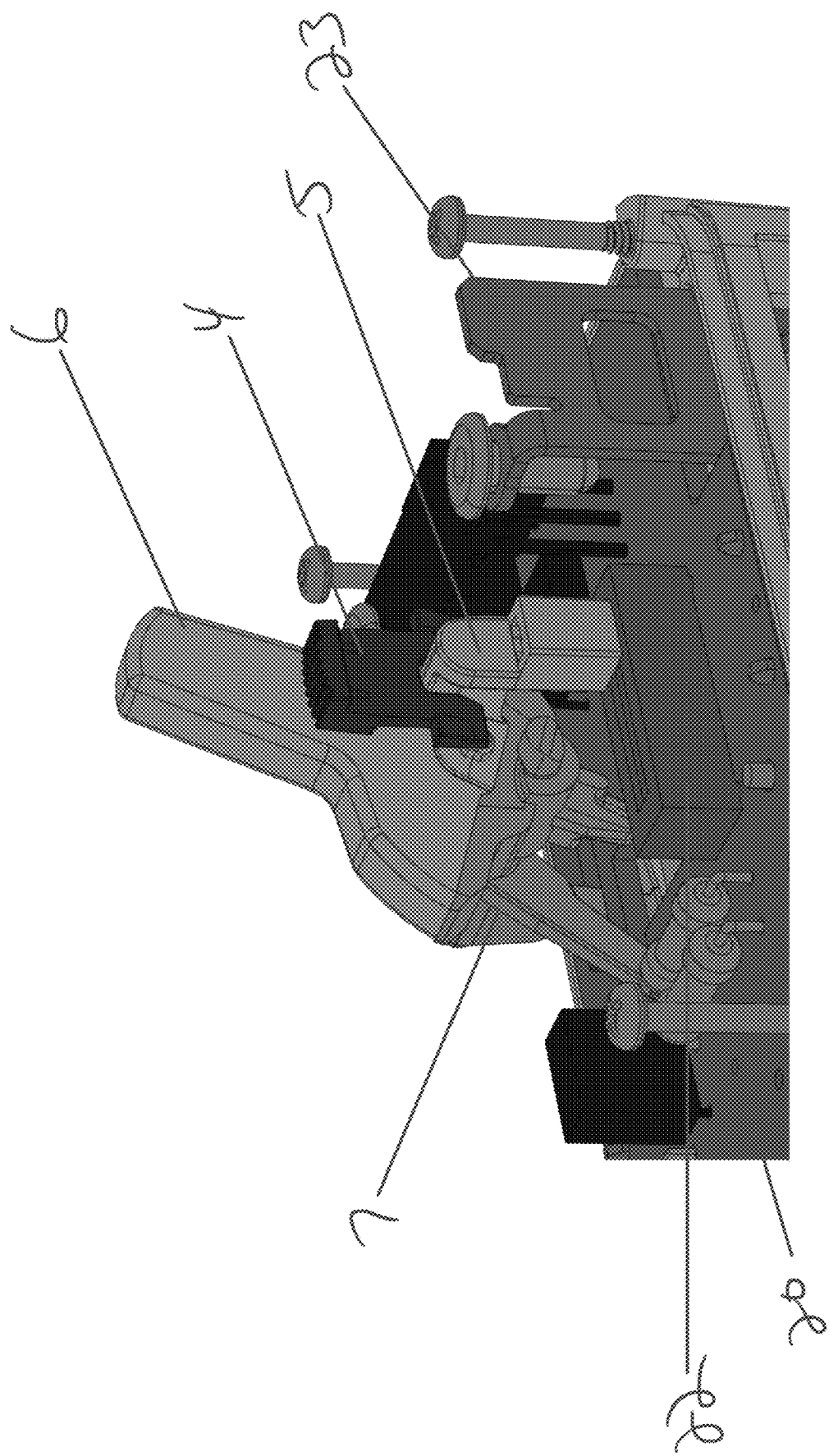

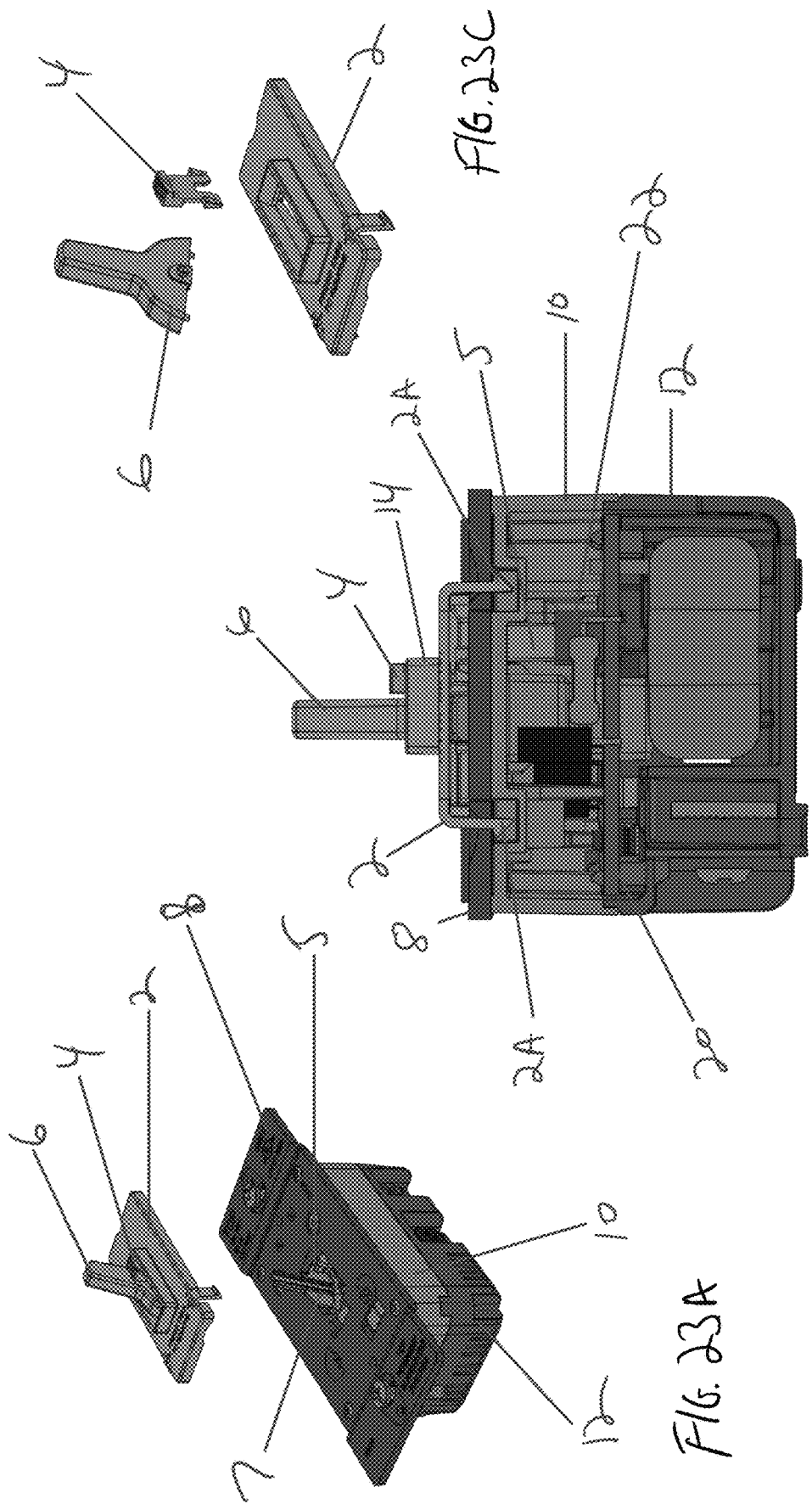

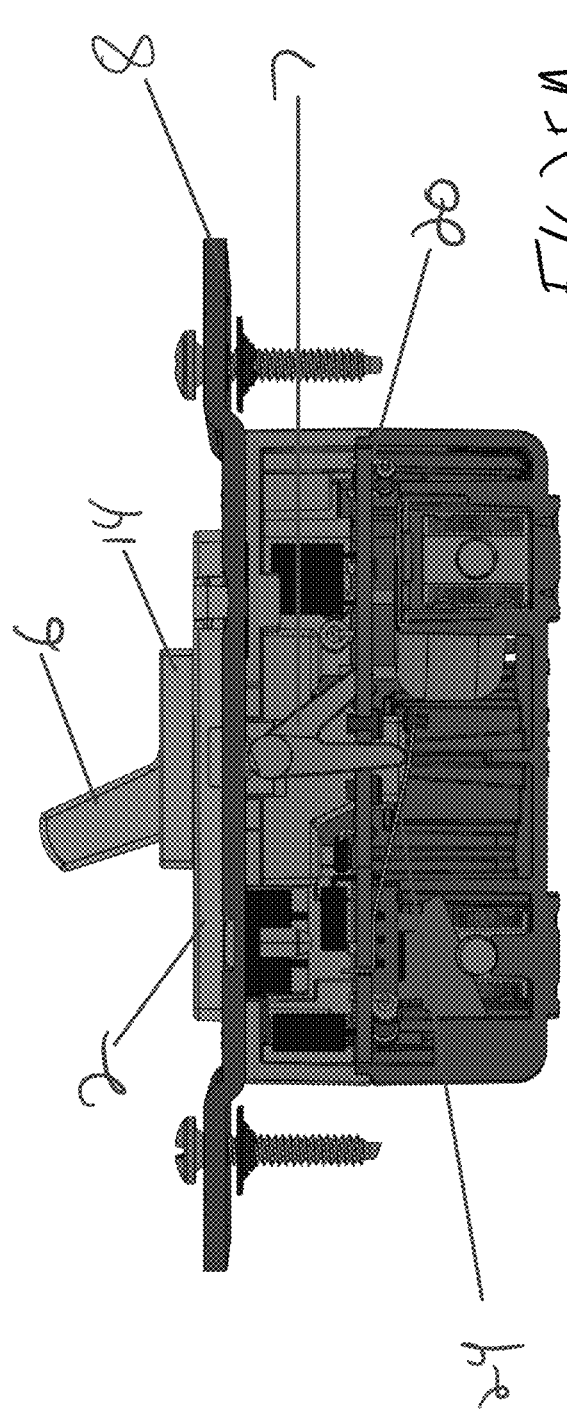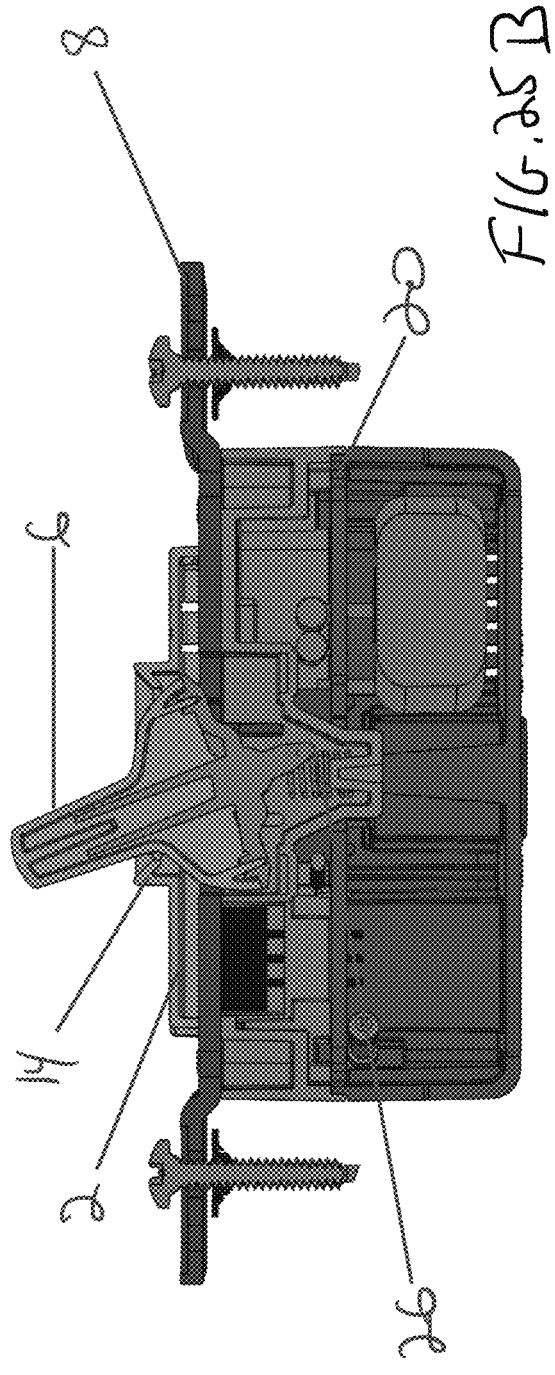

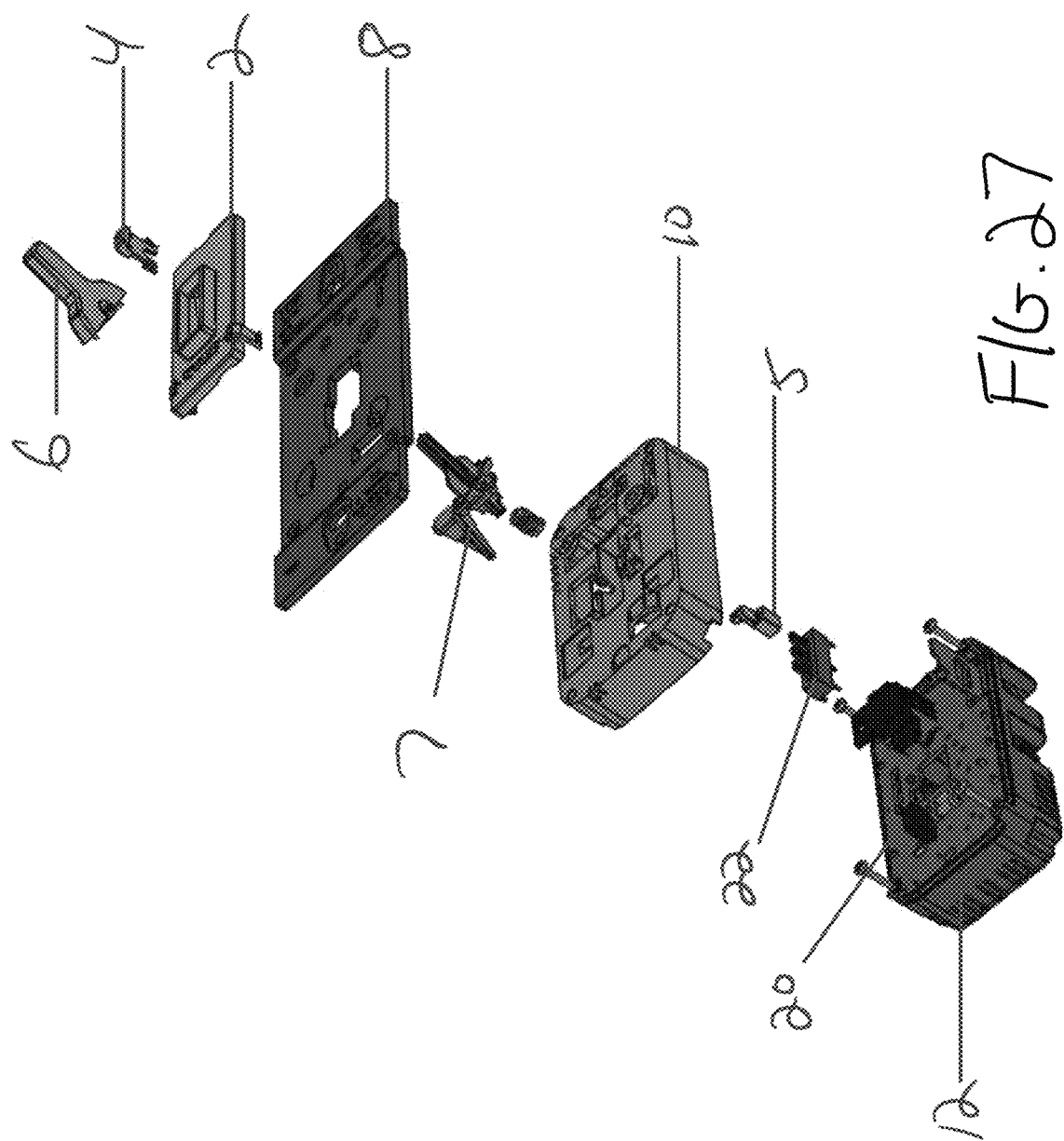

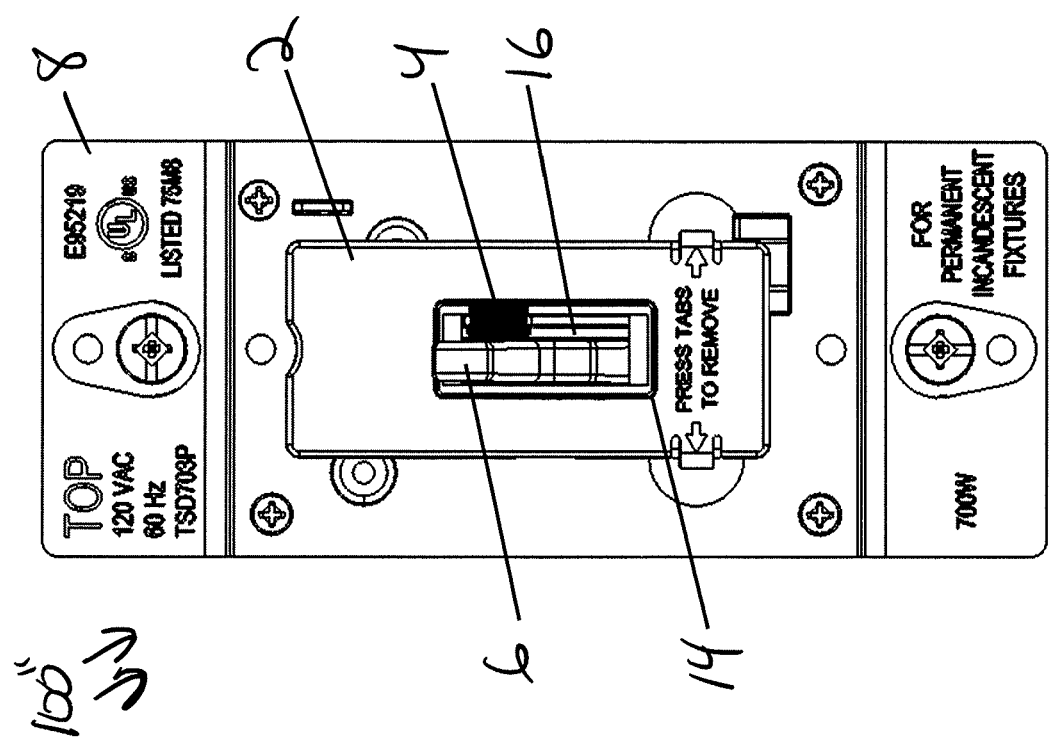

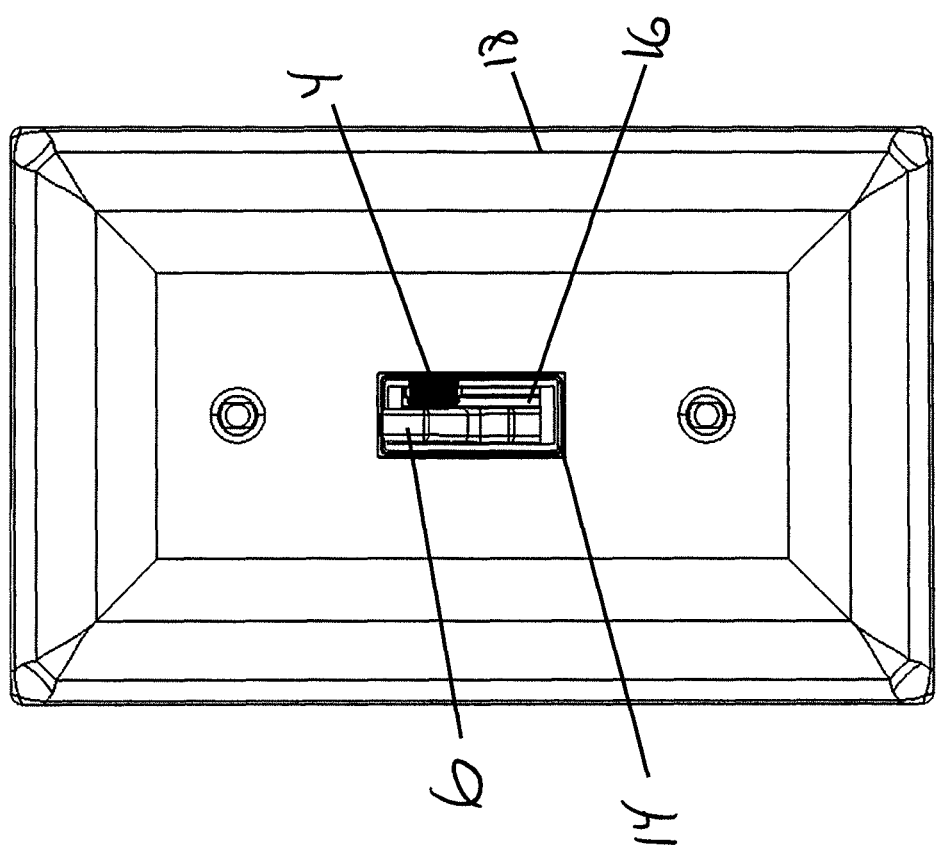

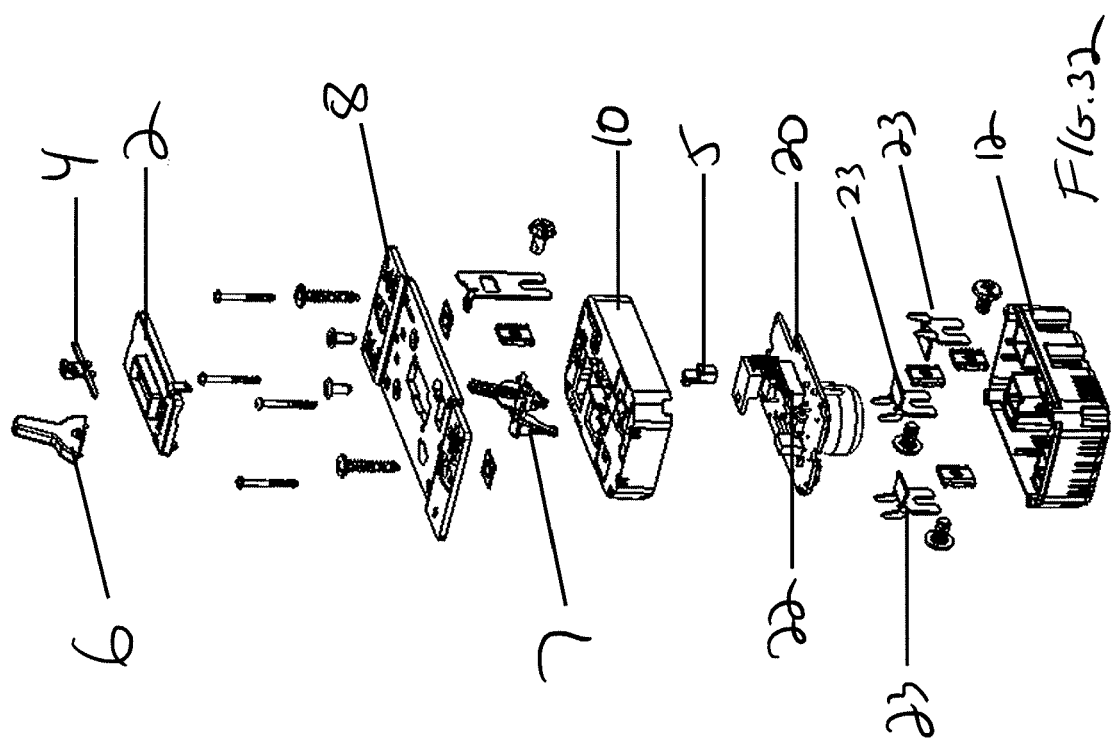

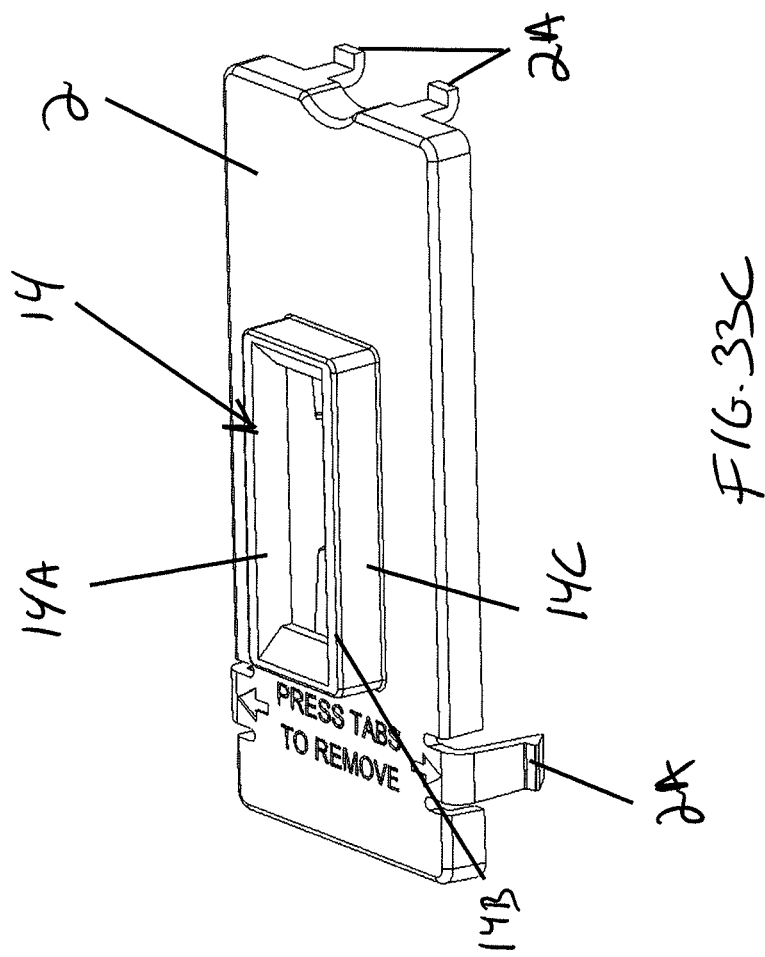

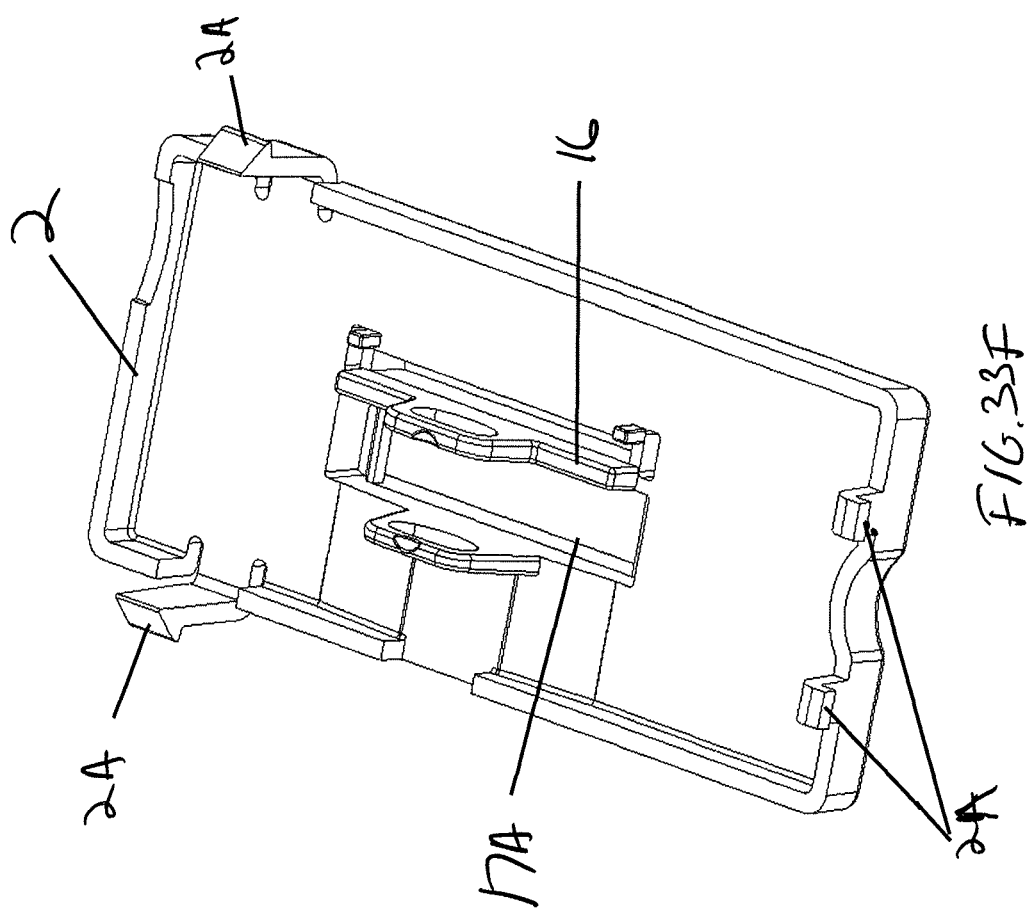

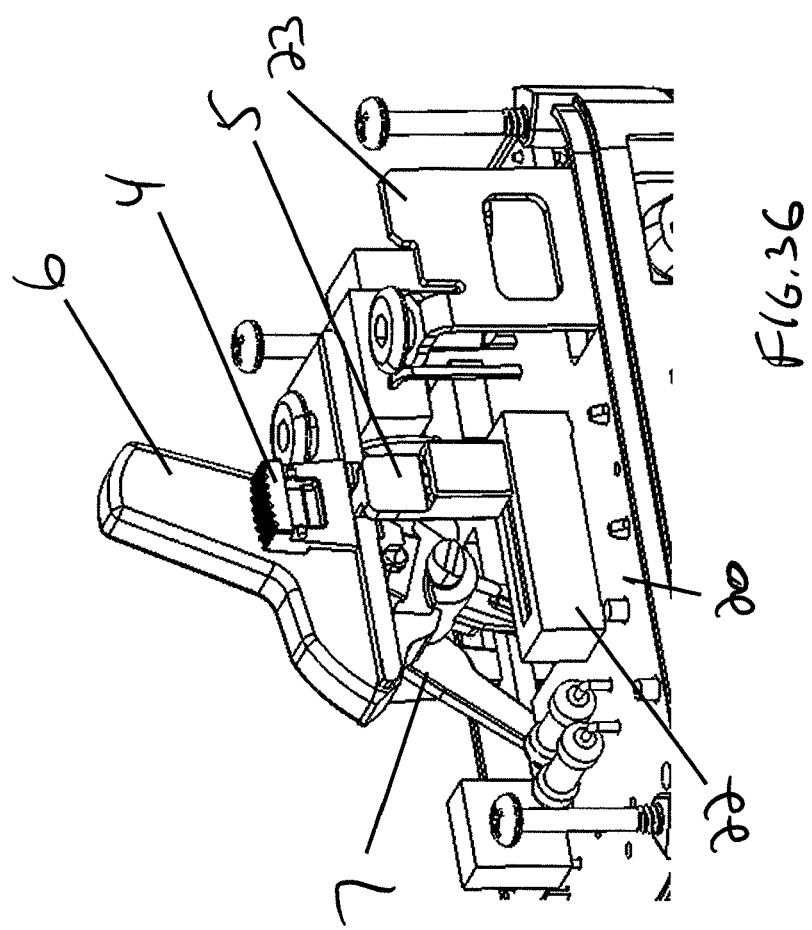

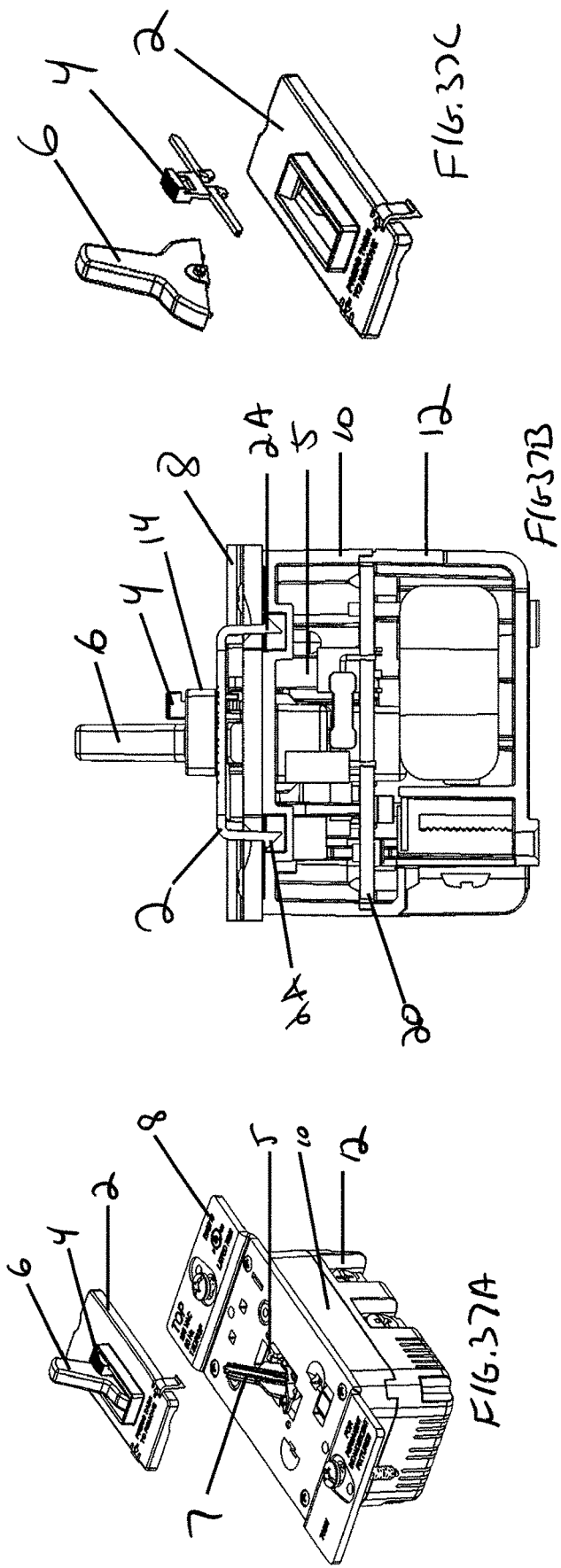

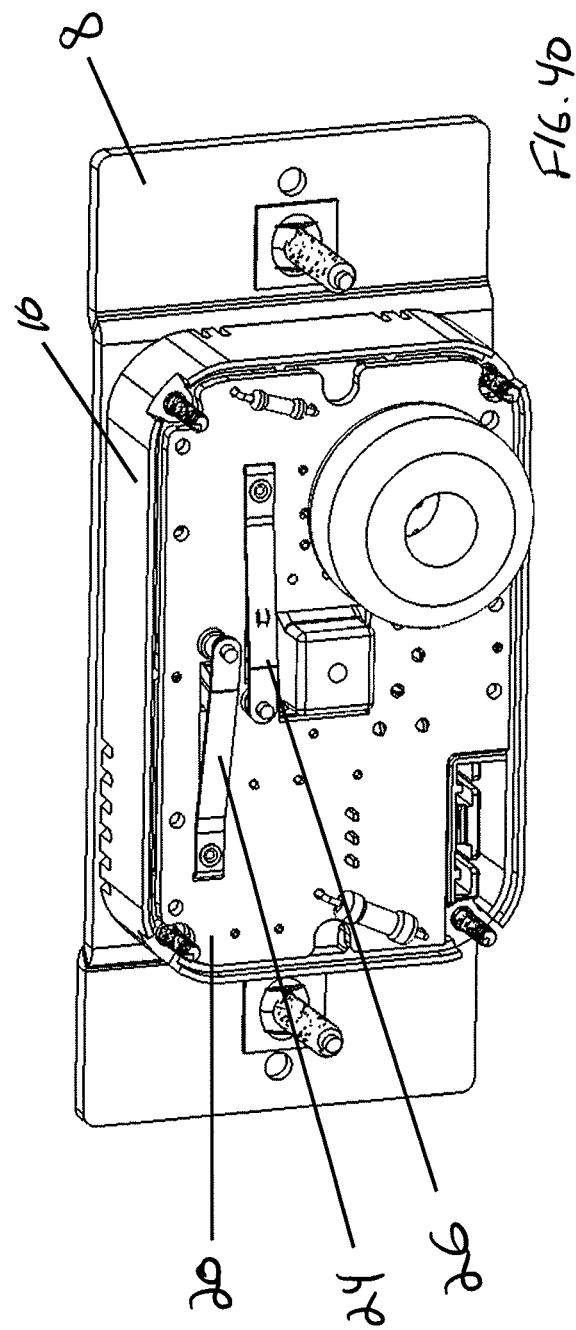

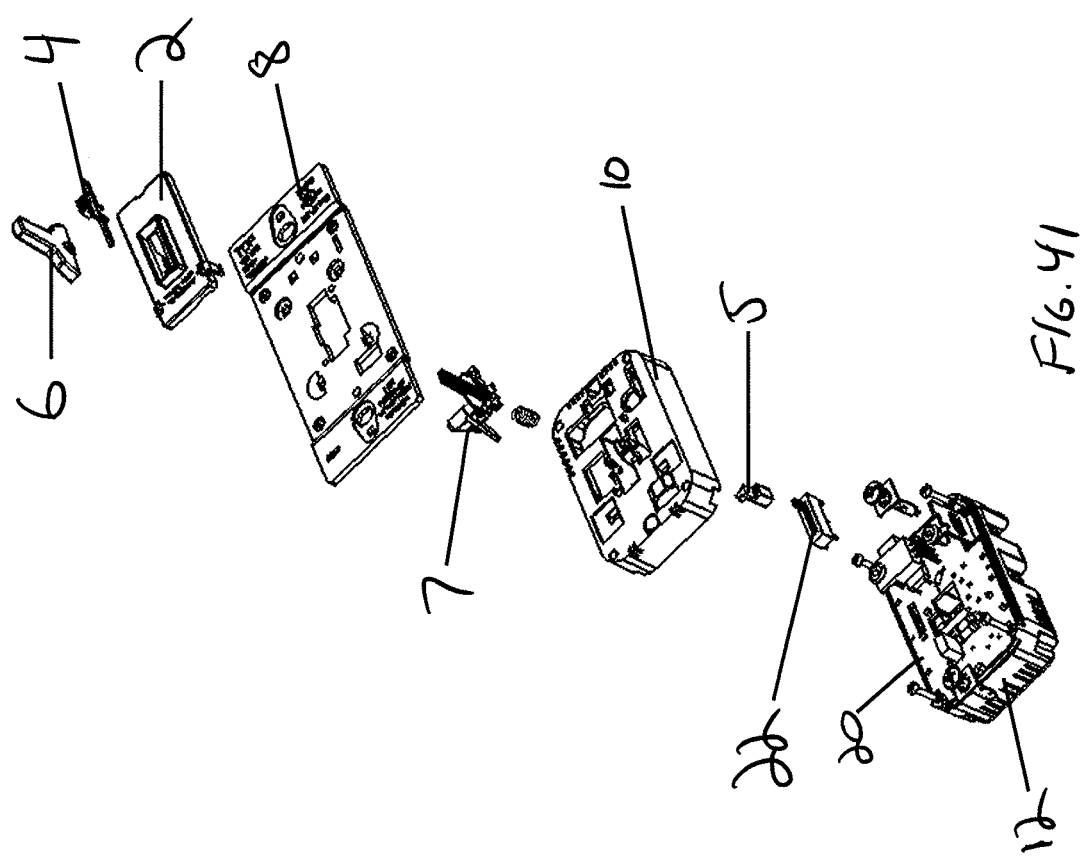

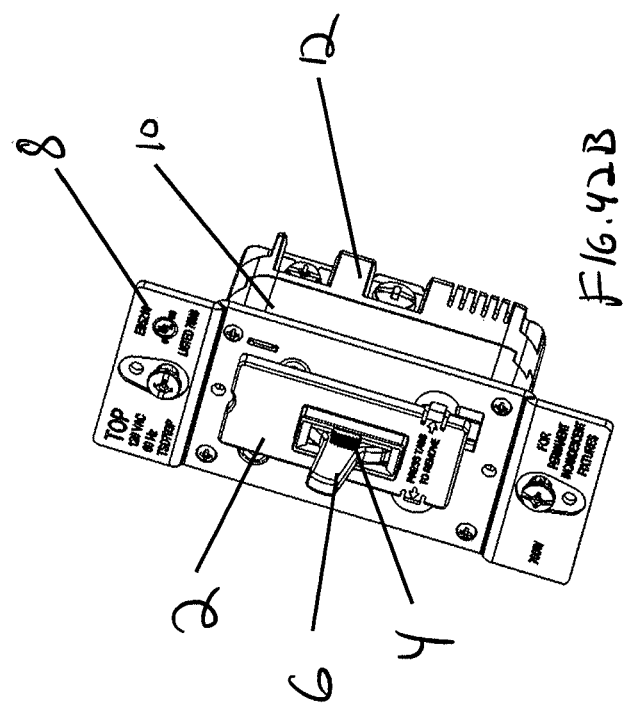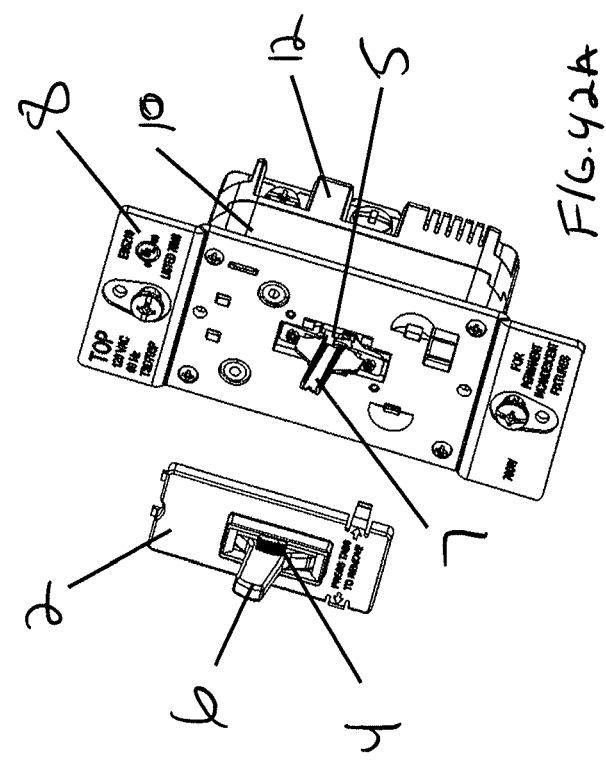

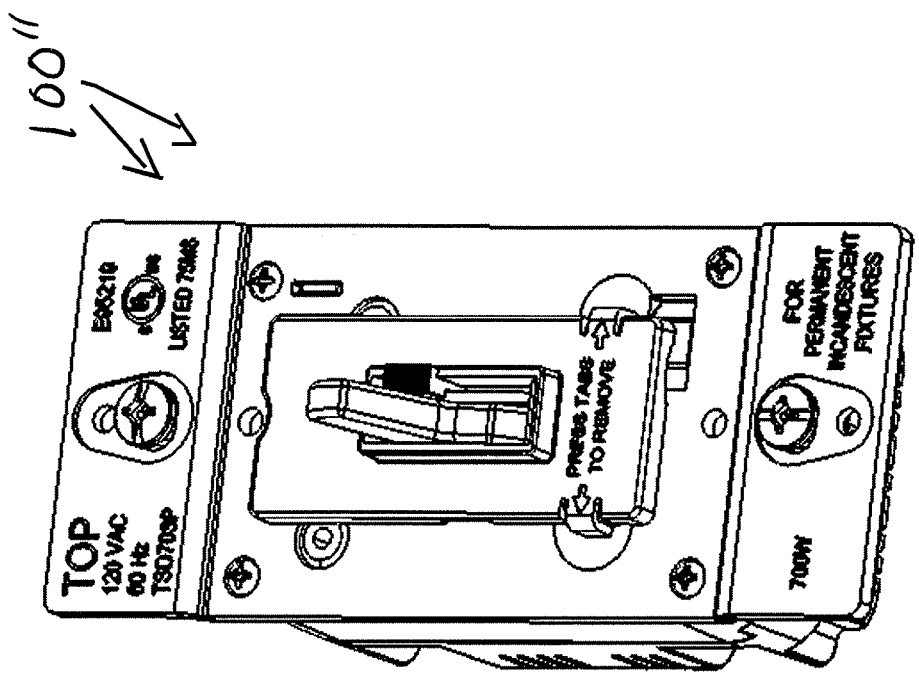

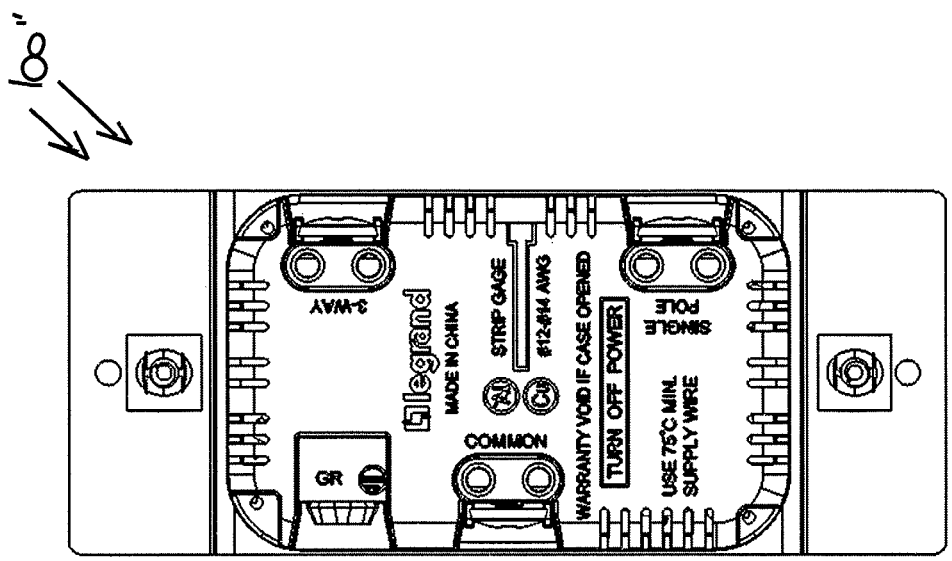

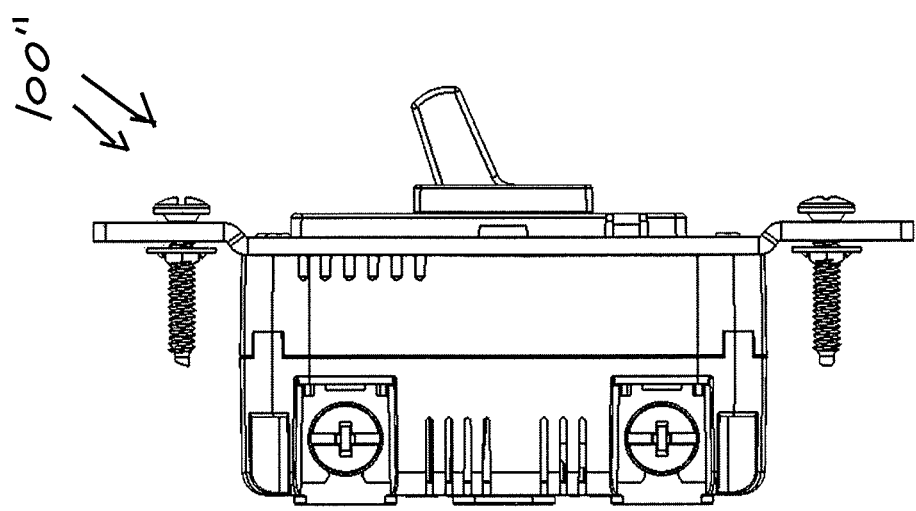

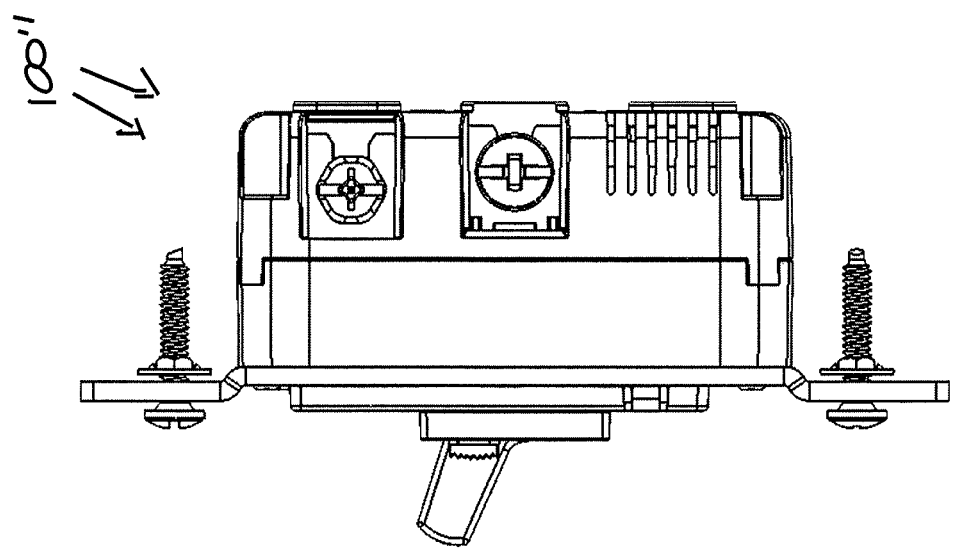

TOGGLE SWITCH AND VARIABLE ACTUATOR CONTROL

CROSS-REFERENCE TO RELATED APPLICATION

The present application claims priority to and the benefit of U.S. Provisional Patent Application No. 62/769,053, filed on Nov. 19, 2018, and of U.S. Provisional Patent Application No. 62/905,587, filed on Sep. 25, 2019, each of which is hereby incorporated by reference herein in its respective entirety.

BACKGROUND OF THE INVENTION

1. Field of the Invention

The present invention relates generally to a lighting control device, and more particularly to a color change kit for a wiring device including a removable toggle switch and/or cover, a removable variable actuator control mechanism, and a removable frame.

2. Description of the Related Art

A toggle switch in combination with a variable actuator control mechanism, e.g., a dimmer, is a device that controls a load with two separate actuators. One of these can be a single pole single throw (SPST) switch or a single pole double throw (SPDT) switch. The SPST is an ON-OFF switch that may be connected to a single electrical load or multiple loads in parallel. The SPDT switch may be employed to switch between two loads, i.e., when one load is ON, the other load is OFF, and vice-versa. Two SPDT switches may be employed in combination to control a single load from two separate locations. In each of these examples, a load, such as a lighting device, is either ON or OFF. In addition to the toggle switch, many consumers often prefer a control mechanism that includes a variable actuator control mechanism configured to efficiently control the amount of power being provided to the a, e.g., the intensity of the emitted light. The user may adjust the variable actuator control mechanism setting as needed or as desired. Some variable actuator control mechanisms include automatic variable actuator controls that adjust the light intensity based on ambient light conditions.

Additional background information on toggle switches in combination with a variable actuator control mechanisms can be found, for example, in U.S. Pat. No. 8,643,220.

Conventional wiring devices that include toggle switches in combination with a variable actuator control mechanisms, also include housings and/or frames with an upper surface on or through which the toggle switches in combination with a variable actuator control mechanisms are placed. It is recognized that portions of the upper surface of the frame and/or housing and toggle switch/variable actuator control mechanism are visible to a user/consumer when in use in a structure, whether or not a wall plate is also in use, and that these portions can have an aesthetic appeal. It is also recognized that it may be desirable for these visible portions to be of the same or similar/complimentary color as the surrounding wall and/or wall plate. In such a configuration, a color change kit can make it easy to change out the visible portions (e.g., frame and/or housing and toggle switch/variable actuator control mechanism) for different colored portions that are the same or similar/complimentary color as the surrounding wall and/or wall plate.

Additional background information on wiring devices with color change kits can be found, for example, in U.S. Pat. No. 8,941,021.

There is a need for an improved color change kit that does not require the variable actuator control mechanism to be in a certain position prior to removal of the color change kit.

Description of the Related Art Section Disclaimer: To the extent that specific patents/publications/products are discussed above in this Background Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Background Section and/or throughout the application, the descriptions/disclosures of which are all hereby incorporated by reference into this document in their respective entirety(ies).

BRIEF SUMMARY OF THE INVENTION

It is therefore a principal object and advantage of the present invention to provide a wiring device with a color change kit that eliminates one or more of the problems/issues discussed above. In particular, the present disclosure is directed to inventive devices and systems structured and/or configured to allow the easy removal of a color change kit without the need to move the variable actuator control mechanism to a certain position prior to removal of the color change kit. A particular non-limiting goal of the utilization of the embodiments and implementations herein is to provide a wiring device including, but not limited to, a housing, an internal mechanical and electrical mechanism, a toggle switch, a variable actuator control mechanism/dimmer slider, and a frame. The wiring device can include a color change kit including, but not limited to, a removable toggle switch cover, a removable variable actuator control mechanism/dimmer slider, and a removable frame.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the invention will be apparent from and elucidated with reference to the embodiment(s) described hereinafter.

BRIEF DESCRIPTION OF THE SEVERAL VIEWS OF THE DRAWING(S)

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments. Reference is now made briefly to the accompanying drawings, in which:

FIG. 9A is a perspective view schematic representation of an assembled wiring device with a separately assembled color change kit and without a wall plate, according to an alternative embodiment.

FIG. 9B is a sectional view schematic representation of the assembled wiring device (along A-A of FIG. 9A) with a color change kit and without a wall plate (which is provided to show certain internal parts), according to an alternative embodiment.

FIG. 9C is a perspective exploded view schematic representation of the color change kit shown in FIG. 9A, according to an alternative embodiment.

FIG. 10A is another sectional view schematic representation of the assembled wiring device and color change kit shown in FIG. 9A, according to an alternative embodiment.

FIG. 10B is a perspective view schematic representation of the wiring device and color change kit with various elements removed to show certain internal parts, according to an alternative embodiment.

FIG. 11A is a side sectional view schematic representation of the assembled wiring device (along B-B of FIG. 9A) with a color change kit and without a wall plate (which is provided to show certain internal parts), according to an alternative embodiment.

FIG. 11B is a side sectional view schematic representation of the assembled wiring device (similar to FIG. 11A), according to an alternative embodiment.

FIG. 12 is a perspective underside view schematic representation of the wiring device with the bottom portion of the housing removed is provided to show certain internal parts, according to an embodiment.

FIG. 13 is an exploded view schematic representation of the wiring device with the color change kit of FIG. 9A, according to an alternative embodiment.

FIG. 15A is a perspective view schematic representation of an assembled wiring device with a color change kit and without a wall plate, according to an alternative embodiment.

FIG. 15B is a front view schematic representation of the assembled wiring device with the color change kit and without a wall plate of FIG. 15A, according to an alternative embodiment.

FIG. 15C is a front view schematic representation of the assembled wiring device 100' with the color change kit of FIG. 15A, according to an alternative embodiment.

FIG. 18 is an exploded view schematic representation of the wiring device with the color change kit of FIG. 15A, according to an alternative embodiment.

FIG. 19D is a top view schematic representation of the frame of the color change kit of FIG. 15A, according to an alternative embodiment.

FIG. 19E is a perspective view schematic representation of the frame of the color change kit of FIG. 15A, according to an alternative embodiment.

FIG. 20 is an end sectional view schematic representation of the assembled wiring device with a color change kit of FIG. 15A, according to an alternative embodiment.

FIG. 21 is a perspective view schematic representation the wiring device of FIG. 15A is shown with various elements removed, according to an alternative embodiment.

FIG. 22 is a close up perspective view schematic representation of the wiring device of FIG. 15A with various elements removed, according to an alternative embodiment.

FIG. 23A is a perspective view schematic representation of the assembled color change kit and the remainder of the assembled wiring device of FIG. 15A (without a wall plate), which are separately shown according to an alternative embodiment.

FIG. 23B is an end sectional view schematic representation of the assembled wiring device with a color change kit and without a wall plate of FIG. 23A, according to an alternative embodiment.

FIG. 23C is an exploded view schematic representation of the color change kit of FIG. 23A, according to an alternative embodiment.

FIG. 25A is a side sectional view schematic representation of the assembled wiring device with a color change kit of FIG. 23A (without a wall plate), which is provided to show certain internal parts according to an alternative embodiment.

FIG. 25B is a side sectional view schematic representation of the assembled wiring device with a color change kit of FIG. 23A (without a wall plate), which is provided to show certain internal parts according to an alternative embodiment.

FIG. 27 is an exploded view schematic representation of the wiring device with the color change kit of FIG. 23A, according to an alternative embodiment.

FIG. 29B is a front view schematic representation of the assembled wiring device with the color change kit and without a wall plate of FIG. 29A, according to an alternative embodiment.

FIG. 29C is a front view schematic representation of the assembled wiring device with the color change kit of FIG. 29A with a wall plate, according to an alternative embodiment.

FIG. 32 is an exploded view schematic representation of the wiring device with the color change kit of FIG. 29A, according to an alternative embodiment.

FIG. 33C is a perspective view schematic representation of the frame of the color change kit of an embodiment of the wiring device, according to an alternative embodiment.

FIG. 33F is a perspective backside view schematic representation of the frame 2 of the color change kit, according to an alternative embodiment.

FIG. 36 is a close up perspective view schematic representation of the wiring device of FIG. 29A with various elements removed, according to an alternative embodiment.

FIG. 37A is a perspective view schematic representation of the assembled color change kit and the remainder of the assembled wiring device of FIG. 29A (without a wall plate) being separately shown, according to an alternative embodiment.

FIG. 37B is an end sectional view schematic representation of the assembled wiring device with a color change kit (without a wall plate), according to an alternative embodiment.

FIG. 37C is an exploded view schematic representation of the color change kit of FIG. 37A, according to an alternative embodiment.

FIG. 40 is a perspective underside view schematic representation of the wiring device with the bottom portion of the housing removed, according to an alternative embodiment.

FIG. 41 is an exploded view schematic representation of the wiring device with the color change kit of FIG. 37A, according to an alternative embodiment.

FIG. 42A is a perspective view schematic representation of the wiring device (similar to FIG. 37A) with a fully assembled color change kit is shown separately from the otherwise fully assembled wiring device, according to an alternative embodiment.

FIG. 42B is a perspective view schematic representation of the wiring device 100" with a fully assembled color change kit shown as part of the fully assembled wiring device (without a wall plate), according to an alternative embodiment.

FIG. 43A is a front perspective view schematic representation of a fully assembled wiring device, according to an alternative embodiment.

FIG. 43B is a back/rear side view schematic representation of a fully assembled wiring device, according to an alternative embodiment.

FIG. 43C is a first side view schematic representation of a fully assembled wiring device, according to an alternative embodiment.

FIG. 43D is a second side view schematic representation of a fully assembled wiring device, according to an alternative embodiment.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Certain structural, functional and electrical aspects of embodiments of the present invention are similar to embodiments of the protective wiring device described and illustrated in U.S. Pat. No. 8,643,220. Those similarities should be understood by a person of ordinary skill in the art in conjunction with a review of this disclosure and accompanying drawings in conjunction with the published application, and are not further discussed in detail herein. Certain differences, including various inventive features of embodiments of the present invention, which are directed to embodiments of a color change kit, are further briefly described herein and below with reference to the accompanying drawings.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements. If elements are shown in a particular Figure discussed below are not specifically identified with respect to that Figure, the elements should be sufficiently identified with respect to at least one other Figure.

Figure 1A:
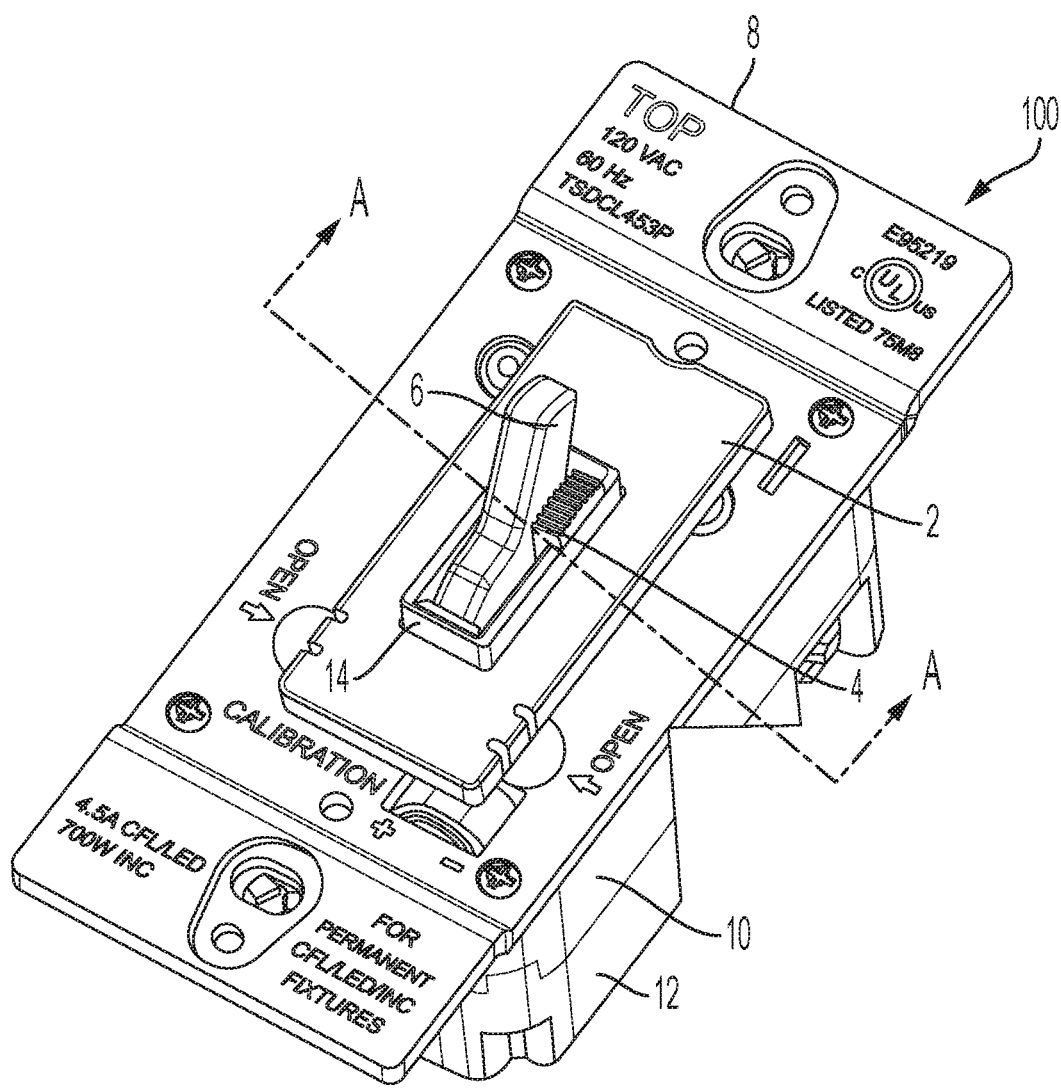
FIG. 1A is a front perspective view schematic representation of an assembled wiring device with a color change kit and without a wall plate, according to an embodiment.

Referring now to FIG. 1A, a perspective view schematic representation of an assembled wiring device 100 with a color change kit and without a wall plate of an embodiment of the present invention is shown. The illustrated color change kit includes the following removable elements—toggle switch cover 6, a variable actuator control mechanism/dimmer slider 4 and a frame 2 with a bezel 14. Portions of the color change kit are shown positioned over and/or through a planar or plate shaped heat sink or metal mounting strap 8 and a housing including a top portion 10 and a bottom portion 12.

Figure 1B:
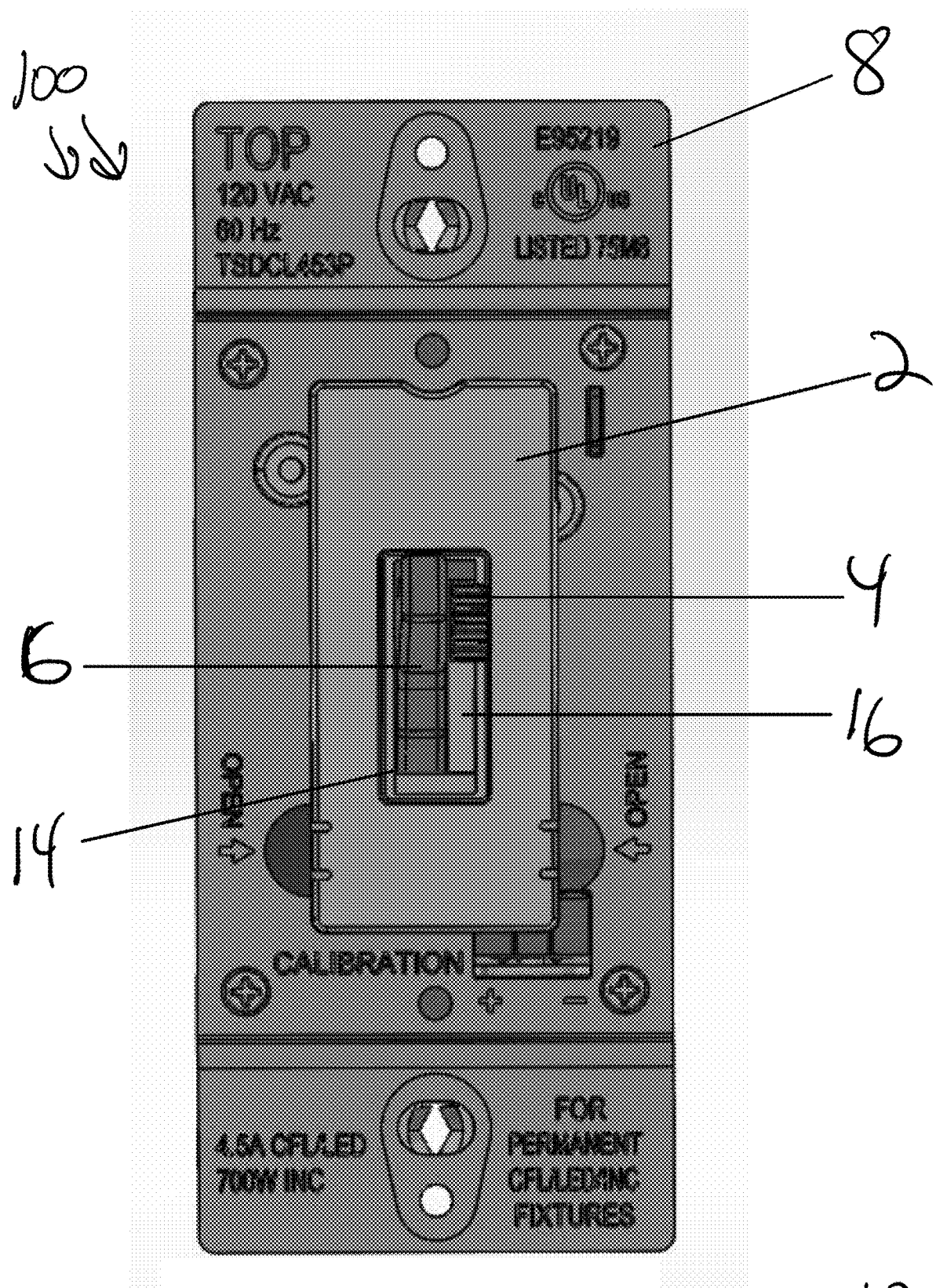
FIG. 1B is a front view schematic representation of the assembled wiring device with the color change kit and without a wall plate of FIG. 1A, according to an embodiment.

Referring to FIG. 1B, a front view schematic representation of the assembled wiring device 100 with the color change kit and without a wall plate of FIG. 1A is shown. Additional shown elements include a recessed separator 16, which acts as a divider between the toggle switch 7 (covered by the toggle switch cover 6), and the variable actuator control mechanism/dimmer slider 4 (each of which are positioned at least partially (which can be fully or not fully) within the perimeter of the bezel 14). The recessed rail 16 is at least partially positioned within the perimeter of the bezel 14 (which can be fully or not fully), and provides a surface on which the variable actuator control mechanism/dimmer slider 4 moves/slides.

Figure 1C:
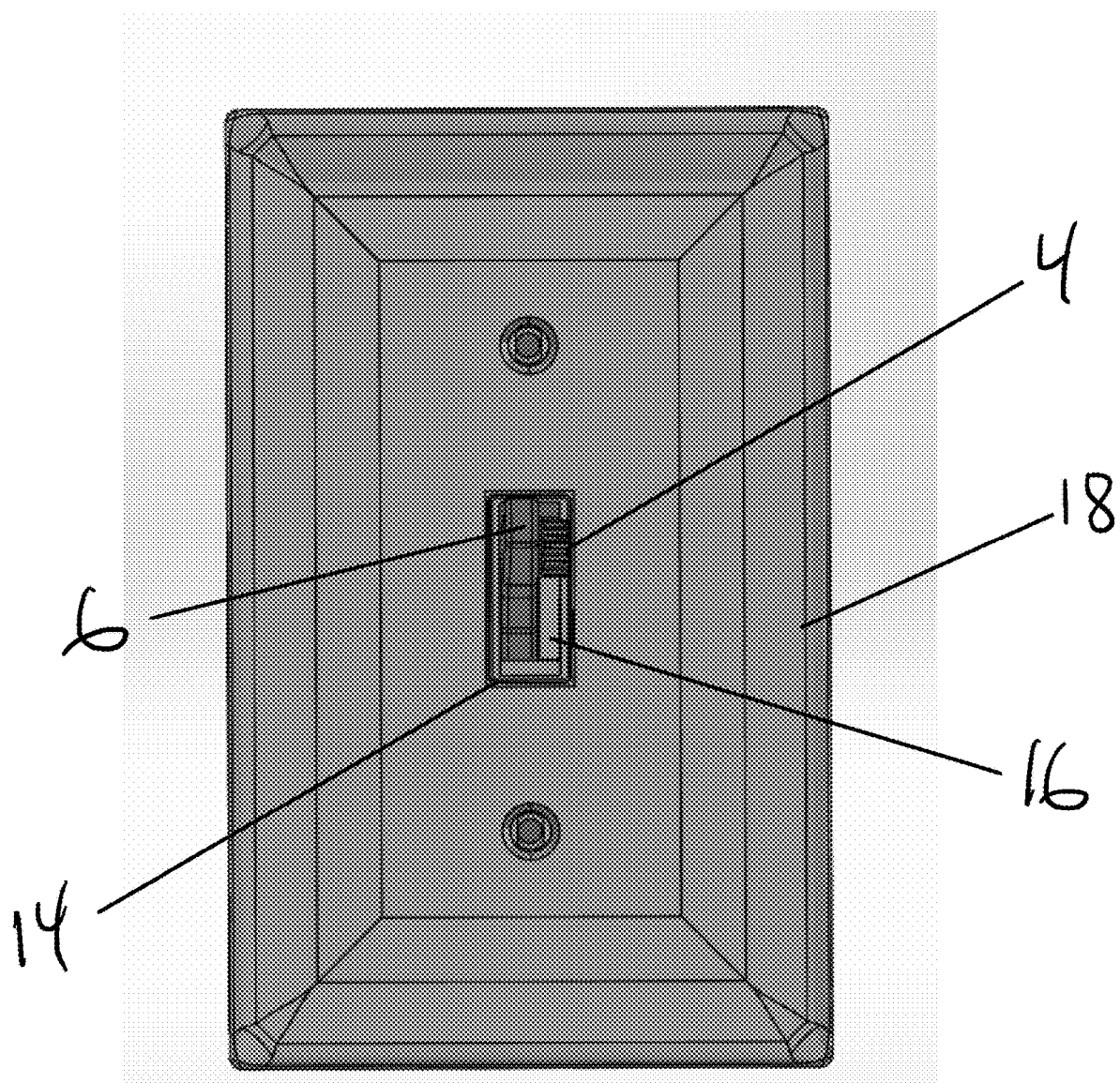
FIG. 1C is a front view schematic representation of the assembled wiring device with the color change kit and with a wall plate, according to an embodiment.

Referring to FIG. 1C, a front view schematic representation of the assembled wiring device 100 with the color change kit of FIG. 1A and with a wall plate 18 is shown.

Figure 2:
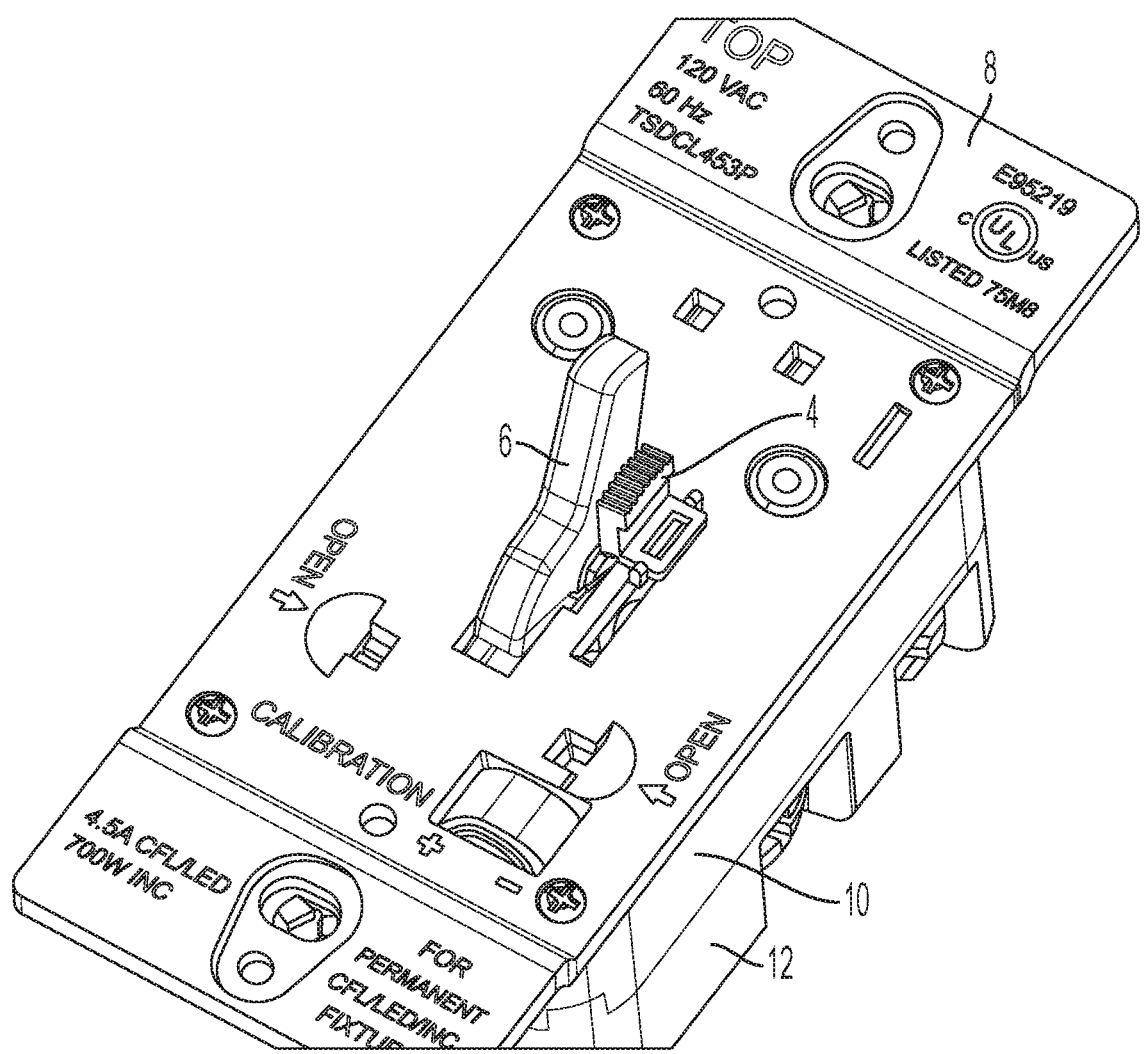
FIG. 2 is a front perspective view schematic representation of the wiring device with the color change kit of FIG. 1A with the frame removed, according to an embodiment.

Referring to FIG. 2, a perspective view schematic representation of the wiring device 100 with the color change kit of FIG. 1A is shown with the frame 2 removed. The removal of frame 2 exposes variable actuator control mechanism/dimmer slider 4.

Figure 3:
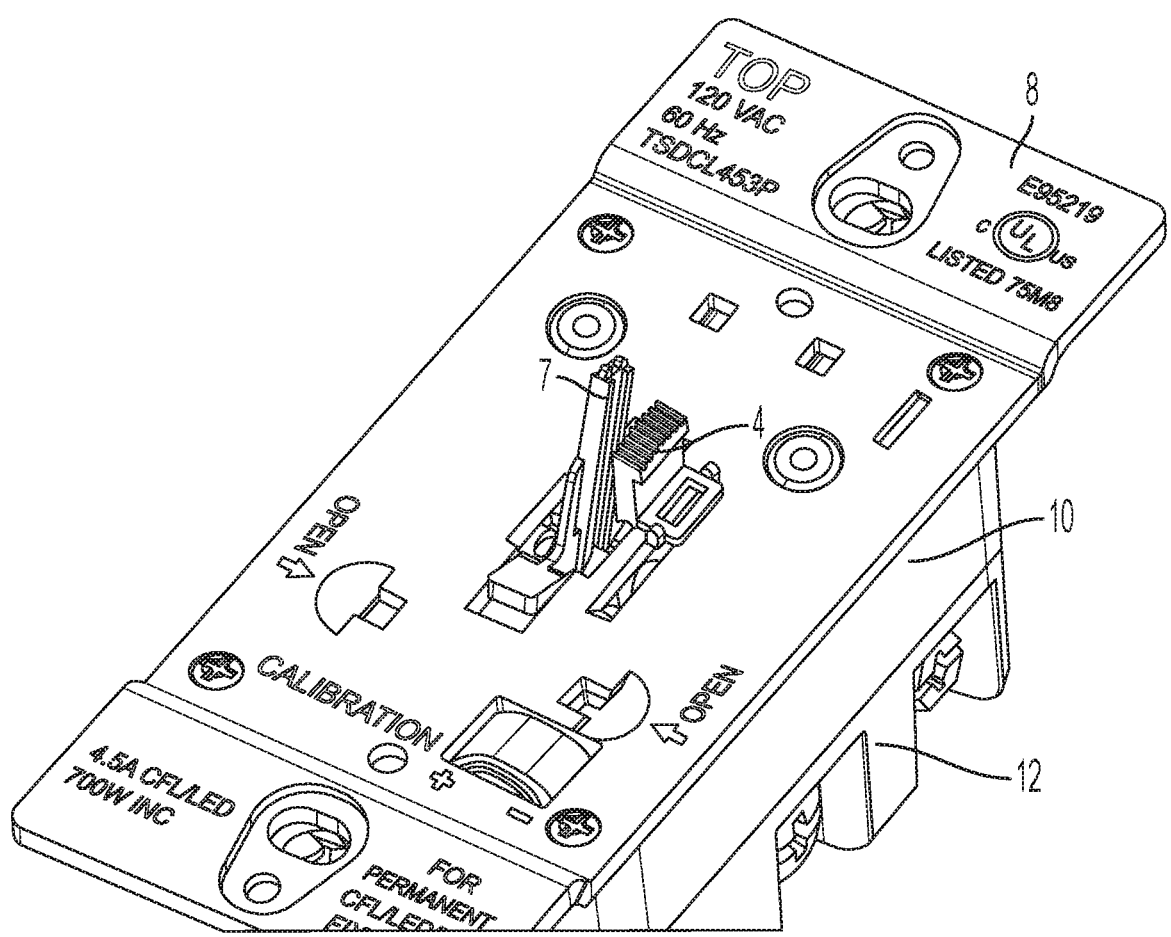
FIG. 3 is a front perspective view schematic representation of the wiring device with the color change kit of FIG. 1A with the frame and toggle switch cover of the color change kit removed, according to an embodiment.

Referring to FIG. 3, a perspective view schematic representation of the wiring device 100 with the color change kit of FIG. 1A is shown with the frame and toggle switch cover of the color change kit removed. The removal of the toggle switch cover 6 exposes the toggle switch 7.

Figure 4:
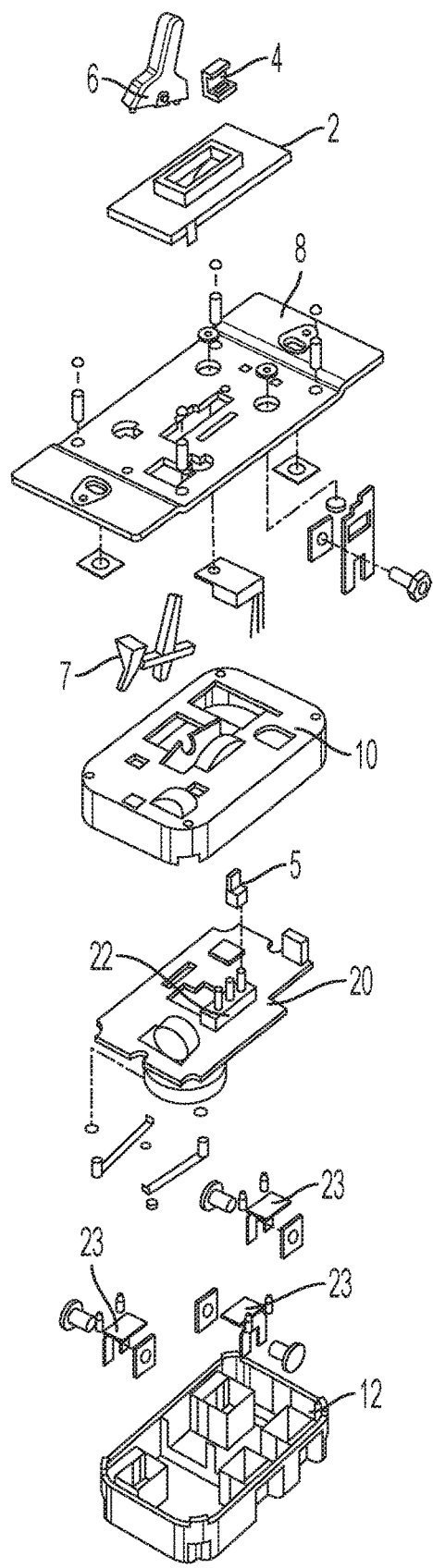
FIG. 4 is an exploded view schematic representation of the wiring device with the color change kit of FIG. 1A, according to an embodiment.

Referring to FIG. 4, an exploded view schematic representation of the wiring device 100 with the color change kit of FIG. 1A is shown. In brief, the toggle switch cover 6, variable actuator control mechanism/dimmer slider 4, frame 2, heat sink/plate 8, toggle switch 7, top housing portion 10, connector 5 (which interfaces between variable actuator control mechanism/dimmer slider 4 and potentiometer 22 to allow for dimming), PCB 20, terminals 23, and bottom housing portion 12 are shown (among other non-color change kit elements of the wiring device).

Figure 5A:
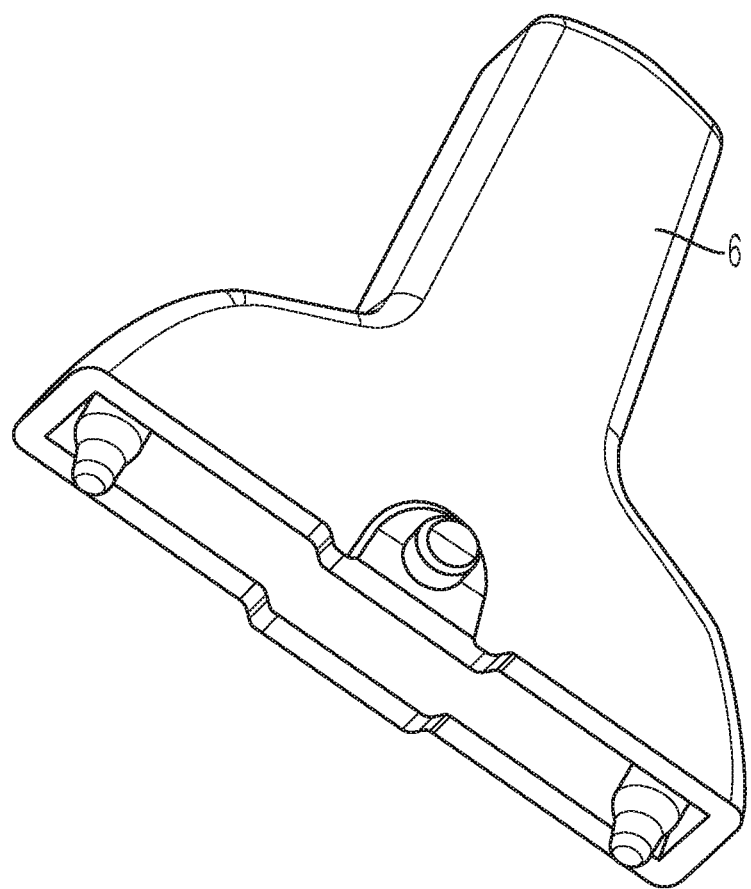
FIG. 5A is a perspective view schematic representation of the toggle switch cover of the color change kit of FIG. 1A, according to an embodiment.

Referring to FIG. 5A, a perspective view schematic representation of the toggle switch cover 6 of the color change kit of an embodiment is shown.

Figure 5B:
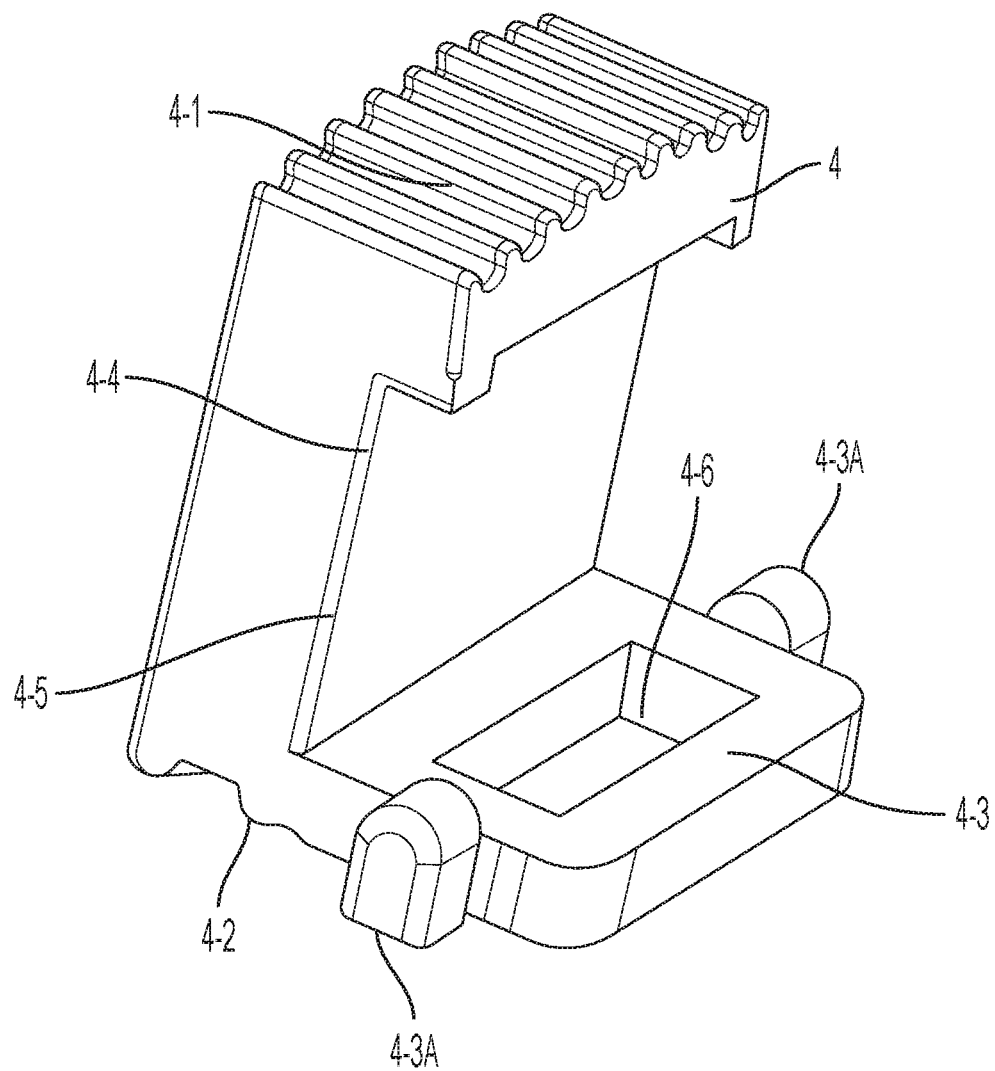
FIG. 5B is a perspective view schematic representation of the variable actuator control mechanism/dimmer slider of the color change kit of FIG. 1A, according to an embodiment.

Referring to FIG. 5B, a perspective view schematic representation of the variable actuator control mechanism/dimmer slider 4 of the color change kit of an embodiment is shown. The variable actuator control mechanism/dimmer slider 4 includes a user contacting top portion/surface 4-1 (which can include ridges for better gripping), a recessed rail contacting portion/surface 4-2 (which is structured to slide along the top surface of the recessed rail 16), shelf portion/surface 4-3 (which is configured to slide along the bottom surface of the frame 2 and/or bezel 14, and which can include at least one end nub portion 4-3A, which can be laterally positioned with respect to the shelf portion/surface 4-3 and extend a bit above the top surface of the shelf portion/surface 4-3 to facilitate better movement along the bottom surface of the frame 2 and/or bezel 14—less friction when moving along the end nub portion(s) 4-3A and not the larger surface area of surface 4-3), a bezel contacting portion/surface 4-4 (which is configured to slide along the top surface of the bezel 14), a plate portion 4-5 that connects the user contacting top portion/surface 4-1 with the other portions of the variable actuator control mechanism/dimmer slider 4, and an aperture 4-6 configured through which a portion of connector 5 can be positioned and moved with the variable actuator control mechanism/dimmer slider 4—when in the assembled condition.

Figure 5C:
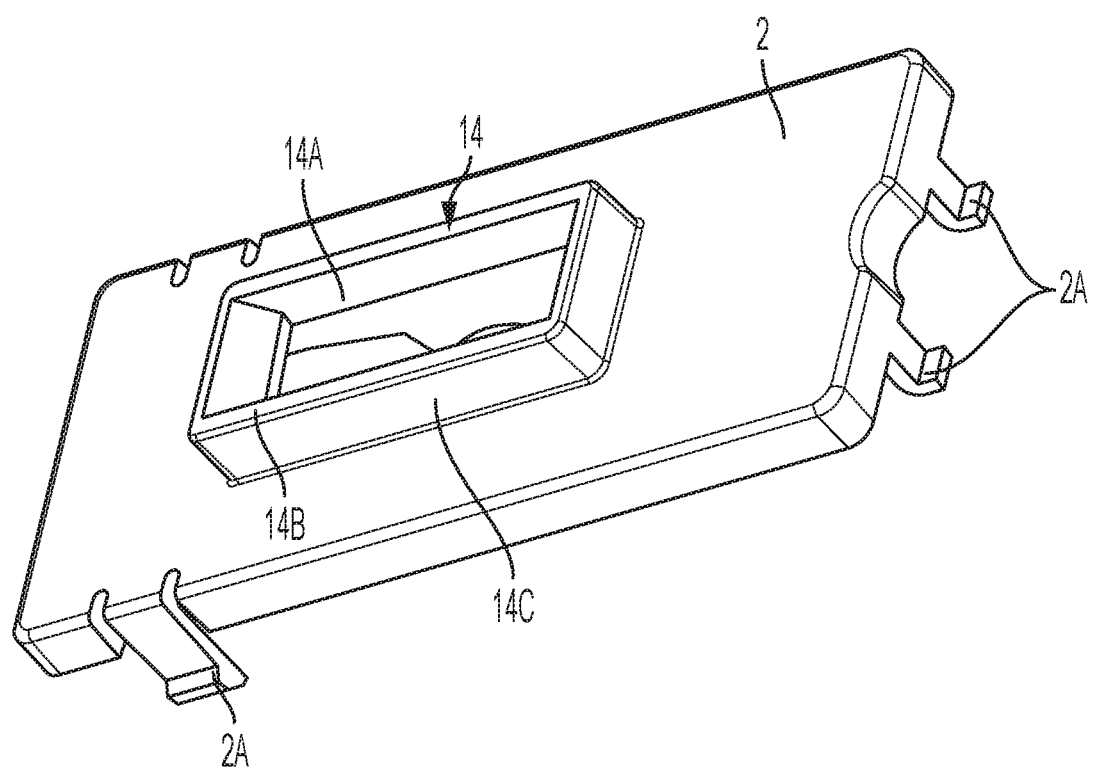
FIG. 5C is a perspective view schematic representation of the frame of the color change kit of the color change kit of FIG. 1A, according to an embodiment.

Referring to FIG. 5C, a perspective view schematic representation of the frame 2 of the color change kit of an embodiment of the wiring device 100 is shown. In brief, snap connectors 2A is shown snapped underneath heat sink/plate 8. Alternatively, snap connectors 2A can snap onto the top portion of the housing 10. Additionally, the top surface 14B, a longitudinal internal edge/side 14A and longitudinal external edge/side 14C of bezel 14 are shown.

Figure 5D:
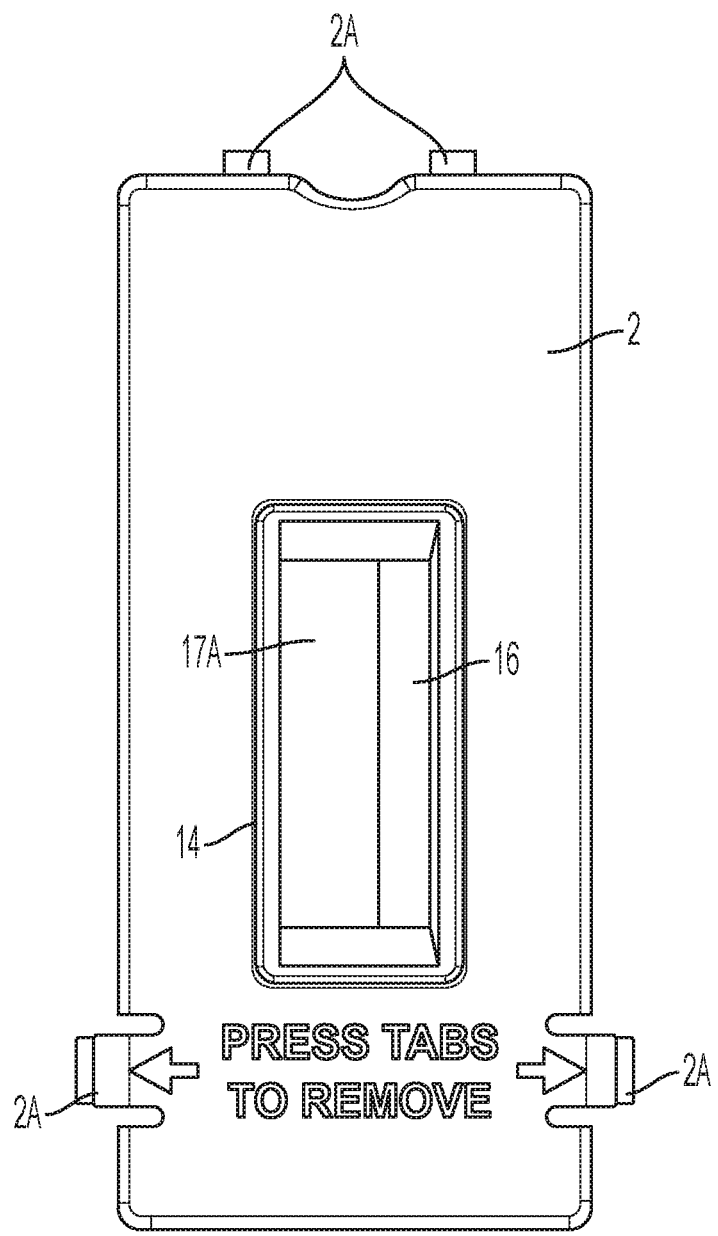
FIG. 5D is a top view schematic representation of the frame of the color change kit of the color change kit of FIG. 1A, according to an embodiment.

Referring to FIG. 5D, a top view schematic representation of the frame 2 of the color change kit of an embodiment is shown. In addition to the elements shown in FIG. 5C, the recessed rail 16 and opening 17A are shown. As discussed above, the recessed rail 16 shown in this FIG. 5D acts as a structure on which the variable actuator control mechanism/dimmer slider 4 can slide (which is not shown, but is positioned within the perimeter of the bezel 14 in an assembled condition/configuration shown in other FIGS.), and creates the two separate openings 17A, 17B through the main opening of the bezel (see FIG. 5E).

Figure 5E:
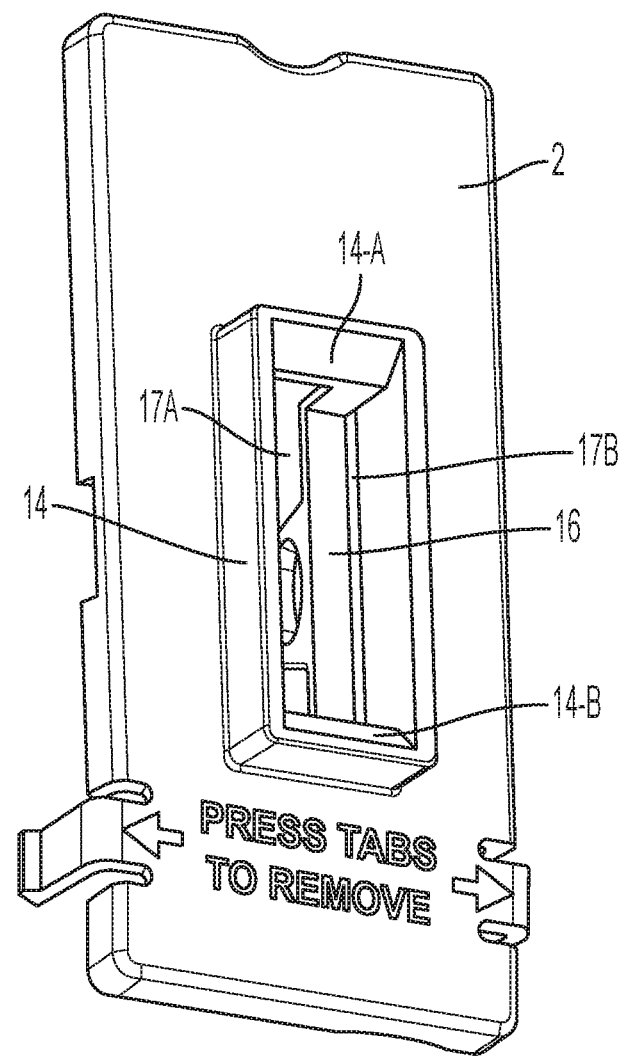
FIG. 5E is another perspective view schematic representation of the frame of the color change kit of the color change kit of FIG. 1A, according to an embodiment.

Referring to FIG. 5E, a perspective view schematic representation of the frame 2 of the color change kit of an embodiment of the wiring device 100 is shown. The angled view of this FIG. 5E shows the recessed rail 16 partially positioned within the boundary created by the bezel 14, thus creating the two separate openings 17A, 17B. Angle portions 14-A and 14-B are shown extending from the interior surface of the bezel 14 at an angle, and are attached to the recessed rail 16. These angled portions can be integrally formed with the bezel 14 (and/or recessed rail 16) or can be separate pieces attached to the recessed rail 16 and/or the interior surface of the bezel 14 at various points to further control the travel and/or movement of the variable actuator control mechanism/dimmer slider 4 and toggle switch cover 6/toggle switch 7 beyond the distance/displacement control mechanisms/structural configurations of the dimmer slider 4 and toggle switch cover 6/toggle switch 7.

Figure 5F:
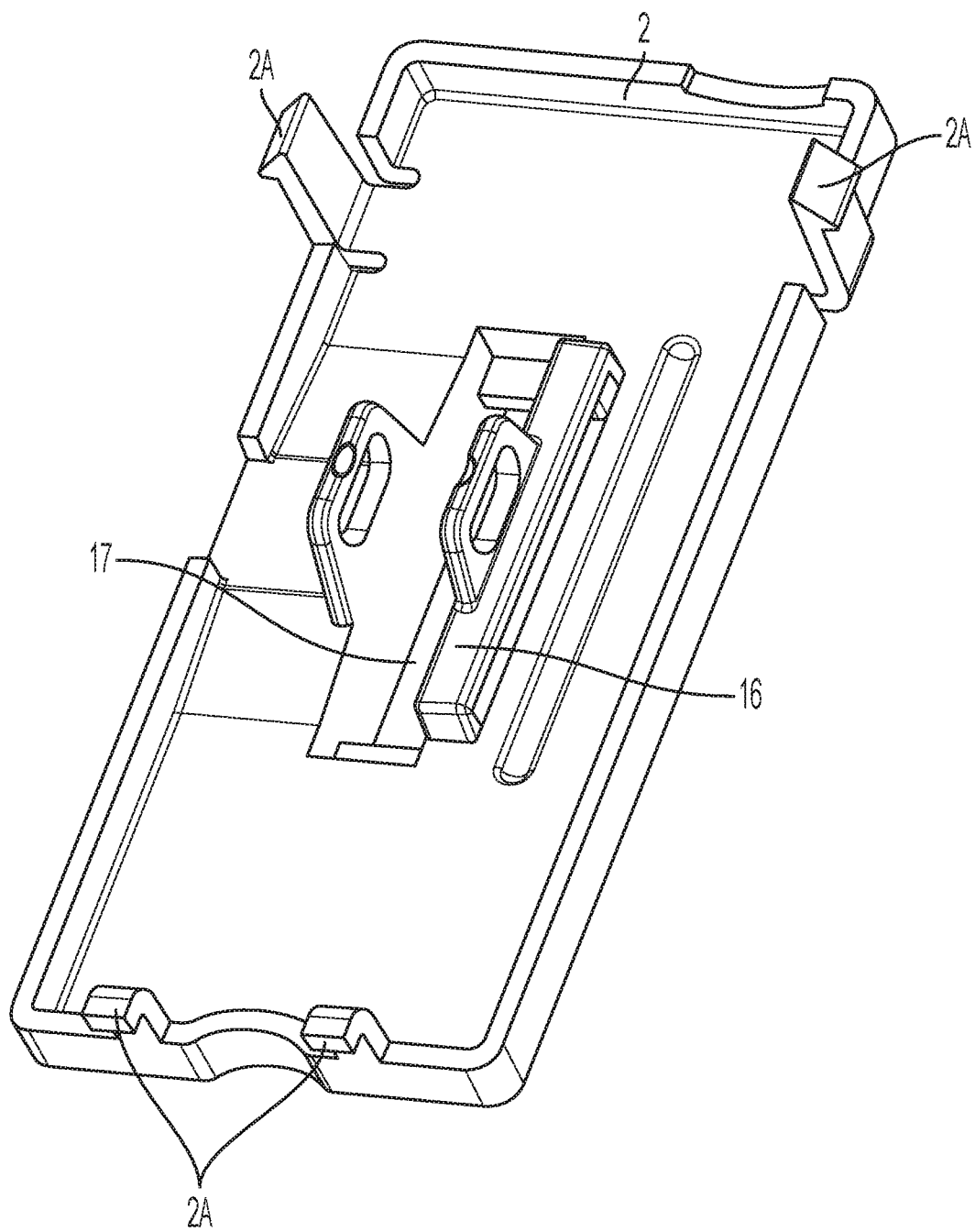
FIG. 5F is a back/rear perspective view schematic representation of the frame of the color change kit of the color change kit of FIG. 1A, according to an embodiment.

Referring to FIG. 5F, a perspective backside view schematic representation of the frame of the color change kit of an embodiment is shown, which, along with FIGS. 5D and 5E, also shows a rail that spits the bezel opening in two (as discussed above). A separator piece (not shown) can be included as part of the bezel portion of the frame (or of the rail 16) that also spits the opening in two, and extend up between the toggle switch and the dimmer slider (when each is positioned in the split opening). However, in one embodiment, the separator piece does not extend up to the top surface of the bezel; the top surface of the separator piece can end prior to the top surface of the bezel. The separator piece can be planar and can extend in a plane that is substantially coplanar with at least one longitudinal edge of the bezel.

Figure 6:
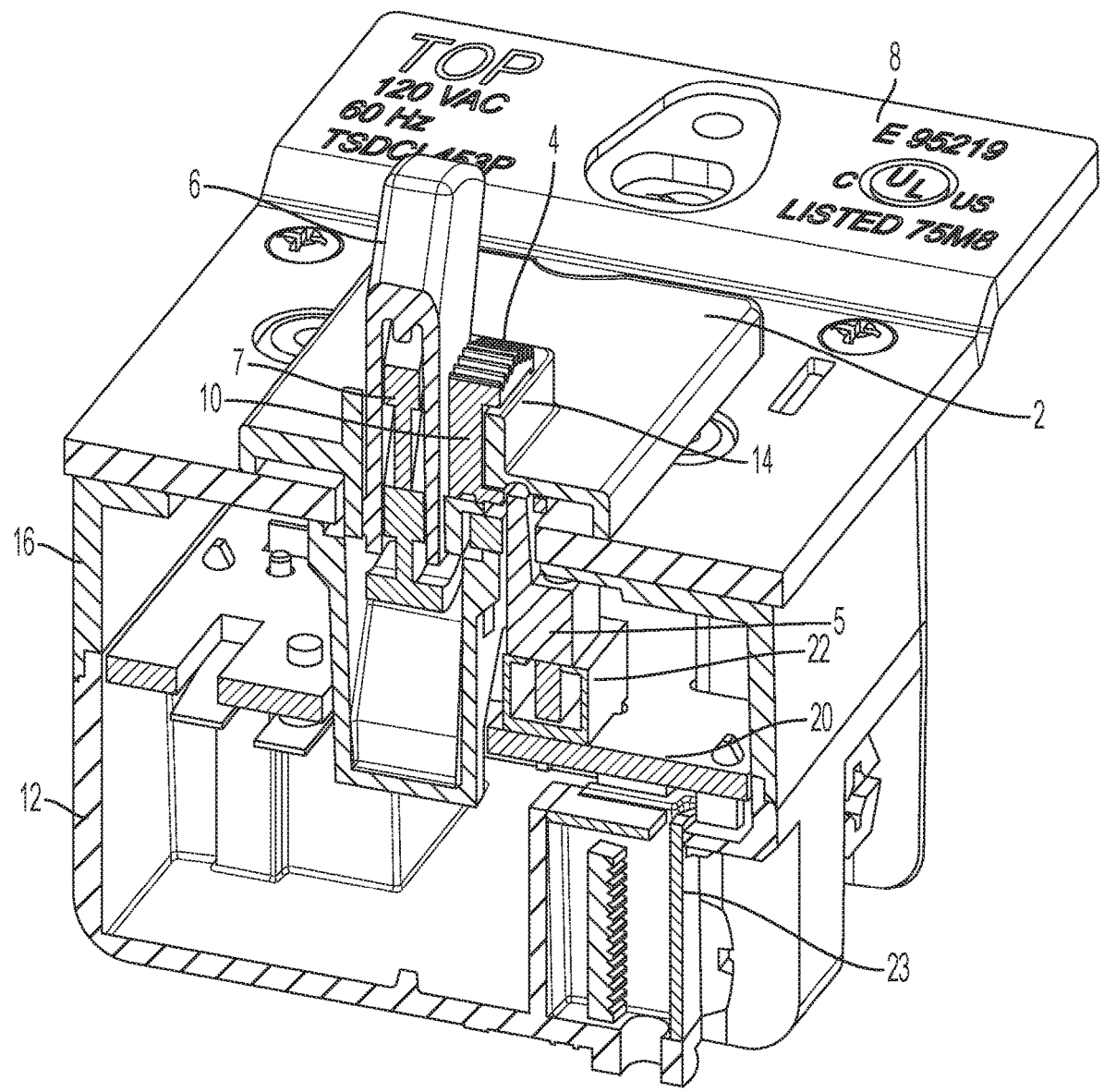
FIG. 6 is a sectional view schematic representation of the wiring device taken along A-A of FIG. 1A, according to an embodiment.

Referring to FIG. 6, an end sectional view schematic representation of the assembled wiring device 100 with a color change kit taken along A-A of FIG. 1A is shown with elements previously identified.

Figure 7:
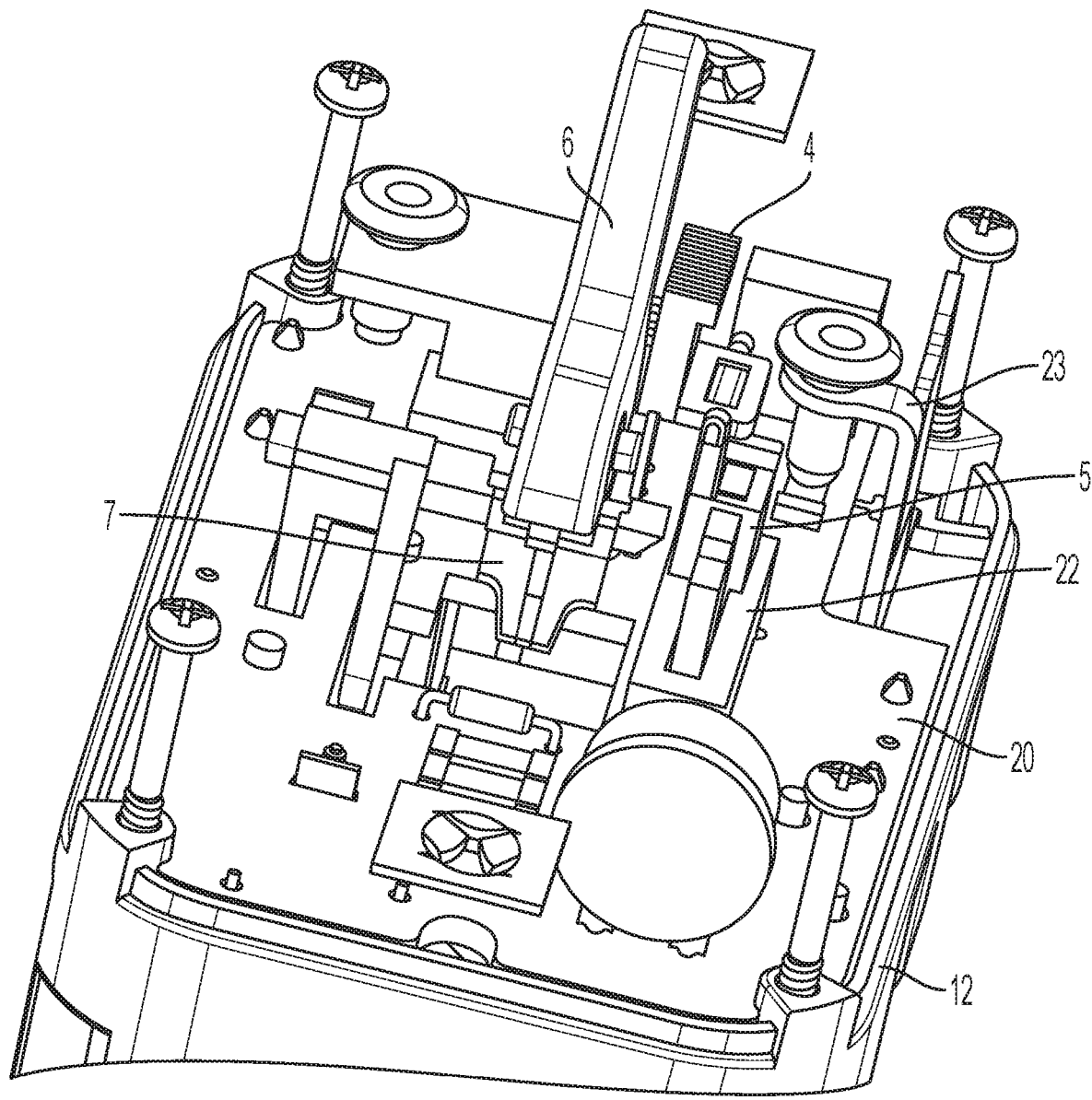
FIG. 7 is a perspective view schematic representation of the wiring device of FIG. 1A with various elements removed to show certain internal parts, according to an embodiment.

Referring to FIG. 7, a perspective view schematic representation the wiring device 100 of FIG. 1A is shown with various elements removed to show certain previously identified internal parts.

Figure 8:
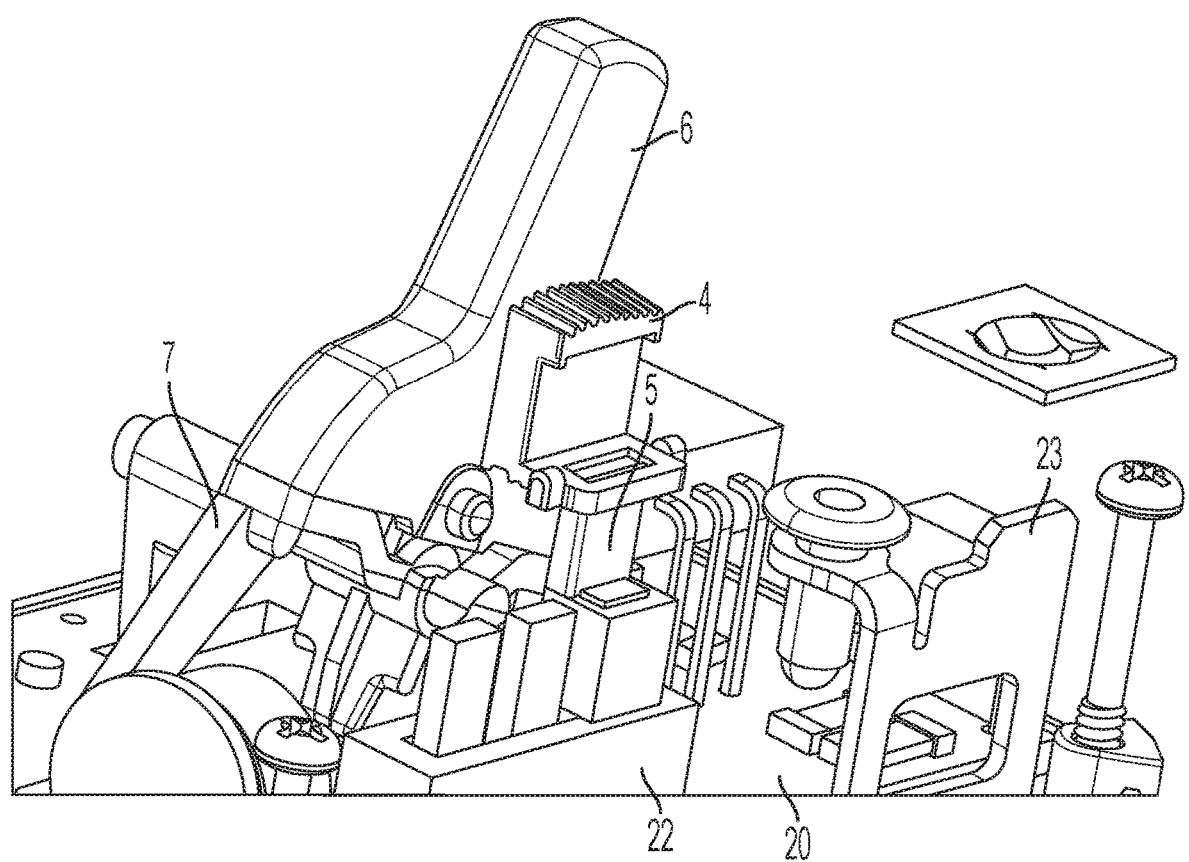
FIG. 8 is a close up perspective view schematic representation of the toggle switch and the dimmer slider of the wiring device of FIG. 1A, according to an embodiment.

Referring to FIG. 8, a close up perspective view schematic representation of the wiring device 100 of FIG. 1A with various elements removed to show certain previously identified internal parts.

FIGS. 9A-13 show schematic representations of an alternative embodiment of a wiring device 200 with a color change kit. The illustrated color change kit includes the following removable elements—toggle switch cover 6, a variable actuator control mechanism/dimmer slider 4 and a frame 2. Portions of the color change kit are shown positioned over and/or through a planar or plate shaped heat sink or metal mounting strap 8 and a housing. In this alternative embodiment, the frame 2 and the dimmer slider 4 are structurally different as compared to the previous or subsequent embodiments described and illustrated herein. The frame 2 has a first opening (which can, but does not have to be bezelled) for the toggle switch cover 6 and toggle switch 7 and a second opening for the dimmer slider 4. Besides the alternative frame 2 and dimmer slider 4 embodiments, all other structural features of the wiring device 200 with the color change kit are essentially the same as the configuration of the wiring device 100 with the color change kit as shown and described with respect to FIGS. 1A-8. As such, the duplicate elements will not be repeatedly described herein below with respect to FIGS. 9A-13.

Referring to FIG. 9A, a perspective view schematic representation of the assembled color change kit (including the toggle switch cover 6, the variable actuator control mechanism/dimmer slider 4 and the frame 2), and the remainder of the assembled wiring device 200 (without a wall plate) are separately shown.

Referring to FIG. 9B, an end sectional view schematic representation of the assembled wiring device 200 (along A-A of FIG. 9A) with a color change kit (without a wall plate) is shown. In particular, the frame 2 is shown snapped under heat sink/plate 8 via snap connectors 2A. Other previously identified elements are also shown.

Referring to FIG. 9C, an exploded view schematic representation of the color change kit of FIG. 9A is shown. As shown, this embodiment of the dimmer slider 4 does not include the leg shelf portions/surfaces 4-3, as shown in FIG. 19B with respect to another alternative embodiment (discussed below). Otherwise, the embodiment of the dimmer slider shown in FIGS. 9A-13 are very structurally similar to dimmer slider 4 shown in FIG. 19B. Also, a first bezelled fully framed opening 14-3 and a partially framed second opening 14-2 of the frame 2 are shown.

Referring to FIG. 10A, an end sectional view schematic representation of the assembled wiring device 200 (similar to the sectional view of FIG. 9B) is provided to show certain mechanical and electrical components of the wiring device.

Referring to FIG. 10B, a perspective view schematic representation the wiring device 200 shown with various elements removed is provided to show certain internal mechanical and electrical components of the wiring device.

Referring to FIG. 11A, a side sectional view schematic representation of the assembled wiring device 200 (along B-B of FIG. 9A) with a color change kit (without a wall plate) is provided to show certain internal parts.

Referring to FIG. 11B, a side sectional view schematic representation of the assembled wiring device 200 (similar to FIG. 11A) with a color change kit (without a wall plate) is provided to show certain internal parts.

Referring to FIG. 12, a perspective underside view schematic representation of the wiring device 200 with the bottom portion of the housing 12 removed is provided to show certain internal parts.

Referring to FIG. 13, an exploded view schematic representation of the wiring device 200 with the color change kit of FIG. 9A is shown.

Figure 14B:
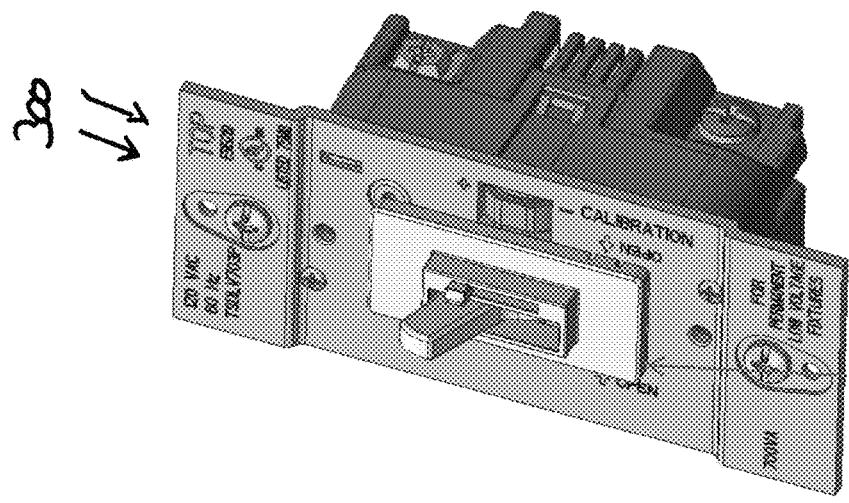
FIG. 14B is a top perspective view schematic representation of an alternative embodiment of a wiring device with a color change kit of FIG. 14A (shown together), according to an alternative embodiment.
Figure 14A:
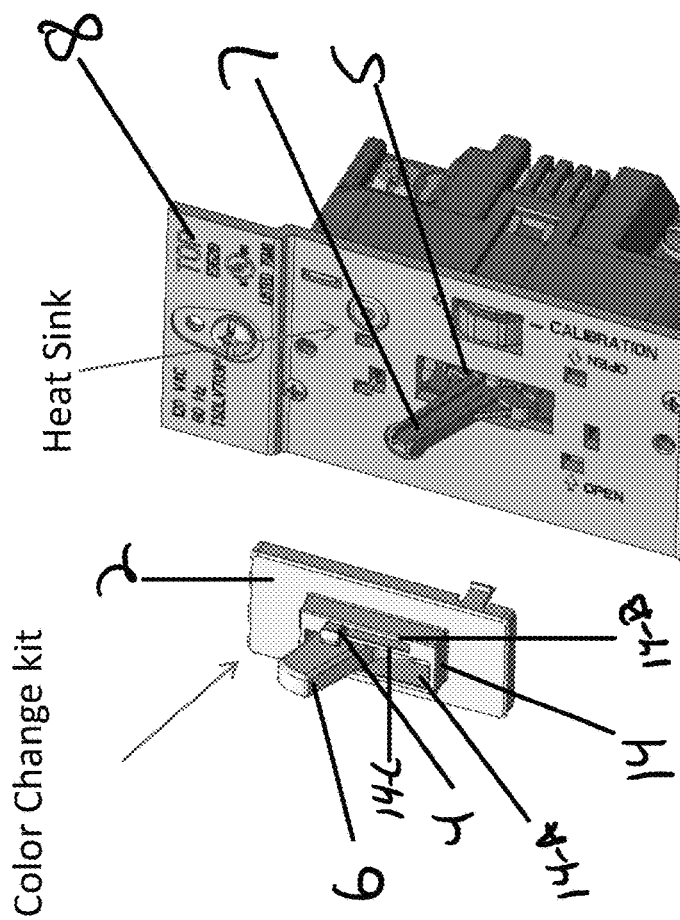
FIG. 14A is a top perspective view schematic representation of an alternative embodiment of a wiring device with a color change kit (shown separately), according to an alternative embodiment.

FIGS. 14A-B show schematic representations of an alternative embodiment of a wiring device 300 with a color change kit. The illustrated color change kit includes the following removable elements—toggle switch cover 6, a variable actuator control mechanism/dimmer slider 4 and a frame 2. Portions of the color change kit are shown positioned over and/or through a planar or plate shaped heat sink or metal mounting strap and a housing. Portions of the color change kit are shown positioned over and/or through a planar or plate shaped heat sink or metal mounting strap 8 and a housing. In this alternative embodiment, the frame 2 is structurally different as compared to the previous or subsequent embodiments described and illustrated herein, and the dimmer slider is similar to the embodiment shown with wiring device 200. The frame 2 includes a bezel 14 with a separator 14-C forming two openings 14A and 14B (the openings do not need to be framed by a bezel), one for the toggle switch cover 6 and toggle switch 7 and a second opening for the dimmer slider 4. Besides the alternative frame 2, all other structural features of the wiring device 300 with the color change kit are essentially the same as the configuration of the wiring devices 100 and 200 with the color change kit as shown and described with respect to FIGS. 1A-13.

Referring now to FIG. 15A, a perspective view schematic representation of an assembled wiring device 100' with a color change kit and without a wall plate of an alternative embodiment of the present invention is shown. This is an alternative embodiment, as the structure of portions of the color change kit—including the variable actuator control mechanism/dimmer slider and of the frame—are different as compared to previously described and illustrated variable actuator control mechanism/dimmer slider and frame (which should be appreciated and understood by a person of ordinary skill in the art per a review of the embodiment described and illustrated herein). The wiring device itself, less the color change kit, remains substantially the same and can include previously described and referred to wiring device embodiments.

Still referring to FIG. 15A, similarly with the previously described and illustrated embodiments of the color change kit, the illustrated color change kit includes the following removable elements—toggle switch cover 6, a variable actuator control mechanism/dimmer slider 4 and a frame 2 with a bezel 14. Portions of the color change kit are shown positioned over and/or through a planar or plate shaped heat sink or metal mounting strap 8 and a housing including a top portion 10 and a bottom portion 12.

Referring to FIG. 15B, a front view schematic representation of the assembled wiring device 100' with the color change kit and without a wall plate of FIG. 15A is shown. Additional shown elements include a recessed separator 16, which acts as a divider between the toggle switch 7 (covered by the toggle switch cover 6), and the variable actuator control mechanism/dimmer slider 4 (each of which are positioned at least partially (which can be fully or not fully) within the perimeter of the bezel 14). The recessed separator 16 creates two separate openings (17A, 17B, shown in FIGS. 19D and 19E discussed below, and similar and as shown in FIG. 5E) through which toggle switch 7 and the variable actuator control mechanism/dimmer slider 4 are respectively positioned.

Referring to FIG. 15C, a front view schematic representation of the assembled wiring device 100' with the color change kit of FIG. 15A with a wall plate 18 is shown.

Figure 16B:
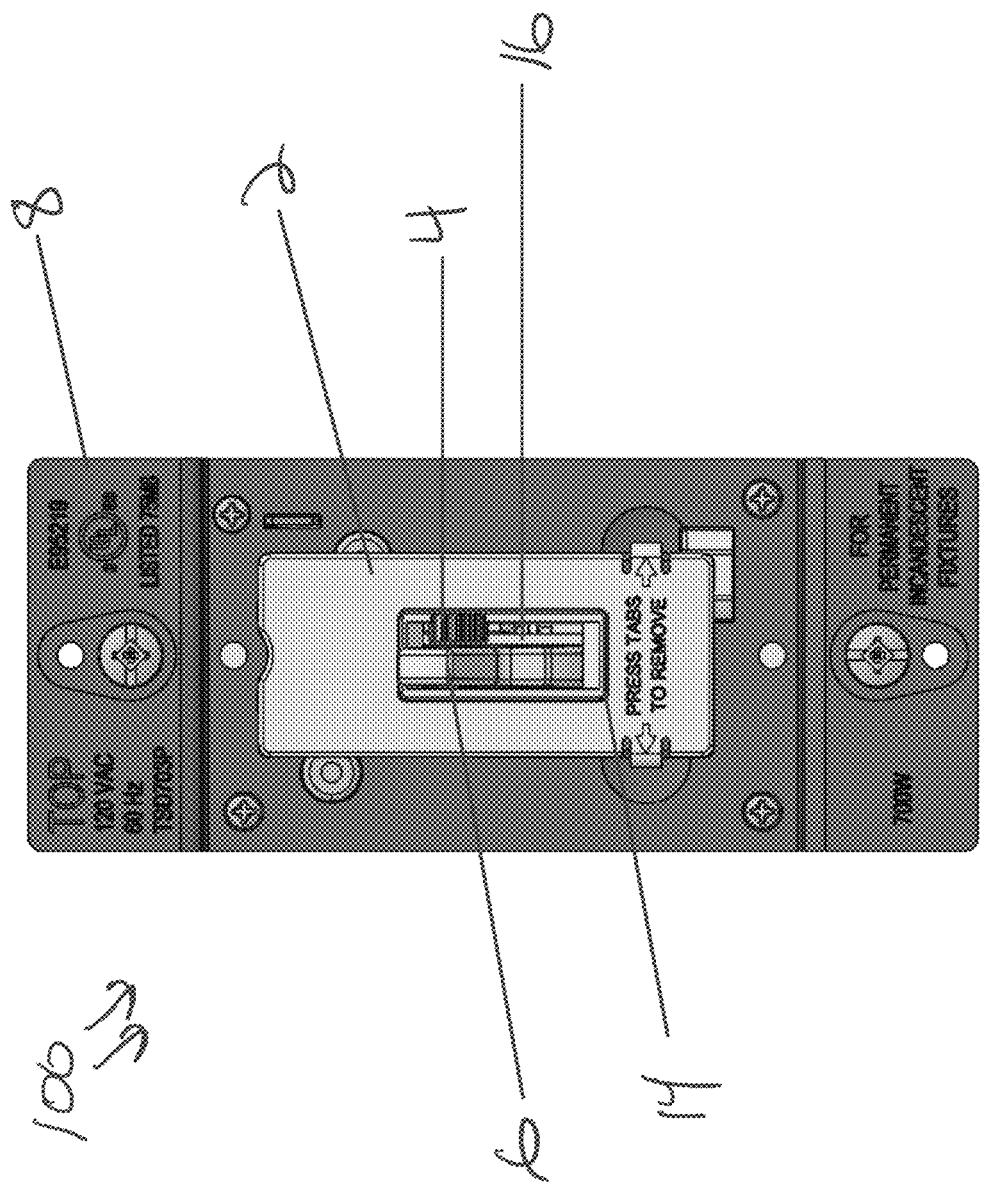
FIG. 16 is a perspective view schematic representation of the wiring device with the color change kit of FIG. 15A with the frame removed, according to an alternative embodiment.
Figure 16:
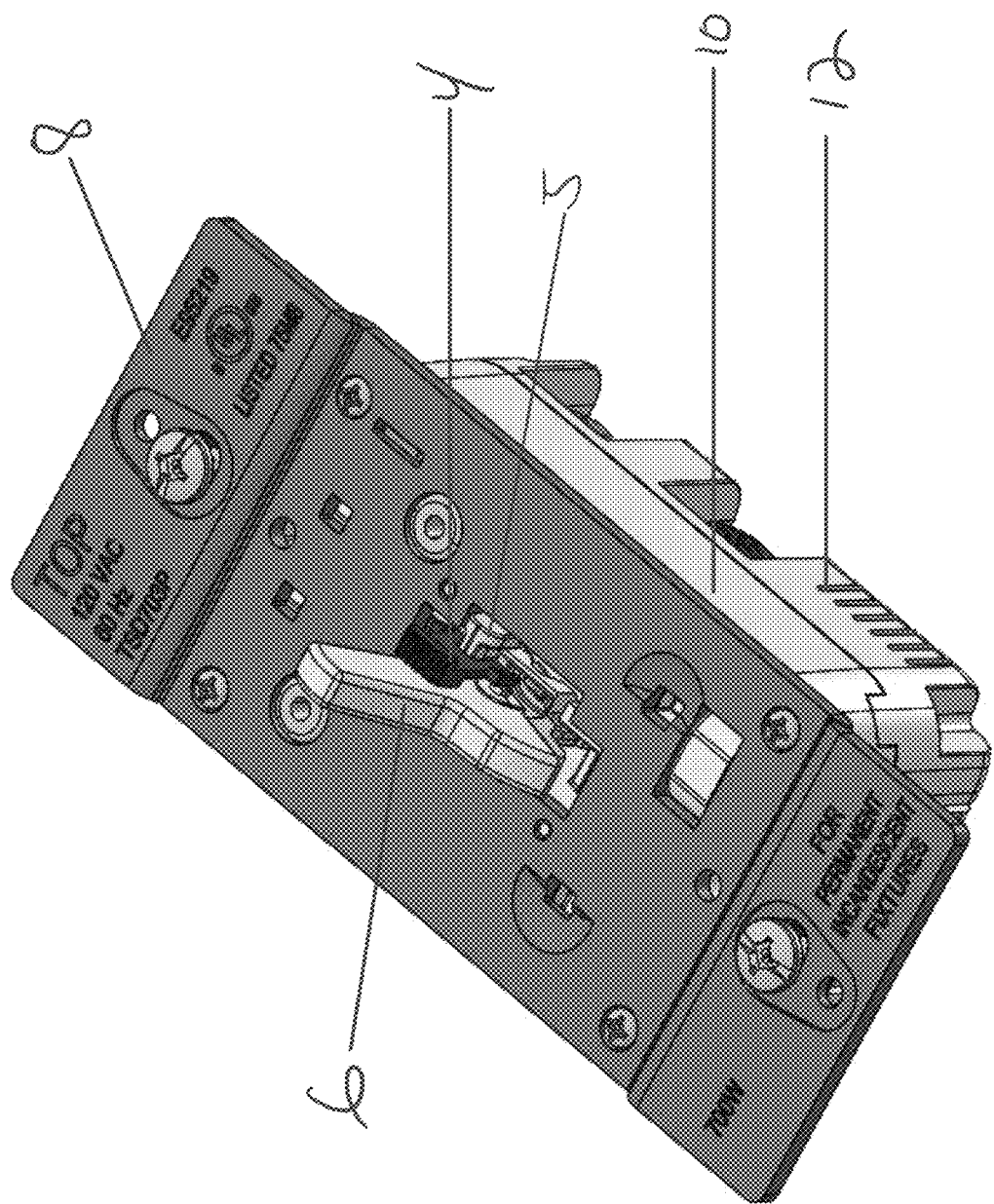

Referring to FIG. 16, a perspective view schematic representation of the wiring device 100' with the color change kit of FIG. 15A is shown with the frame 2 removed. The removal of frame 2 exposes variable actuator control mechanism/dimmer slider 4 and connector 5.

Figure 17:
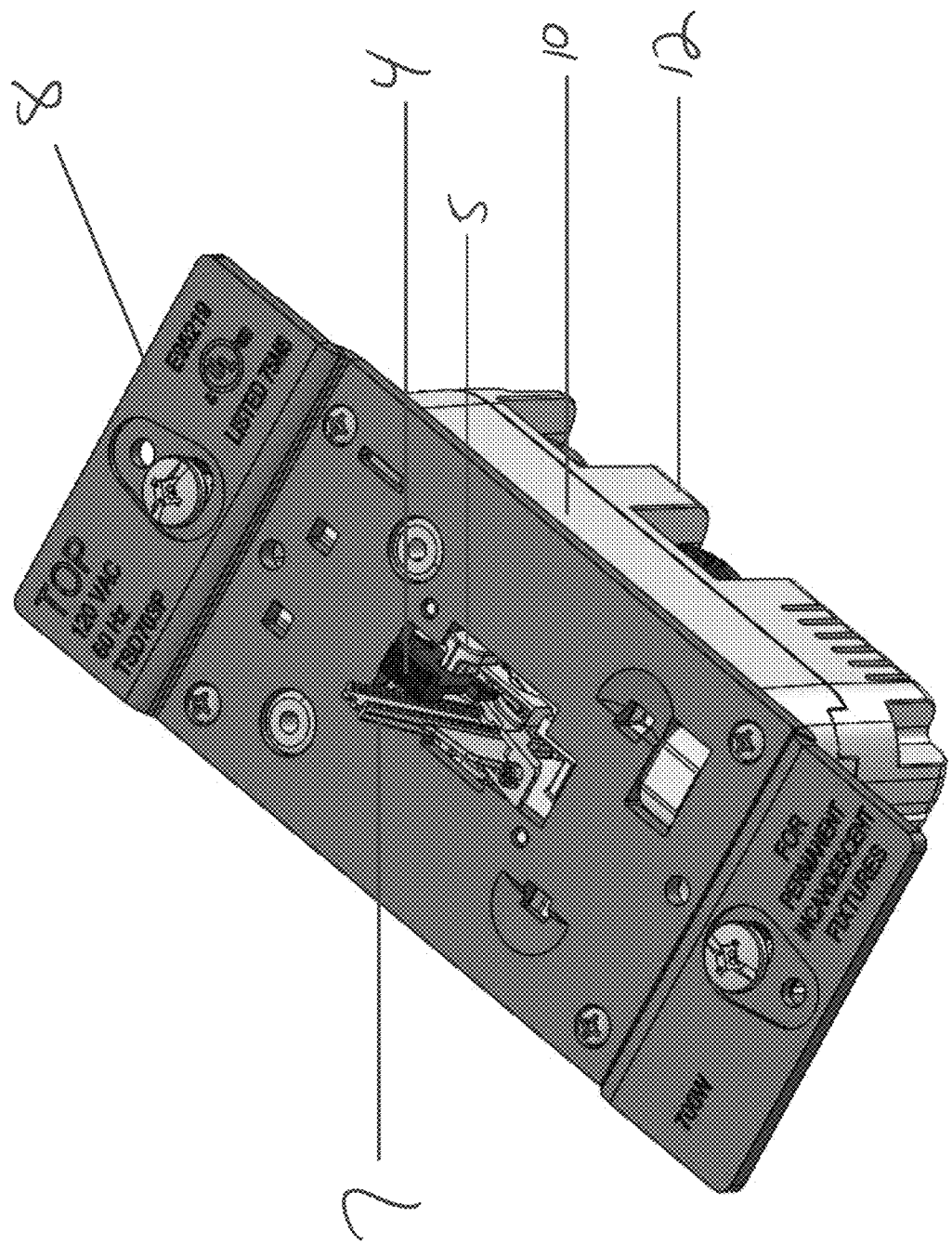
FIG. 17 is a perspective view schematic representation of the wiring device with the color change kit of FIG. 15A with the frame and toggle switch cover of the color change kit removed, according to an alternative embodiment.

Referring to FIG. 17, a perspective view schematic representation of the wiring device 100' with the color change kit of FIG. 15A is shown with the frame 2 and toggle switch cover 6 of the color change kit removed. The removal of the toggle switch cover 6 exposes the toggle switch 7.

Referring to FIG. 18, an exploded view schematic representation of the wiring device 100' with the color change kit of FIG. 15A is shown. In brief, the toggle switch cover 6, variable actuator control mechanism/dimmer slider 4, frame 2, heat sink/plate 8, toggle switch 7, top housing portion 10, connector 5 (which interfaces between variable actuator control mechanism/dimmer slider 4 and potentiometer 22 to allow for dimming), PCB 20, terminals 23, and bottom housing portion 12 are shown (among other non-color change kit elements of the wiring device).

Figure 19A:
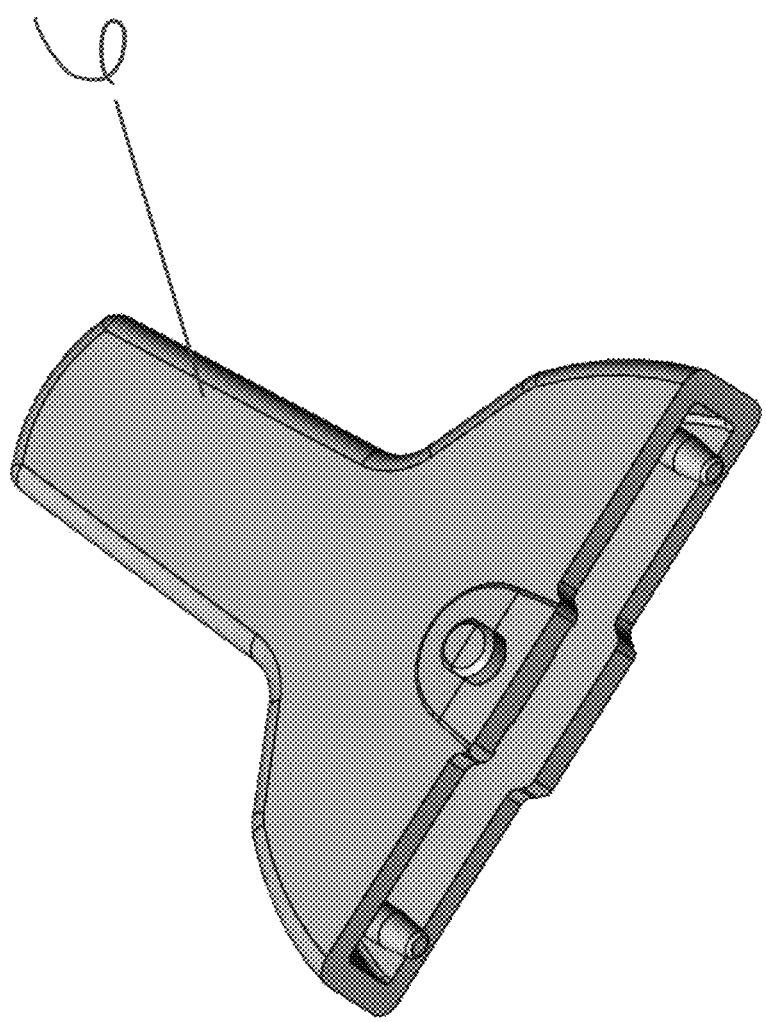
FIG. 19A is a perspective view schematic representation of the toggle switch cover of the color change kit of FIG. 15A, according to an alternative embodiment.
Figure 19B:
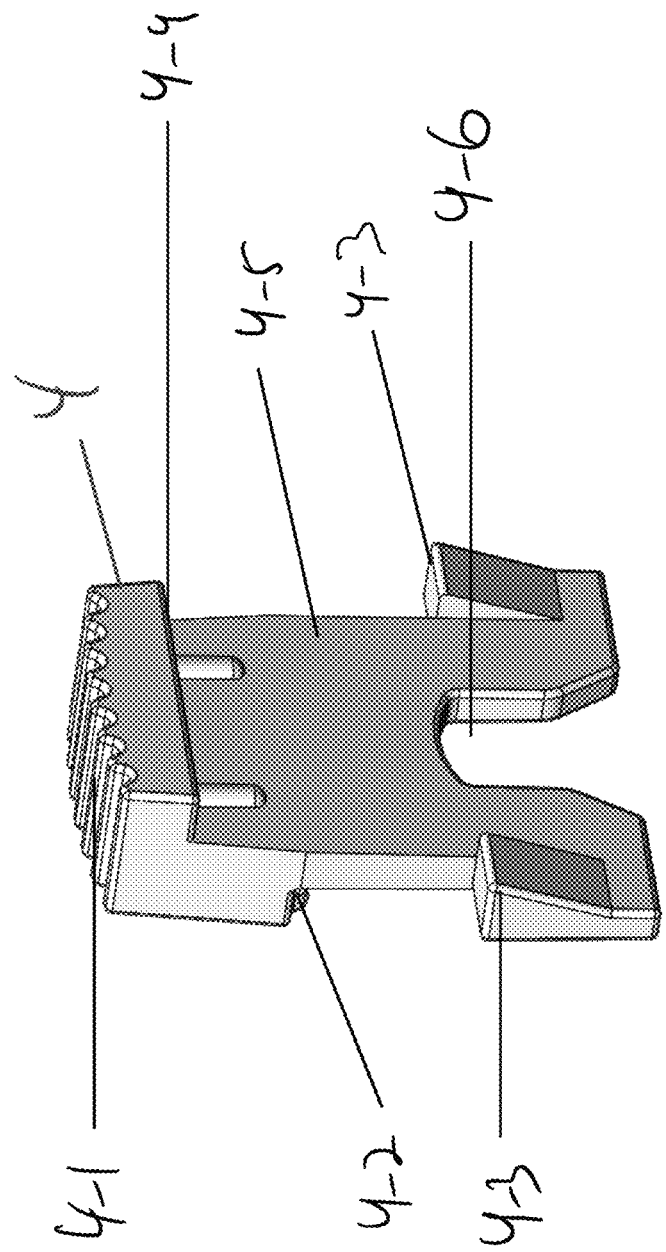
FIG. 19B is a perspective view schematic representation of the variable actuator control mechanism/dimmer slider of the color change kit of FIG. 15A, according to an alternative embodiment.

Referring to FIG. 19A, a perspective view schematic representation of the toggle switch cover 6 of the color change kit of FIG. 15A according to an alternative embodiment is shown.

Referring to FIG. 19B, a perspective view schematic representation of the variable actuator control mechanism/dimmer slider 4 of the color change kit of an alternative embodiment is shown. The variable actuator control mechanism/dimmer slider 4 includes a user contacting top portion/surface 4-1 (which can include ridges for better gripping), a recessed separator contacting portion/surface 4-2 (which is structured to slide along the top surface of the recessed separator 16), leg shelf portions/surfaces 4-3 (which are configured to slide along the bottom surface of the recessed separator 16 and/or the bottom surface of the frame 2), a bezel contacting portion/surface 4-4 (which is configured to slide along the top surface of the bezel 14), a plate portion 4-5 that connects the user contacting top portion/surface 4-1 with the other portions of the variable actuator control mechanism/dimmer slider 4, and an aperture 4-6 configured through which a portion of connector 5 can be positioned and moved with the variable actuator control mechanism/dimmer slider 4—when in the assembled condition. In an alternative embodiment, leg shelf portions/surfaces 4-3 can be removed, one instead of two leg shelf portions/surfaces 4-3 can be used, or one or more can be positioned in 90 degrees in either direction from where they are positioned now (i.e., laterally positioned with respect to plate portion 4-5 or in front (facing the viewer of the figure) or in back (facing away from the viewer of the figure) with respect to plate portion 4-5).

Figure 19C:
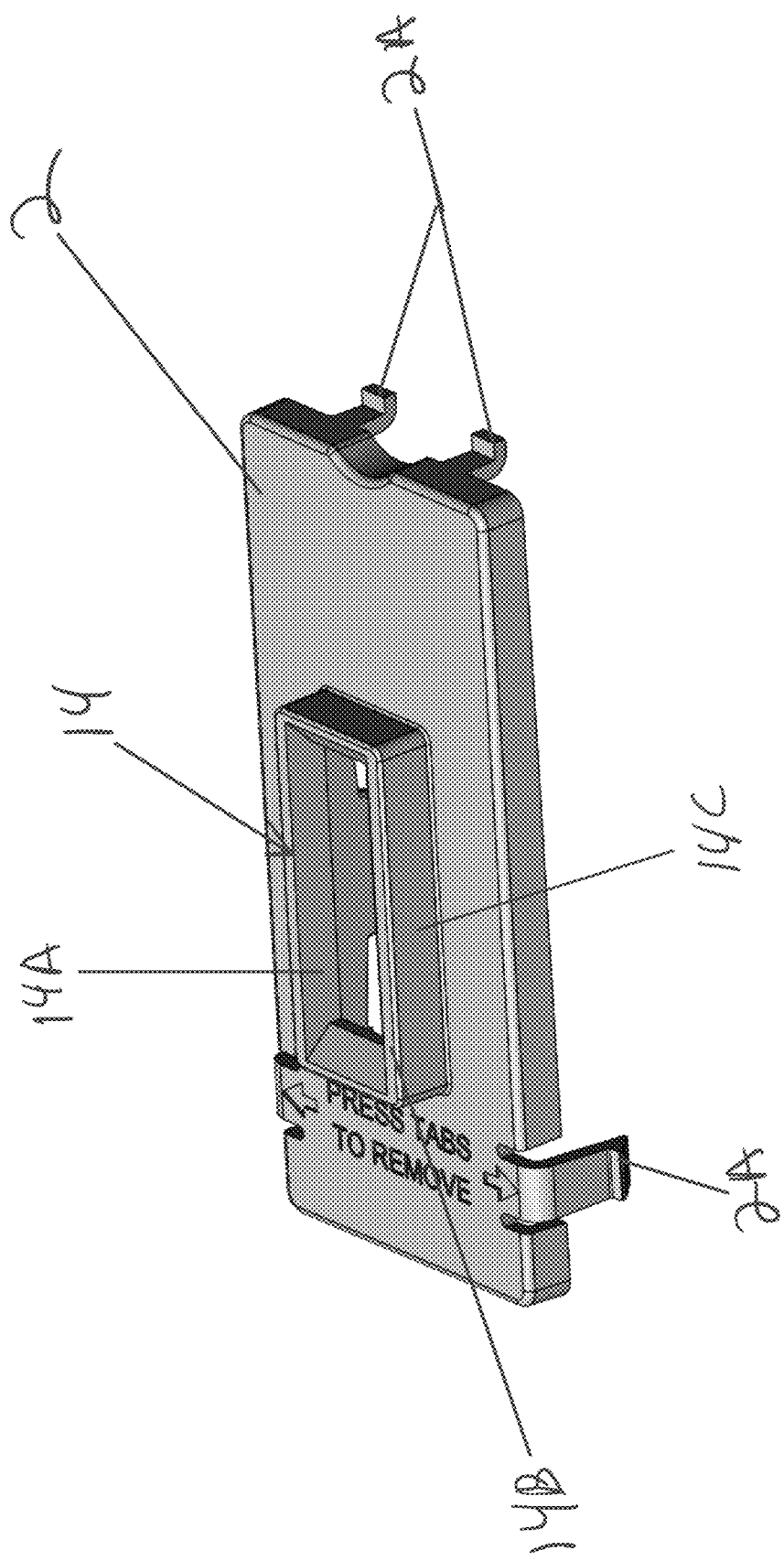
FIG. 19C is a perspective view schematic representation of the frame of the color change kit of FIG. 15A, according to an alternative embodiment.

Referring to FIG. 19C, a perspective view schematic representation of the frame 2 of the color change kit of an embodiment of the wiring device 100' is shown. In brief, snap connectors 2A, which can snap underneath heat sink/ plate 8 or onto the top portion of the housing 10, are shown. Additionally, the top surface 14B, a longitudinal internal edge/side 14A and longitudinal external edge/side 14C of bezel 14 are shown.

Referring to FIG. 19D, a top view schematic representation of the frame 2 of the color change kit of an embodiment of the wiring device 100' is shown. In addition to the elements shown in FIG. 19C, the recessed separator 16 and separate openings 17A, 17B are shown. As discussed above, the recessed separator 16 shown in this FIG. 19D acts as a divider between the toggle switch 7 with toggle switch cover 6 and the variable actuator control mechanism/dimmer slider 4 (each of which are not shown, but are positioned within the perimeter of the bezel 14 in an assembled condition/configuration shown in other FIGS.), and creates the two separate openings 17A, 17B through which toggle switch 7 and the variable actuator control mechanism/dimmer slider 4 can be and are respectively positioned in an assembled configuration.

Referring to FIG. 19E, a perspective view schematic representation of the frame 2 of the color change kit of an embodiment of the wiring device 100' is shown. The angled view of this FIG. 19E shows the recessed separator 16 positioned within the boundary created by the bezel 14, thus creating the two separate openings 17A, 17B. In an alternative embodiment (not shown), the top surface of the separator 16 can extend up to and be coplanar with the top surface 14B of the bezel 14, or can extend up and beyond the plane of the top surface 14B of the bezel 14. Angle portions 14-A and 14-B are shown extending from the interior surface of the bezel 14 at an angle, and are attached to the recessed rail 16. These angled portions can be integrally formed with the bezel 14 (and/or recessed rail 16) or can be separate pieces attached to the recessed rail 16 and/or the interior surface of the bezel 14 at various points to control the travel and/or movement of the variable actuator control mechanism/dimmer slider 4 and toggle switch cover 6/toggle switch 7.

Figure 19F:
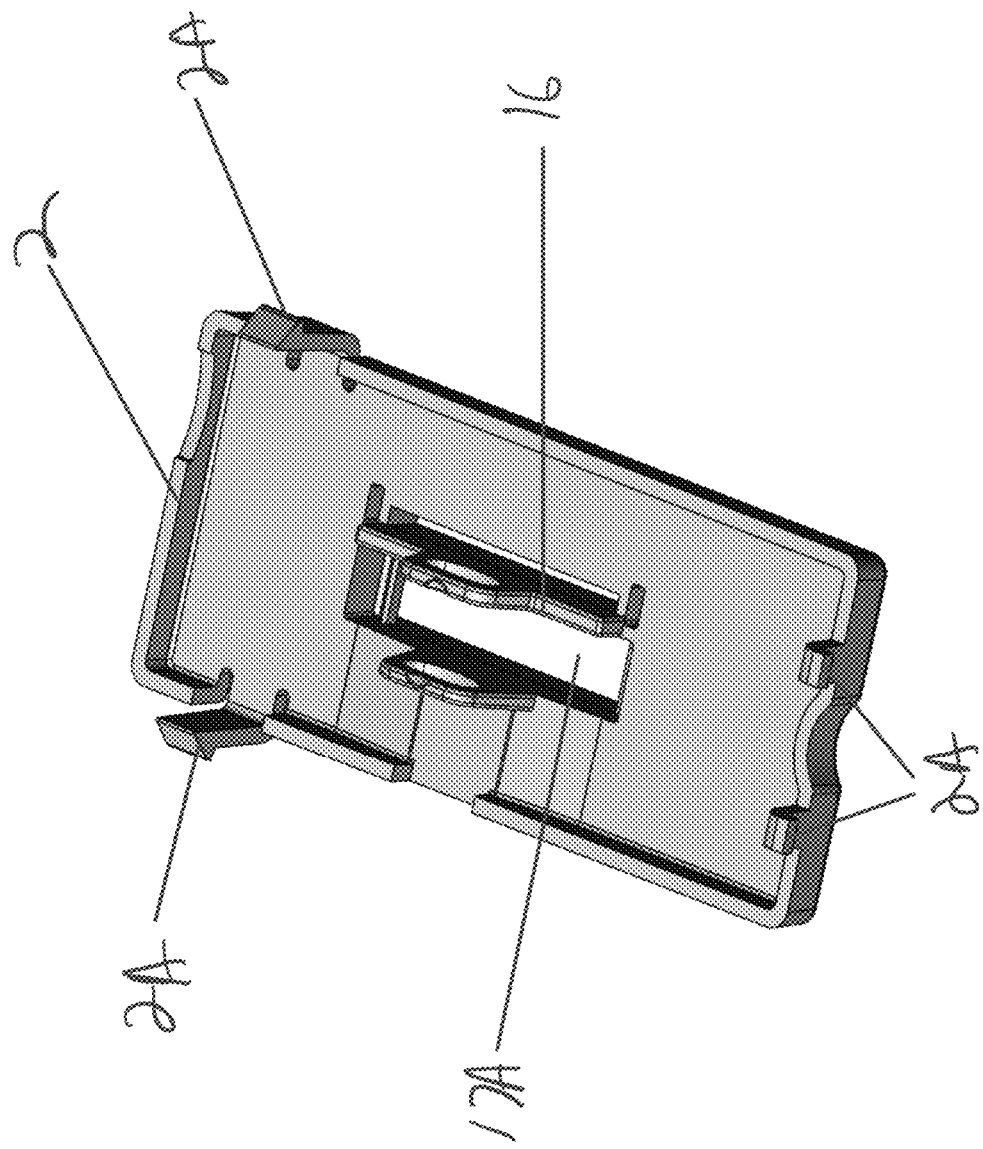
FIG. 19F is a perspective backside view schematic representation of the frame of the color change kit of FIG. 15A, according to an alternative embodiment.

Referring to FIG. 19F, a perspective backside view schematic representation of the frame 2 of the color change kit of an embodiment of the wiring device 100' is shown.

Referring to FIG. 20, an end sectional view schematic representation of the assembled wiring device 100' with a color change kit is shown with elements previously identified.

Referring to FIG. 21, a perspective view schematic representation the wiring device 100' of FIG. 15A is shown with various elements removed to show certain previously identified internal parts.

Referring to FIG. 22, a close up perspective view schematic representation of the wiring device 100' of FIG. 15A with various elements removed to show certain previously identified internal parts.

Referring to FIG. 23A, a perspective view schematic representation of the assembled color change kit (including the toggle switch cover 6, the variable actuator control mechanism/dimmer slider 4 and the frame 2), and the remainder of the assembled wiring device 100' of FIG. 15A (without a wall plate) are separately shown.

Referring to FIG. 23B, an end sectional view schematic representation of the assembled wiring device 100' with a color change kit (without a wall plate) are shown. In particular, the frame 2 is shown snapped under heat sink/ plate 8 via snap connectors 2A. Other previously identified elements are also shown.

Referring to FIG. 23C, an exploded view schematic representation of the color change kit of FIG. 23A is shown.

Figure 24B:
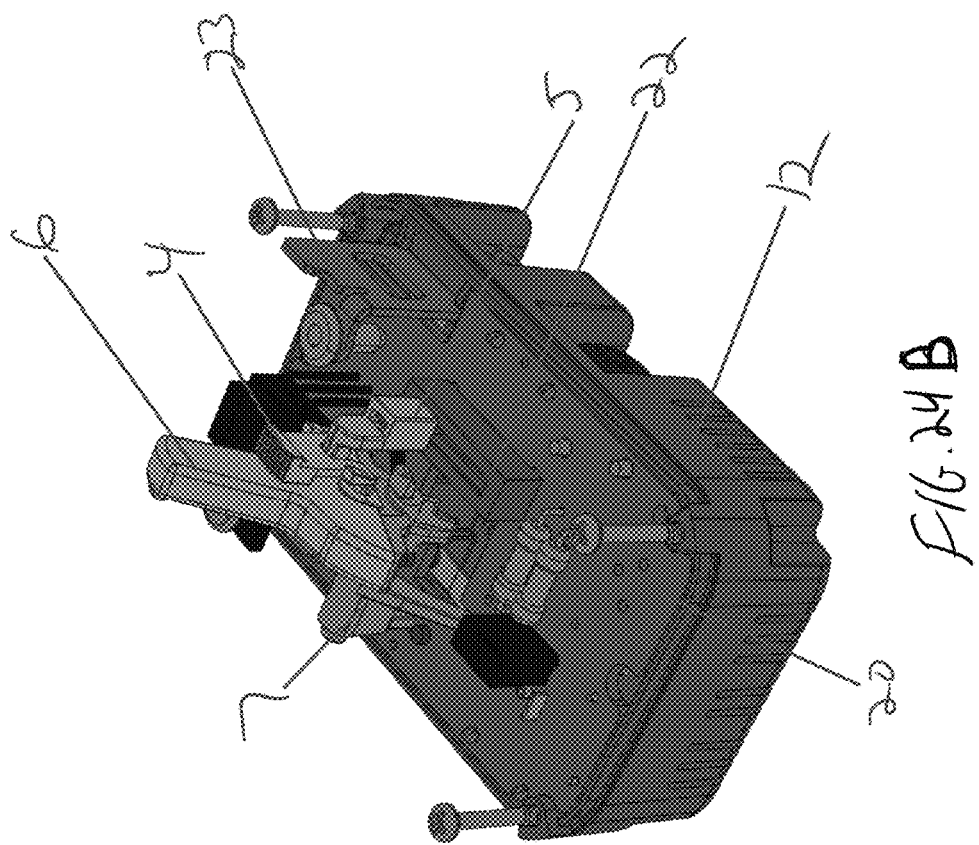
FIG. 24B is a perspective view schematic representation of the wiring device of FIG. 23A shown with various elements removed to show certain previously identified internal mechanical and electrical components of the wiring device, according to an alternative embodiment.
Figure 24A:
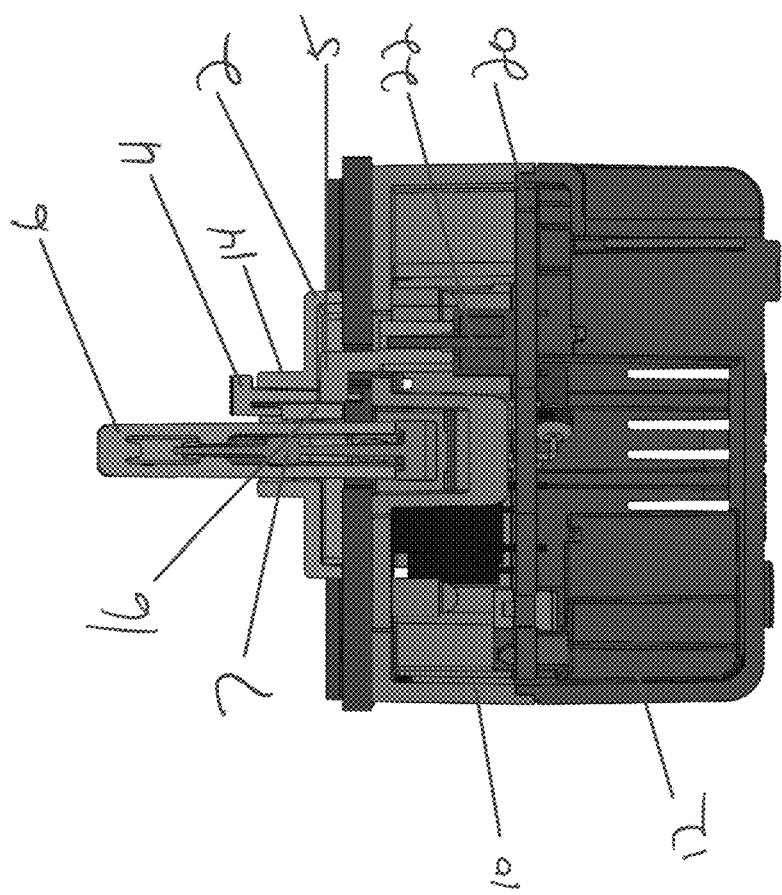
FIG. 24A is an end sectional view schematic representation of the assembled wiring device (similar to the sectional view of FIG. 23B) is provided to show certain previously identified internal mechanical and electrical components of the wiring device, according to an alternative embodiment.

Referring to FIG. 24A, an end sectional view schematic representation of the assembled wiring device 100' (similar to the sectional view of FIG. 23B) is provided to show certain previously identified internal mechanical and electrical components of the wiring device 100'.

Referring to FIG. 24B, a perspective view schematic representation of the wiring device 100' is shown with various elements removed to show certain previously identified internal mechanical and electrical components of the wiring device 100'.

Referring to FIG. 25A, a side sectional view schematic representation of the assembled wiring device 100' with a color change kit (without a wall plate) is provided to show certain internal parts. In particular, toggle switch 7 is shown as a two leg configuration and is configured to use a cam action to flex contact member (switch contact/spring arm) 24.

Referring to FIG. 25B, a side sectional view schematic representation of the assembled wiring device 100' (similar to FIG. 25A) with a color change kit (without a wall plate) is provided to show certain internal parts. In particular, toggle switch 7 is shown with one of the "legs" that controls the switching and can be positioned inside the spring 26 and interacting with spring 26, where spring 26 can flip over a center position to hold the toggle switch 7 in a particular selected position. The imbalance (on or off) from a center position allows the spring to expand out further, and holding the switch in that position.

Figure 26:
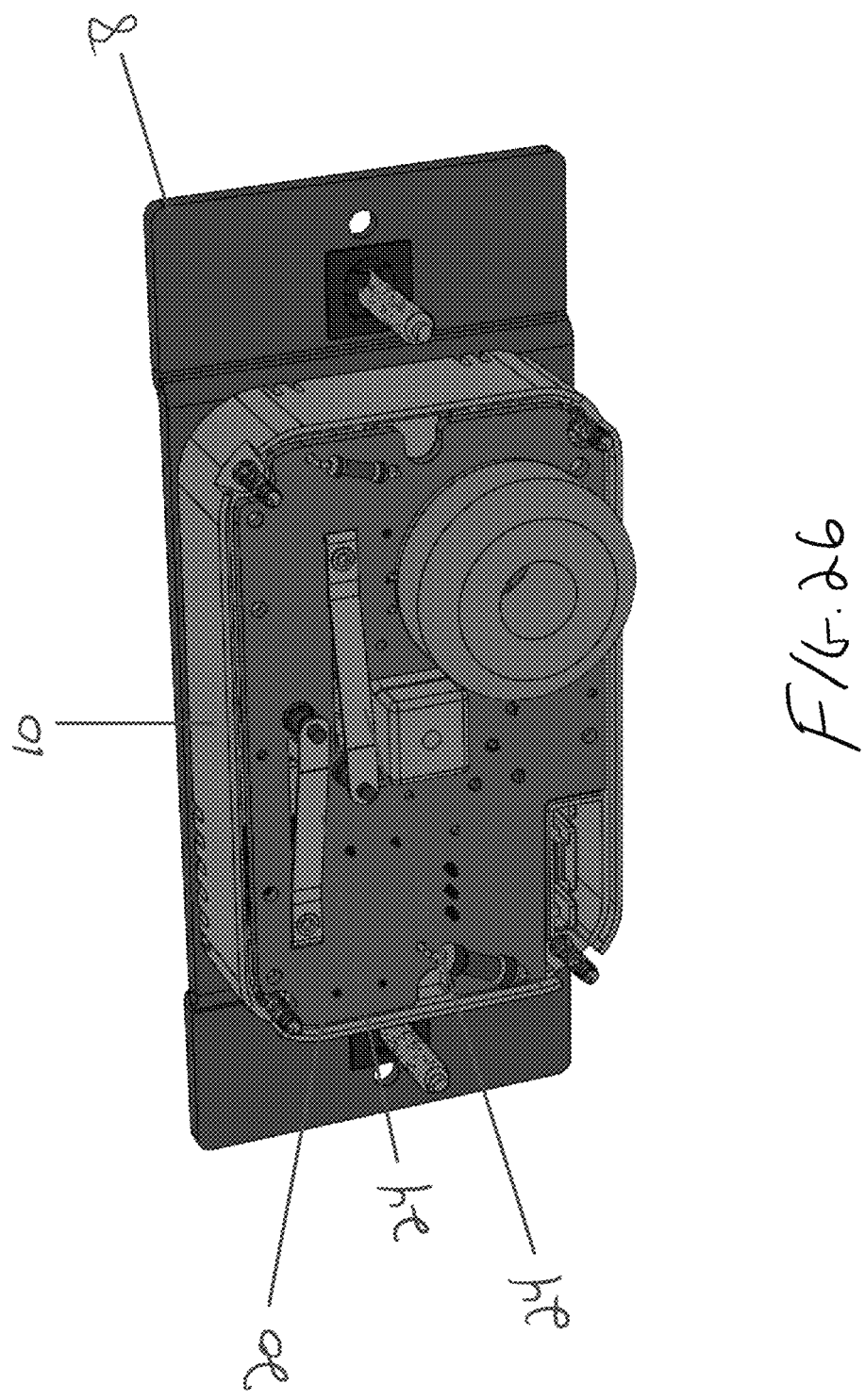
FIG. 26 is a perspective underside view schematic representation of the wiring device of FIG. 23A with the bottom portion of the housing removed, which is provided to show certain previously identified internal parts according to an alternative embodiment.

Referring to FIG. 26, a perspective underside view schematic representation of the wiring device 100' with the bottom portion of the housing 12 removed is provided to show certain previously identified internal parts. For example, two spring arms 24 are shown connected to the PCB 20 on one end (e.g., via riveting).

Referring to FIG. 27, an exploded view schematic representation of the wiring device 100' with the color change kit of FIG. 23A is shown. FIG. 27 is similar to FIG. 18, however, FIG. 27 is not a fully exploded view and has some assembled portions as shown.

Figure 28B:
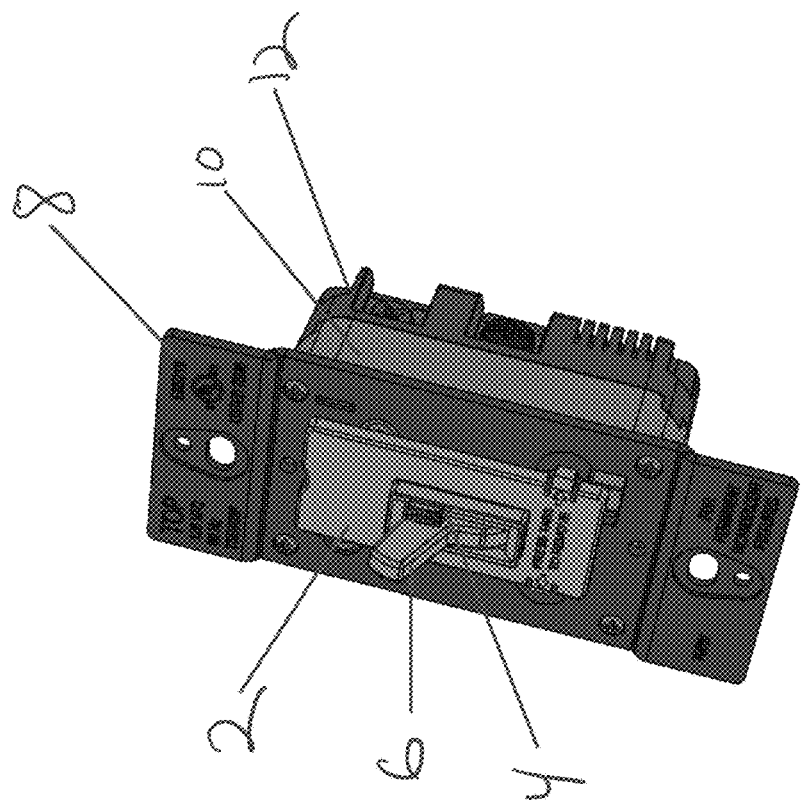
FIG. 28B is a perspective view schematic representation of the wiring device with a fully assembled color change kit of FIG. 28A shown as part of the fully assembled wiring device (without a wall plate), according to an alternative embodiment.
Figure 28A:
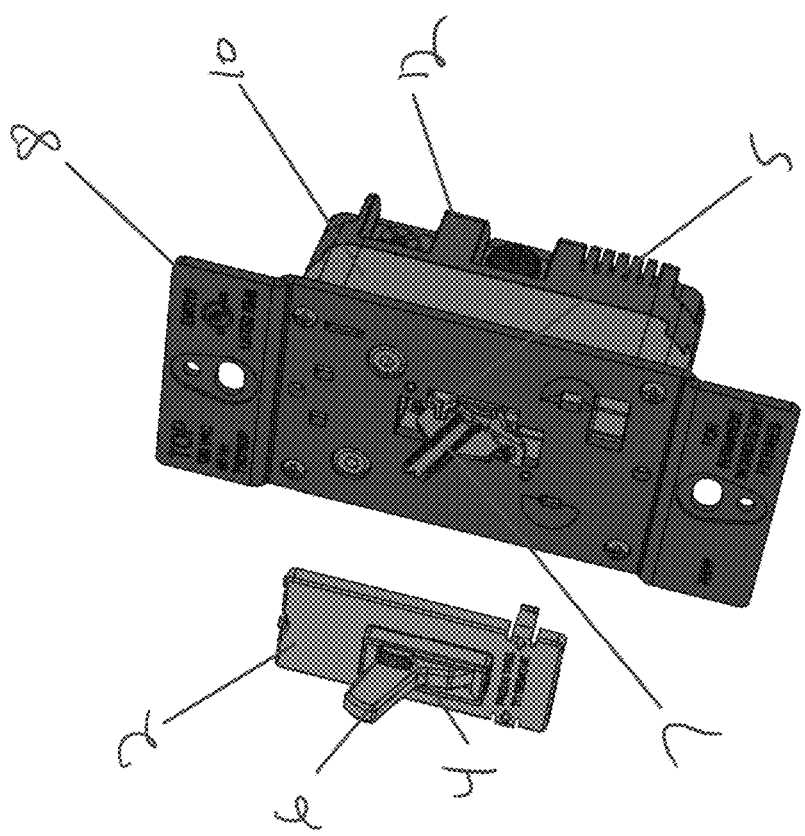
FIG. 28A is a perspective view schematic representation of the wiring device (similar to FIG. 23A) with a fully assembled color change kit shown separately from the otherwise fully assembled wiring device, according to an alternative embodiment.

Referring to FIG. 28A, a perspective view schematic representation of the wiring device 100' (similar to FIG. 23A) with a fully assembled color change kit is shown separately from the otherwise fully assembled wiring device.

Referring to FIG. 28B, a perspective view schematic representation of the wiring device 100' with a fully assembled color change kit shown as part of the fully assembled wiring device (without a wall plate) is shown.

Turning to FIGS. 29A-43F, an alternative embodiment of the wiring device 100" with the color change kit is shown. The main difference with the alternative embodiment shown and described with respect to these figures relates to the variable actuator control mechanism/dimmer slider 4. In particular, leg shelf portions/surfaces 4-3 are extended in opposite lateral directions with reference to the plate portion 4-5 (see, e.g., FIG. 33B). Besides the alternative variable actuator control mechanism/dimmer slider 4 embodiment, all other structural features of the wiring device 100" with the color change kit are essentially the same as the configuration of the wiring device 100' with the color change kit as shown and described with respect to FIGS. 15A-28B. As such, the figures are briefly described herein below as they show previously identified mechanical and electrical components of the wiring device with the color change kit.

Figure 29A:
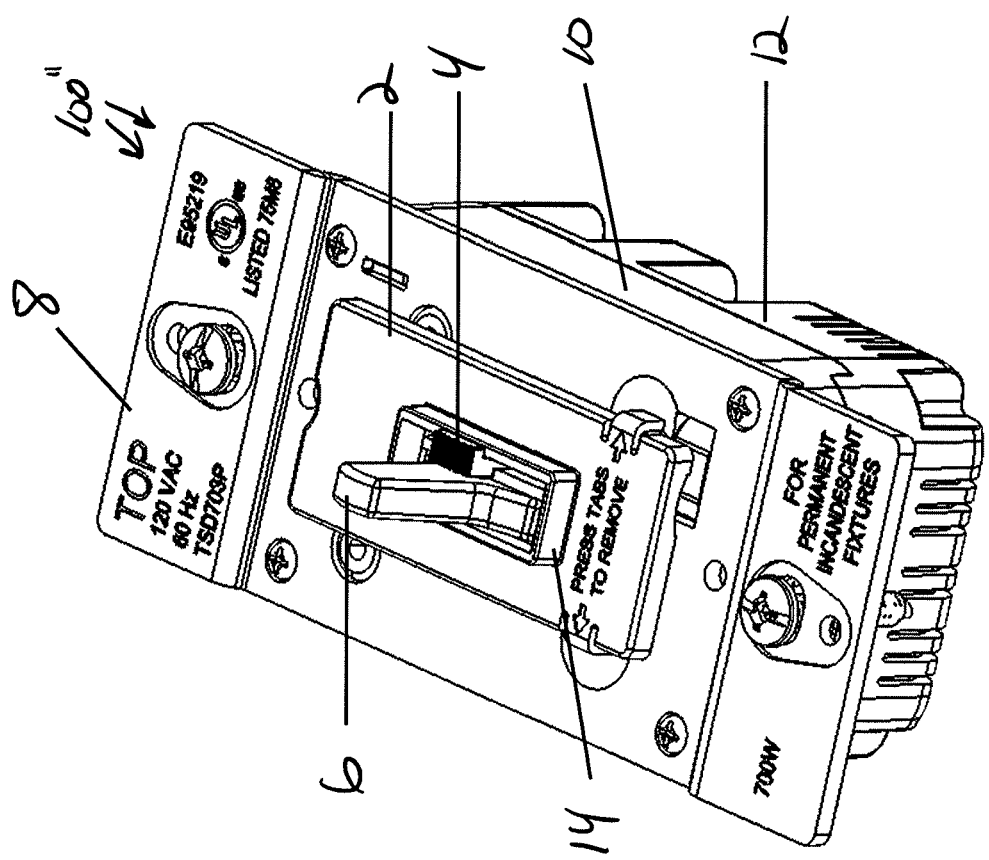
FIG. 29A is a perspective view schematic representation of an assembled wiring device with a color change kit and without a wall plate, according to an alternative embodiment.

In brief, FIG. 29A is a perspective view schematic representation of an assembled wiring device 100" with a color change kit and without a wall plate of an alternative embodiment.

Referring to FIG. 29B, a front view schematic representation of the assembled wiring device 100" with the color change kit and without a wall plate of FIG. 29A is shown.

Referring to FIG. 29C, a front view schematic representation of the assembled wiring device 100" with the color change kit of FIG. 29A with a wall plate 18 is shown.

Figure 30:
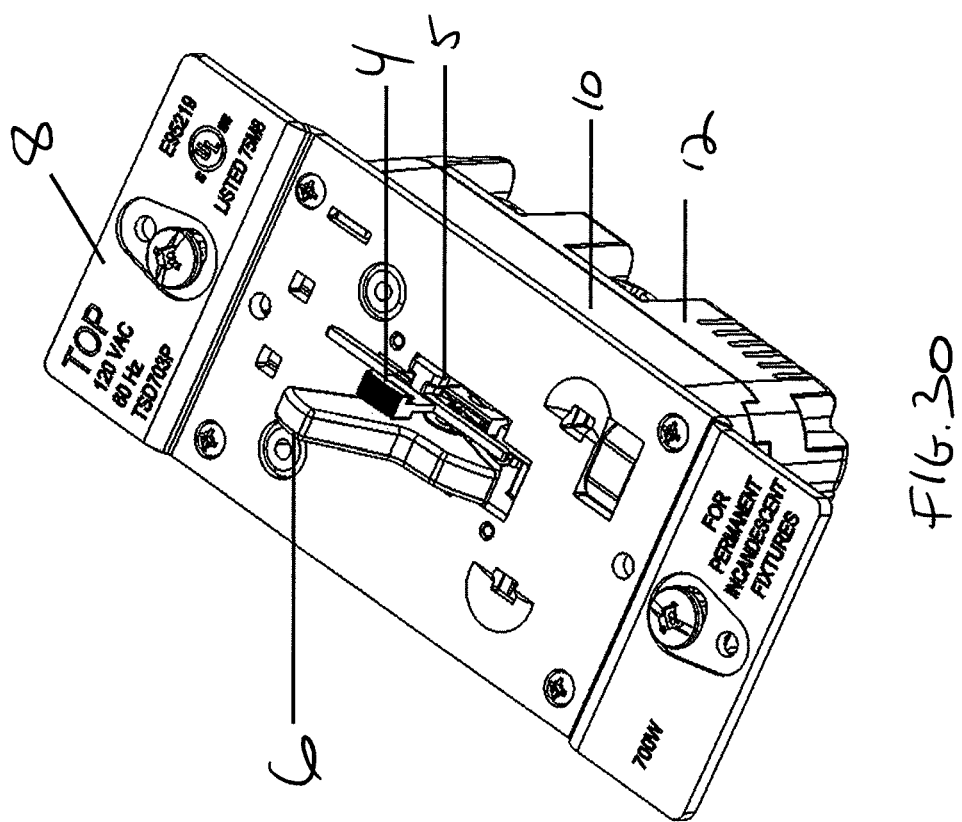
FIG. 30 is a perspective view schematic representation of the wiring device with the color change kit of FIG. 29A with the frame removed, according to an alternative embodiment.

Referring to FIG. 30, a perspective view schematic representation of the wiring device 100" with the color change kit of FIG. 29A is shown with the frame 2 removed. The removal of frame 2 exposes variable actuator control mechanism/dimmer slider 4 and connector 5.

Figure 31:
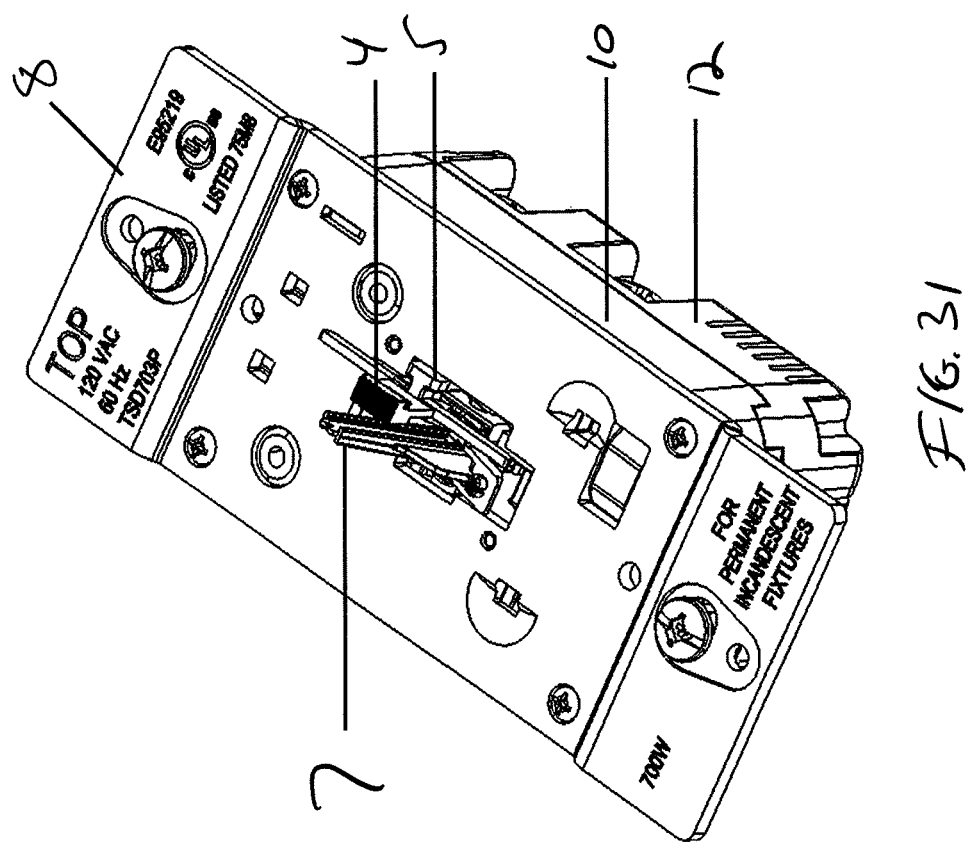
FIG. 31 is a perspective view schematic representation of the wiring device with the color change kit of FIG. 29A with the frame and toggle switch cover of the color change kit removed, according to an alternative embodiment.

Referring to FIG. 31, a perspective view schematic representation of the wiring device 100" with the color change kit of FIG. 29A is shown with the frame 2 and toggle switch cover 6 of the color change kit removed. The removal of the toggle switch cover 6 exposes the toggle switch 7.

Referring to FIG. 32, an exploded view schematic representation of the wiring device 100" with the color change kit of FIG. 29A is shown.

Figure 33A:
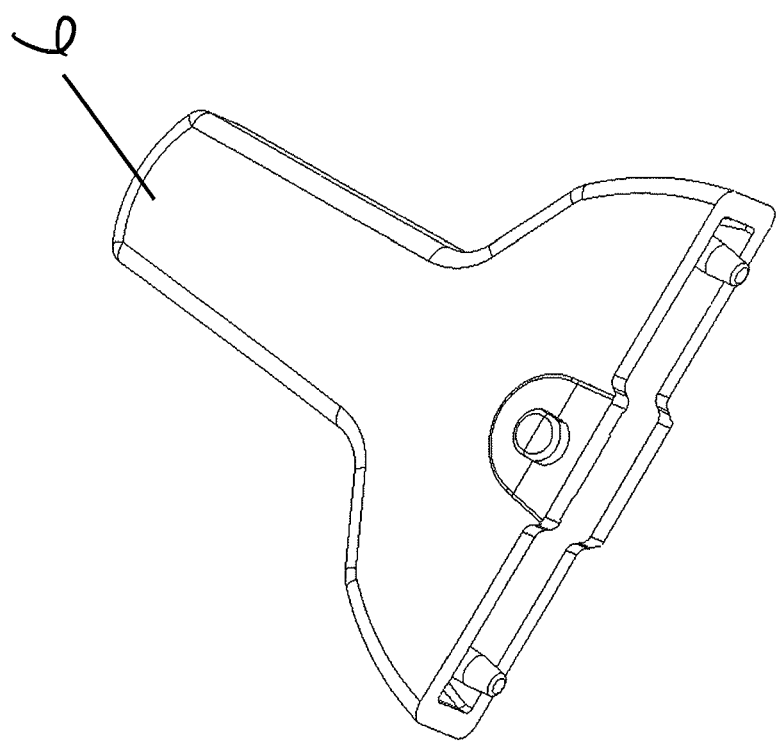
FIG. 33A is a perspective view schematic representation of the toggle switch cover of the color change kit of FIG. 29A, according to an alternative embodiment.

Referring to FIG. 33A, a perspective view schematic representation of the toggle switch cover 6 of the color change kit of FIG. 29A according to an alternative embodiment is shown.

Figure 33B:
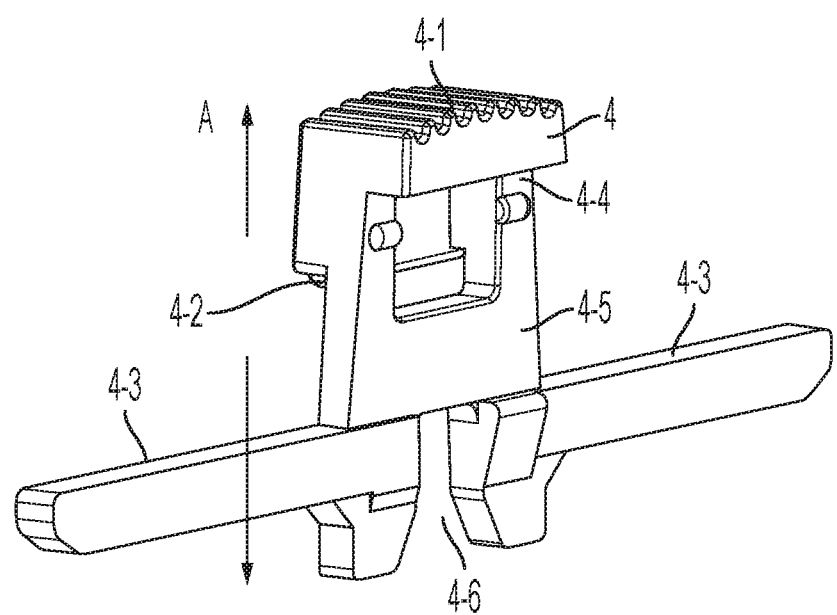
FIG. 33B is a perspective view schematic representation of the variable actuator control mechanism/dimmer slider 4 of the color change kit, according to an alternative embodiment.

Referring to FIG. 33B, a perspective view schematic representation of the variable actuator control mechanism/dimmer slider 4 of the color change kit of an alternative embodiment is shown. The variable actuator control mechanism/dimmer slider 4 includes a user contacting top portion/surface 4-1 (which can include ridges for better gripping), a recessed separator contacting portion/surface 4-2 (which is structured to slide along the top surface of the recessed separator 16), leg shelf portions/surfaces 4-3 (which are configured to slide within 2 sections of channels which are between the separator side wall 16 and the 17B opening, and there is sliding against the side wall of the separator 16 and/or the bottom surface of the frame 2), a bezel contacting portion/surface 4-4 (which is configured to slide along the top surface of the bezel 14), a plate portion 4-5 that connects the user contacting top portion/surface 4-1 with the other portions of the variable actuator control mechanism/dimmer slider 4, and an aperture 4-6 configured through which a portion of connector 5 can be positioned and moved with the variable actuator control mechanism/dimmer slider 4—when in the assembled condition.

Still referring to FIG. 33B, as noted above, leg shelf portions/surfaces 4-3 extends further laterally out away from the variable actuator control mechanism/dimmer slider 4. For example, one or both of the leg shelf portions/surfaces 4-3 can extend at least half the vertical length of the variable actuator control mechanism/dimmer slider 4 (up and down measurement as shown by arrows "A" in FIG. 33B) or more (where leg shelf portions/surfaces 4-3 shown in FIG. 19B is under ½ the length of the variable actuator control mechanism/dimmer slider 4 (and preferable ⅓-under ½ the length). This increased length of the leg shelf portions/surfaces 4-3 shown in FIG. 33B, as compared to the leg shelf portions/surfaces 4-3 shown in FIG. 19B, provides certain functional benefits. For example, the increased length of the leg shelf portions/surfaces 4-3 can assist with maintaining the position of the variable actuator control mechanism/dimmer slider 4 as part of the color change kit on the wiring device (i.e., keeps the variable actuator control mechanism/dimmer slider 4 being knocked loose out of the color change kit). Additionally, the increased length of the leg shelf portions/surfaces 4-3 shown in FIG. 33B is structured to keep dust and contaminants out of the device (essentially covering openings/holes in device, as compared to the leg shelf portions/surfaces 4-3 shown in FIG. 19B).

In an alternative embodiment, leg shelf portions/surfaces 4-3 can be removed, one instead of two leg shelf portions/surfaces 4-3 can be used, one or more can be positioned in 90 degrees in either direction from where they are positioned now (i.e., laterally positioned with respect to plate portion 4-5 or in front (facing the viewer of the figure) or in back (facing away from the viewer of the figure) with respect to plate portion 4-5), and different length leg shelf portions/surfaces 4-3 can be used on a single variable actuator control mechanism/dimmer slider 4.

Referring to FIG. 33C, a perspective view schematic representation of the frame 2 of the color change kit of an embodiment of the wiring device 100" is shown.

Figure 33D:
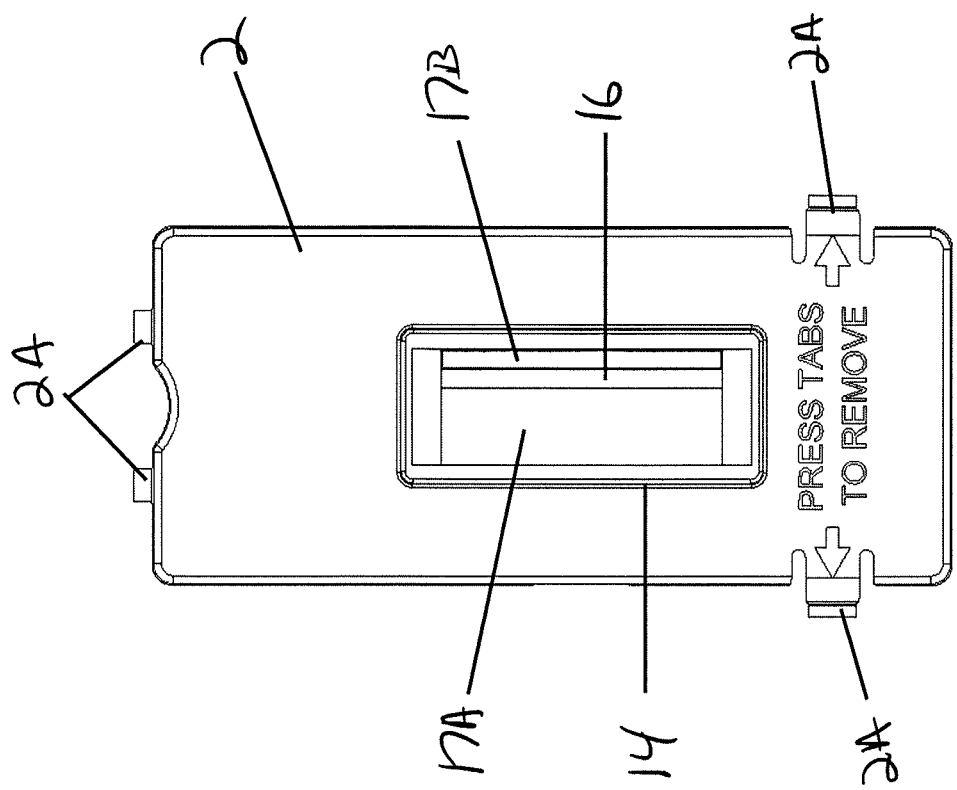
FIG. 33D is a top view schematic representation of the frame of the color change kit, according to an alternative embodiment.

Referring to FIG. 33D, a top view schematic representation of the frame 2 of the color change kit of an embodiment of the wiring device 100" is shown.

Figure 33E:
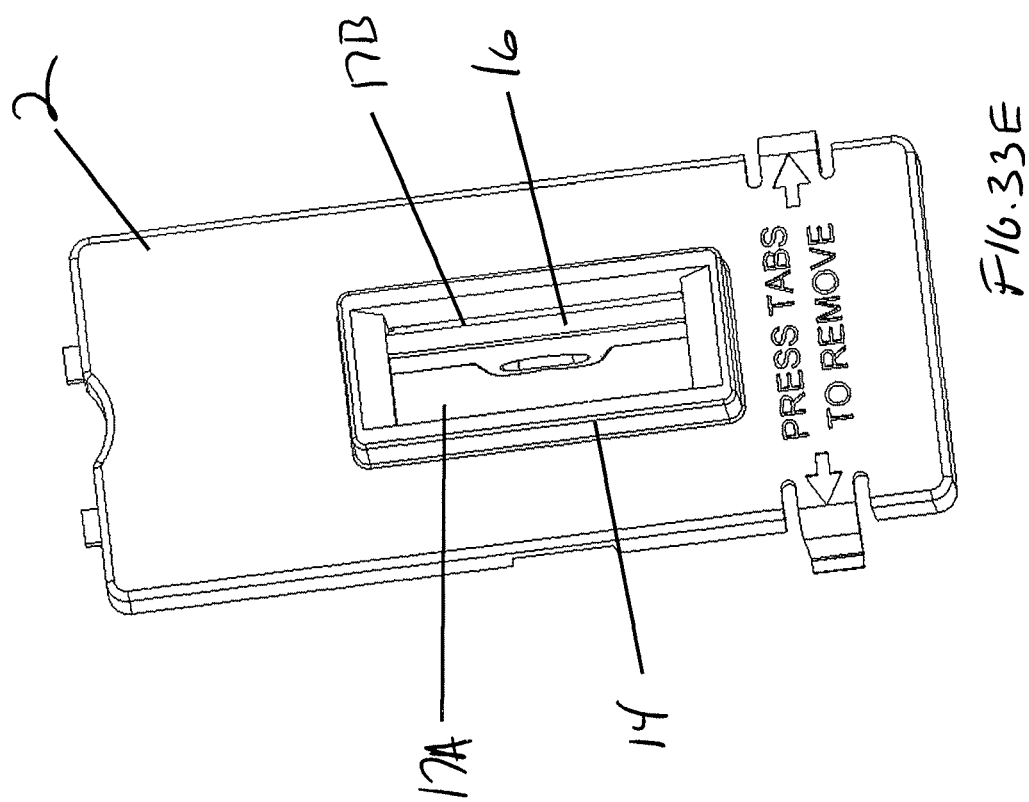
FIG. 33E is a perspective view schematic representation of the frame of the color change kit, according to an alternative embodiment.

Referring to FIG. 33E, a perspective view schematic representation of the frame 2 of the color change kit of an embodiment of the wiring device 100" is shown.

Referring to FIG. 33F, a perspective backside view schematic representation of the frame 2 of the color change kit of an embodiment of the wiring device 100" is shown.

Figure 34:
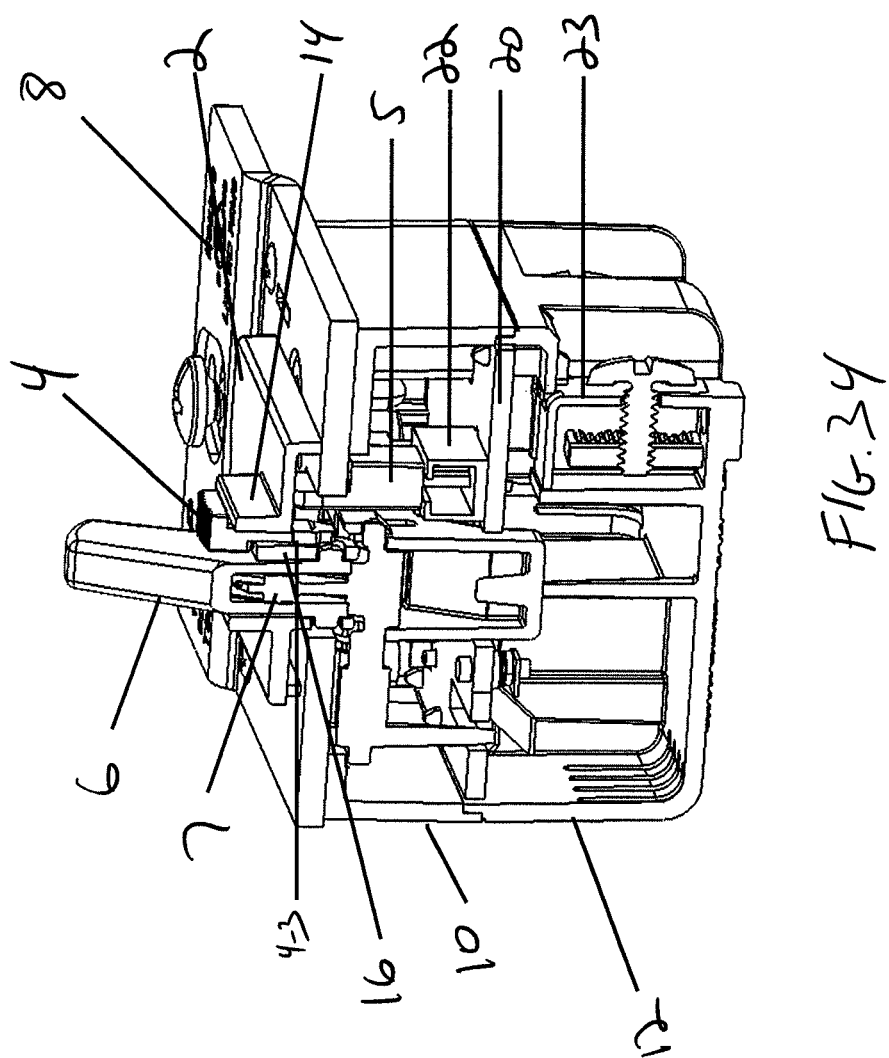
FIG. 34 is an end sectional view schematic representation of the assembled wiring device with a color change kit, according to an alternative embodiment.

Referring to FIG. 34, an end sectional view schematic representation of the assembled wiring device 100" with a color change kit is shown with elements previously identified.

Figure 35:
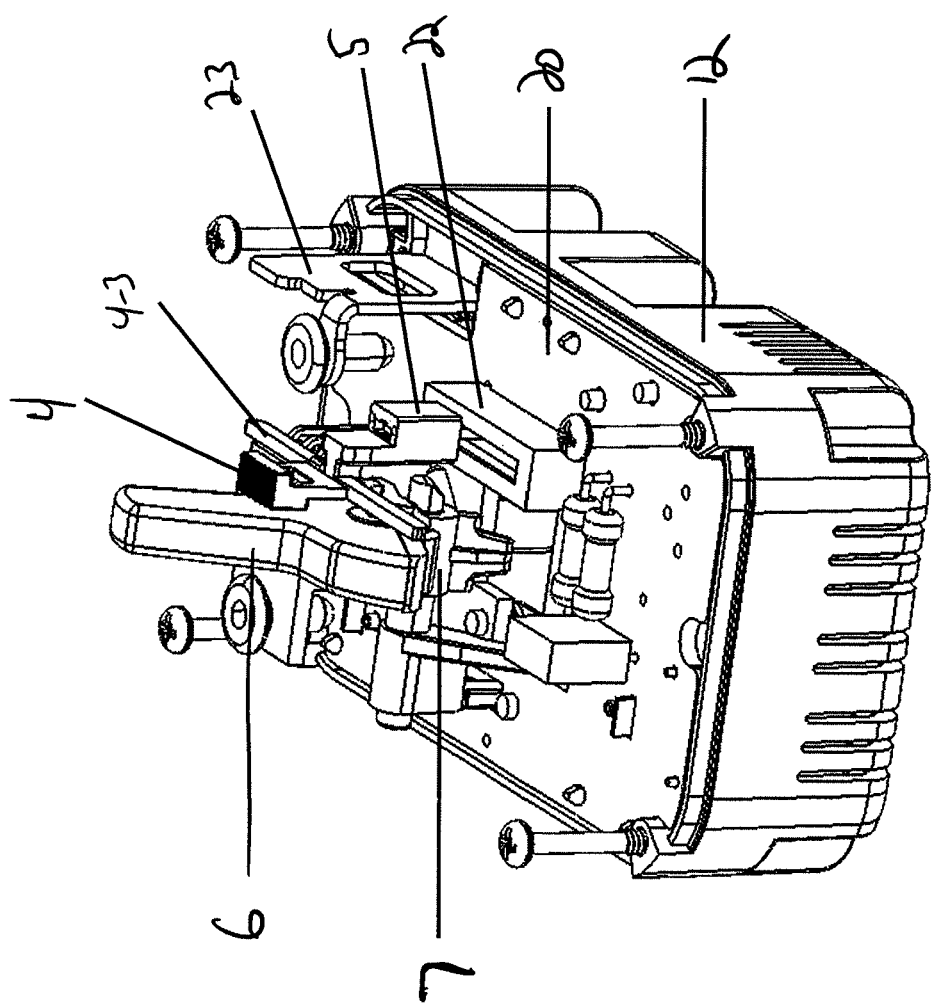
FIG. 35 is a perspective view schematic representation the wiring device 100 of FIG. 29A is shown with various elements removed, according to an alternative embodiment.

Referring to FIG. 35, a perspective view schematic representation the wiring device 100" of FIG. 29A is shown with various elements removed to show certain previously identified internal parts.

Referring to FIG. 36, a close up perspective view schematic representation of the wiring device 100" of FIG. 29A with various elements removed to show certain previously identified internal parts.

Referring to FIG. 37A, a perspective view schematic representation of the assembled color change kit (including the toggle switch cover 6, the variable actuator control mechanism/dimmer slider 4 and the frame 2), and the remainder of the assembled wiring device 100" of FIG. 29A (without a wall plate) are separately shown.

Referring to FIG. 37B, an end sectional view schematic representation of the assembled wiring device 100" with a color change kit (without a wall plate) are shown. In particular, the frame 2 is shown snapped under heat sink/plate 8 via snap connectors 2A. Other previously identified elements are also shown.

Referring to FIG. 37C, an exploded view schematic representation of the color change kit of FIG. 37A is shown.

Figure 38B:
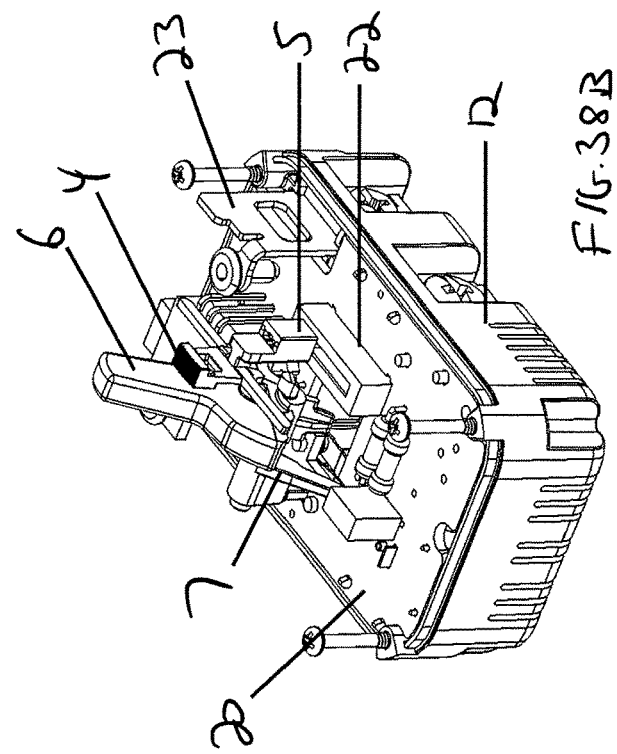
FIG. 38B is a perspective view schematic representation of the wiring device is shown with various elements removed, according to an alternative embodiment.
Figure 38A:
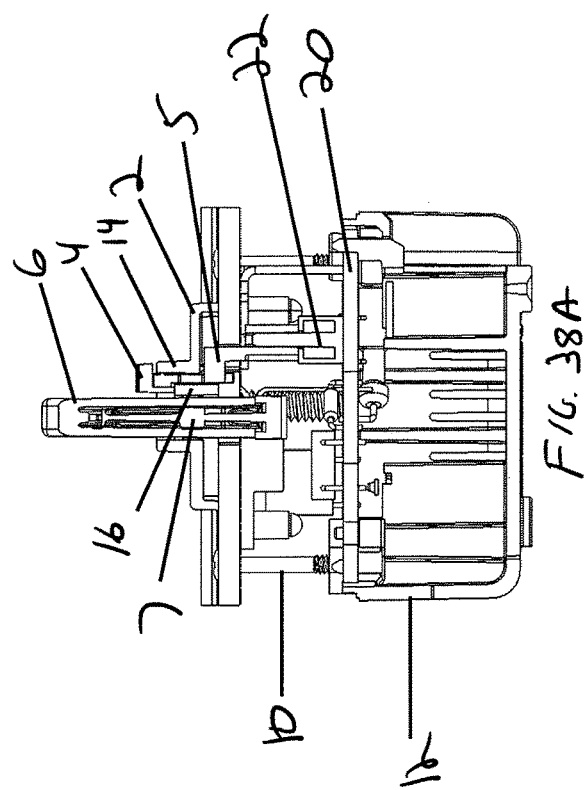
FIG. 38A is an end sectional view schematic representation of the assembled wiring device, according to an alternative embodiment.

Referring to FIG. 38A, an end sectional view schematic representation of the assembled wiring device 100" (similar to the sectional view of FIG. 37B) is provided to show certain previously identified internal mechanical and electrical components of the wiring device 100".

Referring to FIG. 38B, a perspective view schematic representation of the wiring device 100" is shown with various elements removed to show certain previously identified internal mechanical and electrical components of the wiring device 100".

Figure 39B:
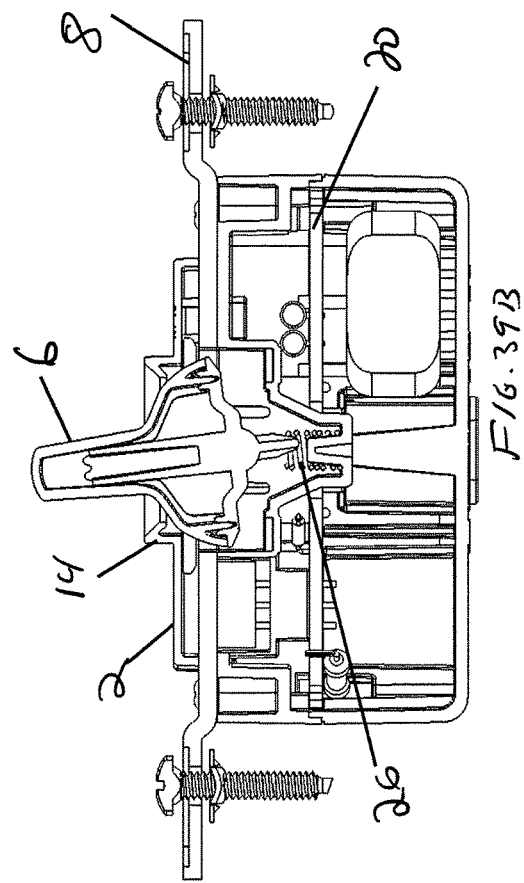
FIG. 39B is a side sectional view schematic representation of the assembled wiring device (similar to FIG. 39A) with a color change kit (without a wall plate), according to an alternative embodiment.
Figure 39A:
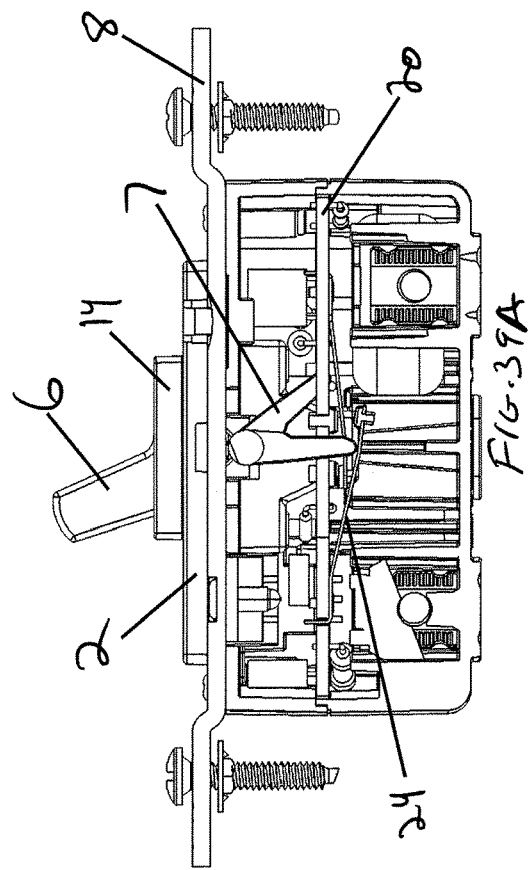
FIG. 39A is a side sectional view schematic representation of the assembled wiring device with a color change kit (without a wall plate), according to an alternative embodiment.

Referring to FIG. 39A, a side sectional view schematic representation of the assembled wiring device 100" with a color change kit (without a wall plate) is provided to show certain internal parts. In particular, toggle switch 7 is shown as a two leg configuration and is configured to use a cam action to flex contact member (switch contact/spring arm) 24.

Referring to FIG. 39B, a side sectional view schematic representation of the assembled wiring device 100" (similar to FIG. 39A) with a color change kit (without a wall plate) is provided to show certain internal parts.

Referring to FIG. 40, a perspective underside view schematic representation of the wiring device 100" with the bottom portion of the housing 12 removed is provided to show certain previously identified internal parts. For example, two spring arms 24 are shown connected to the PCB 20 on one end (e.g., via riveting).

Referring to FIG. 41, an exploded view schematic representation of the wiring device 100" with the color change kit of FIG. 37A is shown. FIG. 41 is similar to FIG. 32, however, FIG. 41 is not a fully exploded view and has some assembled portions as shown.

Referring to FIG. 42A, a perspective view schematic representation of the wiring device 100" (similar to FIG. 37A) with a fully assembled color change kit is shown separately from the otherwise fully assembled wiring device.

Referring to FIG. 42B, a perspective view schematic representation of the wiring device 100" with a fully assembled color change kit shown as part of the fully assembled wiring device (without a wall plate) is shown.

Figure 43E:
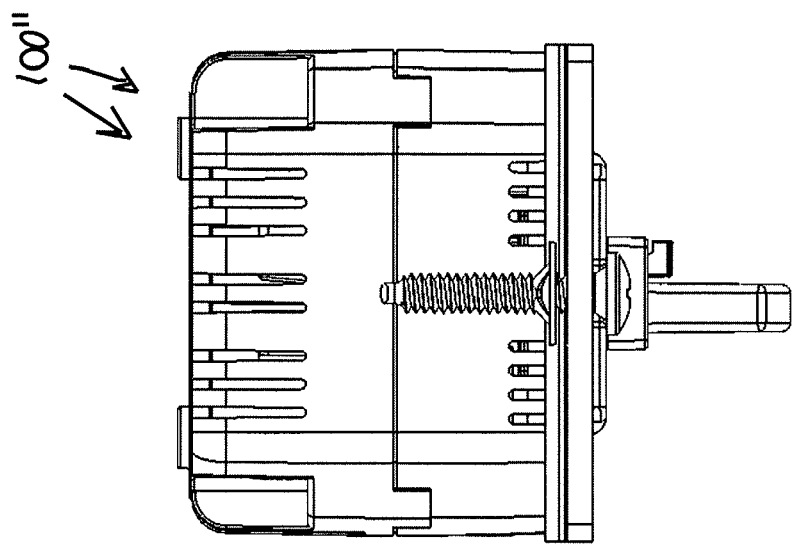
FIG. 43E is a first end view schematic representation of a fully assembled wiring device, according to an alternative embodiment.
Figure 43F:
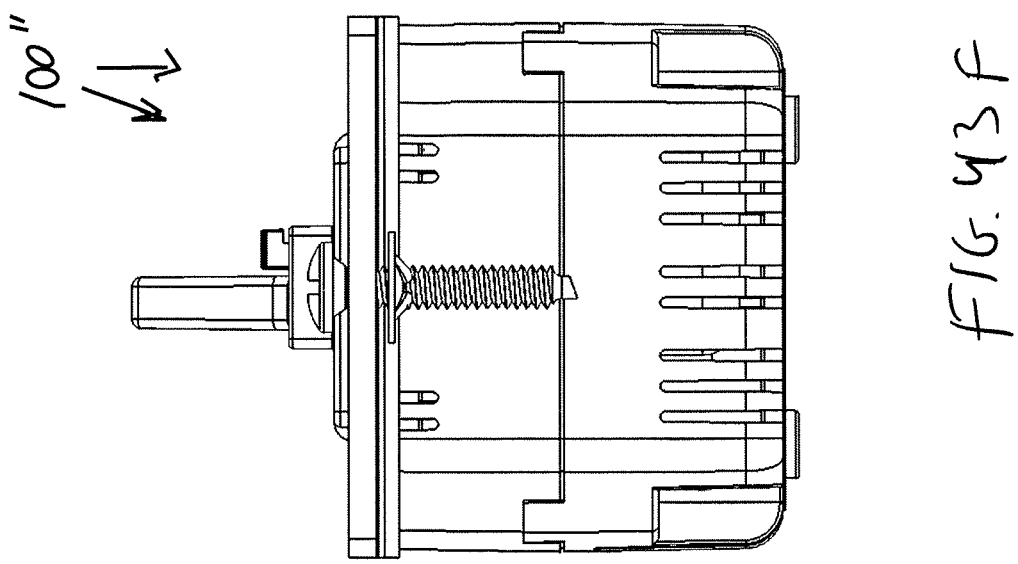
FIG. 43F is a second end view schematic representation of a fully assembled wiring device, according to an alternative embodiment.

FIGS. 43A-F show various views of a fully assembled wiring device 100" of FIG. 29A without a wall plate. For example, FIG. 43A shows a front perspective view schematic representation of wiring device 100", FIG. 43B shows a back/rear side view schematic representation of wiring device 100", FIG. 43C shows a first side view schematic representation of wiring device 100", FIG. 43D shows a second side view schematic representation of wiring device 100", FIG. 43E shows a first end view schematic representation of wiring device 100", and FIG. 43F shows a second end view schematic representation of wiring device 100".

It should be understood that the values used above are only representative values, and other values may be in keeping with the spirit and intention of this disclosure.

While several inventive embodiments have been described and illustrated herein with reference to certain exemplary embodiments, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein (and it will be understood by one skilled in the art that various changes in detail may be effected therein without departing from the spirit and scope of the invention as defined by claims that can be supported by the written description and drawings). More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Further, where exemplary embodiments are described with reference to a certain number of elements it will be understood that the exemplary embodiments can be practiced utilizing either less than or more than the certain number of elements.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if not directly attached to where there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A color change kit for an electrical wiring device, the color change kit comprising:
   a frame having:
      a top surface, a second surface, a width, a length and a height;
      a bezel extending above the top surface of the frame and having a width, a length and a height, an interior surface and a top perimeter surface, and an opening formed therethrough; and
      an elongated recessed separator having a top surface, a bottom surface, a wall surface, and being positioned within the opening and below the top perimeter surface, extending along an axis parallel to the length of the bezel, wherein the elongated recessed separator is configured to split a portion of the opening into a first aperture and a second aperture.

2. The color change kit of claim 1, further comprising a toggle switch cover positioned through and actuatable within the first aperture.

3. The color change kit of claim 2, further comprising a dimmer slider having a body with a vertical length and being positioned and actuatable within the second aperture.

4. The color change kit of claim 1, wherein the frame further includes at least one connector configuring the frame to connect to and be removable from an electrical wiring device.

5. The color change kit of claim 4, wherein the at least one connector is a flexible snap connector.

6. The color change kit of claim 5, wherein a portion of the at least one flexible snap connector is configured to move from a first secured position to a second removable position with respect to the electrical wiring device.

7. The color change kit of claim 6, wherein a portion of the snap connector is configured to be secured to and be removable from a heat sink of the electrical wiring device.

8. The color change kit of claim 3, wherein the dimmer slider further includes a recessed separator contacting surface structured to slide along at least a portion of the top surface of the recessed separator.

9. The color change kit of claim 8, wherein the dimmer slider further includes at least one leg shelf surface structured to slide along at least a portion of the bottom surface or the wall surface of the recessed separator or a bottom surface of the frame or a combination of such.

10. The color change kit of claim 9, wherein a length of the at least one leg shelf surface is at least half the vertical length of the dimmer slider body.

11. The color change kit of claim 9, wherein a length of the at least one leg shelf surface is less than half the vertical length of the dimmer slider body.

12. The color change kit of claim 9, wherein the dimmer slider further includes a bezel contacting surface structured to slide along at least a portion of the top perimeter surface of the bezel.

13. An electrical wiring device, comprising:
   a housing having an outside surface, an internal surface, and an interior space;
   a color change kit removably connected to the housing, comprising a frame connected to the housing, the frame having:
      a top surface, a second surface, a width, a length and a height;
      a bezel extending above the top surface of the frame and having a width, a length and a height, an interior surface and a top perimeter surface, and an opening formed therethrough; and
      an elongated recessed separator having a top surface and a bottom surface and being positioned within the opening and below the top perimeter surface, extending along an axis parallel to the length of the bezel, wherein the elongated recessed separator is configured to split a portion of the opening into a first aperture and a second aperture.

14. The device of claim 13, further comprising a toggle switch cover positioned through and actuatable within the first aperture.

15. The device of claim 14, further comprising a dimmer slider having a body with a vertical length and being positioned and actuatable within the second aperture.

16. The device of claim 13, wherein the frame further includes at least one connector configuring the frame to connect to and be removable from an electrical wiring device.

17. The device of claim 16, wherein the at least one connector is a flexible snap connector and wherein a portion of the at least on flexible snap connector is configured to move from a first secured position to a second removable position with respect to the electrical wiring device.

18. The device of claim 17, wherein a portion of the flexible snap connector is configured to be secured to and be removable from a heat sink of the electrical wiring device.

19. The device of claim 15, wherein the dimmer slider further includes a recessed separator contacting surface structured to slide along at least a portion of the top surface of the recessed separator.

20. The device of claim 8, wherein the dimmer slider further includes at least one leg shelf surface structured to slide along at least a portion of the bottom surface of the recessed separator or a bottom surface of the frame.

\* \* \* \* \*